United States Patent
Cho et al.

(10) Patent No.: US 11,096,217 B2
(45) Date of Patent: Aug. 17, 2021

(54) METHOD FOR TRANSMITTING AND RECEIVING DATA IN WIRELESS COMMUNICATION SYSTEM AND DEVICE FOR SUPPORTING SAME

(71) Applicant: LG ELECTRONICS INC., Seoul (KR)

(72) Inventors: Heejeong Cho, Seoul (KR); Jiwon Kang, Seoul (KR); Heejin Kim, Seoul (KR); Ilmu Byun, Seoul (KR); Hyunjin Shim, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 604 days.

(21) Appl. No.: 15/999,677

(22) PCT Filed: Feb. 13, 2017

(86) PCT No.: PCT/KR2017/001540
§ 371 (c)(1),
(2) Date: Aug. 17, 2018

(87) PCT Pub. No.: WO2017/142268
PCT Pub. Date: Aug. 24, 2017

(65) Prior Publication Data
US 2021/0212122 A1    Jul. 8, 2021

Related U.S. Application Data

(60) Provisional application No. 62/297,145, filed on Feb. 19, 2016, provisional application No. 62/309,952, filed on Mar. 17, 2016.

(51) Int. Cl.
*H04W 74/08*    (2009.01)
*H04W 72/12*    (2009.01)

(52) U.S. Cl.
CPC ....... *H04W 74/0833* (2013.01); *H04W 72/12* (2013.01)

(58) Field of Classification Search
CPC .................. H04W 74/0833; H04W 72/12
See application file for complete search history.

(56) References Cited

U.S. PATENT DOCUMENTS

2015/0230204 A1    8/2015    Lin

FOREIGN PATENT DOCUMENTS

| KR | 1020090014937 | 2/2009 |
|---|---|---|
| KR | 101033689 | 5/2011 |

(Continued)

OTHER PUBLICATIONS

PCT International Application No. PCT/KR2017/001540, International Search Report dated May 31, 2017, 3 pages.

(Continued)

*Primary Examiner* — Angel T Brockman
(74) *Attorney, Agent, or Firm* — Lee, Hong, Degerman, Kang & Waimey

(57) ABSTRACT

The present invention relates to a method and a device for transmitting and receiving data in a wireless communication system. The present invention can provide a method and a device for transmitting to a network node a first preamble and a first request message for requesting random connection; as a response to the first request message, receiving a first response message comprising the index of a second preamble successfully received by the network node and a second identifier for indicating whether or not the first request message is decoded and contention resolution; and, while the connection with the network node has not been formed, transmitting first data to the network node in accordance with the index of the second preamble and the second identifier.

15 Claims, 32 Drawing Sheets

(56) References Cited

FOREIGN PATENT DOCUMENTS

| KR | 101260079 | 5/2013 |
|----|-----------|--------|
| WO | 2015042866 | 4/2015 |
| WO | 2015197121 | 12/2015 |

OTHER PUBLICATIONS

European Patent Office Application Serial No. 17753429.4, Search Report dated Jul. 15, 2019, 11 pages.
New Postcom, "Analysis of RAN options for Fast path and Connectionless solutions", 3GPP TSG RAN WG2 Meeting #82, R2-131718, XP050699844, May 2013, 4 pages.
3rd Generation Partnership Project (3GPP), "Technical Specification Group Radio Access Network; Evolved Universal Terrestrial Radio Access (E-UTRA); Medium Access Control (MAC) protocol specification (Release 13)," 3GPP TR 36.321 V13.0.0, XP055403098, Dec. 2015, 82 pages.

(a)

(b)

(a)

(b)

(a)

(b)

METHOD FOR TRANSMITTING AND RECEIVING DATA IN WIRELESS COMMUNICATION SYSTEM AND DEVICE FOR SUPPORTING SAME

CROSS-REFERENCE TO RELATED APPLICATIONS

This application is the National Stage filing under 35 U.S.C. 371 of International Application No. PCT/KR2017/001540, filed on Feb. 13, 2017, which claims the benefit of U.S. Provisional Application No. 62/297,145, filed on Feb. 19, 2016, and 62/309,952, filed on Mar. 17, 2016, the contents of which are all hereby incorporated by reference herein in their entirety.

TECHNICAL FIELD

The present invention relates to a method for transmitting and receiving data of a user equipment in a wireless communication system and, more particularly, to a method for differentially allocating resources depending on a user equipment without generating a connection between a user equipment and a network node and transmitting and receiving data and an apparatus supporting the same.

BACKGROUND ART

Mobile communication systems have emerged to provide a voice service while guaranteeing mobility of a user. The mobile communication system of today has been expanded to support data services in addition to the voice service. Due to the explosive increase of today's traffic, resources are running short; more and more users are demanding higher speed services; and a more advanced mobile communication system is required accordingly.

Key requirements for a next-generation mobile communication system include accommodation of explosive data traffic, significant increase of transmission rate per user, accommodation of a significantly increased number of connected devices, very low end-to-end latency, and high energy efficiency. In order to meet the requirements, various technologies such as dual connectivity, massive Multiple Input Multiple Output (MIMO), in-band full duplex, Non-Orthogonal Multiple Access (NOMA), super wideband, and device networking are being studied.

DISCLOSURE

Technical Problem

An object of the present invention is to provide a resource scheduling method and apparatus for transmitting and receiving data.

Furthermore, an object of the present invention is to provide a method and apparatus for transmitting and receiving data through the resource scheduling of a network node in the state in which a connection between a user equipment and a network node has not been established.

Furthermore, an object of the present invention is to provide a method and apparatus for a network node to schedule resources based on information related to data to be transmitted, which has been transmitted by a user equipment.

Furthermore, an object of the present invention is to provide a method and apparatus for a network node to receive preambles classified based on the direction and size of transmitted and received data from a user equipment and to schedule resources.

Further, an embodiment of the present invention provides a method and a device for transmitting a message for requesting a random access including information of data to be transmitted together with a preamble in a random access procedure with a network node to be allocated resources from a base station by a terminal.

Technical objects to be achieved in this specification are not limited to the aforementioned technical objects, and other technical objects not described above may be evidently understood by a person having ordinary skill in the art to which the present invention pertains from the following description.

Technical Solution

In order to solve the problem, the present invention provides a method and a device for transmitting and receiving data by a device in a wireless communication system.

Specifically, provided is a method for transmitting and receiving data according to an embodiment of the present invention, which includes: transmitting to a network node a first preamble and a first request message for requesting random access, the first request message including at least one of purpose information indicating a purpose of transmitting the first request message, count information indicating the number of times of trying the random access, size information of first data, or a first identifier for contention resolution; as a response to the first request message, receiving a first response message including a second identifier for indicating whether the first request message is decoded and contention resolution and an index of a second preamble successfully received by the network node; and while the connection with the network node is not established, transmitting the first data to the network node in accordance with the index of the second preamble and the second identifier.

Further, in the present invention, when the first data is uplink data, the first request message further includes characteristic information of the first data.

In addition, in the present invention, when the first data is verification information of UE for receiving downlink data, the first request message further includes characteristic information of the downlink data.

Moreover, in the present invention, the method further includes selecting the first preamble in a preamble set, and the preamble set is one of multiple preamble sets determined according to a size and a transmission direction of data.

Further, in the present invention, the response message further includes a radio network identifier of a device allocated by the network node.

In addition, in the present invention, when the index of the first preamble and the index of the second preamble are the same as each other and a value of the second identifier indicates decoding success of the first request message, the first response message includes resource allocation information for transmitting the first data and the first data is transmitted based on the resource allocation information.

In addition, in the present invention, the method further includes: when the index of the first preamble and the index of the second preamble are the same as each other and the value of the second identifier indicates decoding failure of the first request message, transmitting a second request message for requesting resource allocation for transmitting the first data to the network node; and receiving a second response message including resource allocation information for transmitting the first data, and the first data is transmitted based on the resource allocation information.

Further, in the present invention, the method further includes when the index of the first preamble and the index of the second preamble are not the same as each other, transmitting to the network node a third preamble and a second request message for requesting the random access.

In addition, in the present invention, the method further includes: when the first data is UE verification data for transmitting downlink data, receiving a paging message from the network node; and receiving the downlink data from the network node, and the paging message further includes a UE identifier indicating device receiving the downlink data and quality information indicating a quality of the downlink data.

Moreover, the present invention provides a method including: receiving from user equipments (UEs) one or more first preambles and a first request message for requesting random access, each of the one or more first request messages including at least one of purpose information indicating a purpose of transmitting the first request message, count information indicating the number of times of trying the random access, size information of data to be transmitted by the UE, characteristic information of uplink or downlink data, or a first identifier for contention resolution; allocating a resource to at least one UE among the UE based on at least one of the purpose information, the count information, the size information, or the characteristic information; transmitting one or more first response messages as a response to the one or more first request messages; and receiving the data from the at least one UE while not being connected with the at least one node.

Further, in the present invention, each of the one or more first preambles is selected in one preamble set among multiple preamble sets determined according to a size and a transmission direction of data to be transmitted.

In addition, in the present invention, each of the one or more response messages includes a second identifier indicating contention resolution and indicating whether to decode each of the one or more first request messages and a preamble index indicating a preamble successfully received by the network node among the one or more first preambles.

Moreover, in the present invention, the method further includes: receiving a second request message for requesting resource allocation for transmitting the data from one or more UE which is not allocated the resource among the UE; and transmitting a second response message including resource allocation information indicating a resource allocated for transmitting the data to the one or more UE as a response to the second request message.

In addition, in the present invention, the method further includes when the data is UE verification data for transmitting downlink data, transmitting a paging message from the UE, and the paging message further includes a UE identifier indicating UE to which the downlink data is transmitted and quality information indicating a quality of the downlink data.

In addition, the present invention provides UE including: a communication unit transmitting and receiving a radio signal to and from the outside; and a processor functionally coupled with the communication unit, and the processor transmits to a network node a first preamble and a first request message for requesting random connection, the first request message including at least one of purpose information indicating a purpose of transmitting the first request message, count information indicating the number of times of trying the random access, size information of first data, or a first identifier for contention resolution, as a response to the first request message, receives a first response message including a second identifier for indicating whether the first request message is decoded and contention resolution and an index of a second preamble successfully received by the network node, and while the connection with the network node is not established, transmits the first data to the network node in accordance with the index of the second preamble and the second identifier.

Advantageous Effects

The present invention has an effect in that latency of data transmission and reception can be reduced because a UE transmits and receives data without establishing a connection with a network node.

Furthermore, the present invention has an effect in that data can be transmitted and received even without establishing a connection with a network node because resources allocated by a network node are received by transmitting a preamble for random access and a request message to request random access together.

Furthermore, the present invention has an effect in that a UE can receive resources allocated based on the quality and requirements of data because the UE receives resources allocated by an eNB based on information of data to be transmitted by the UE.

Furthermore, the present invention has an effect in that a network node can differentially allocate resources for each UE based on the size of data, required latency, a transmission object and a transmission direction by scheduling resources based on information transmitted by a UE.

Effects which may be obtained in this specification are not limited to the aforementioned effects, and other technical effects not described above may be evidently understood by a person having ordinary skill in the art to which the present invention pertains from the following description.

MODE FOR INVENTION

Figure 1:
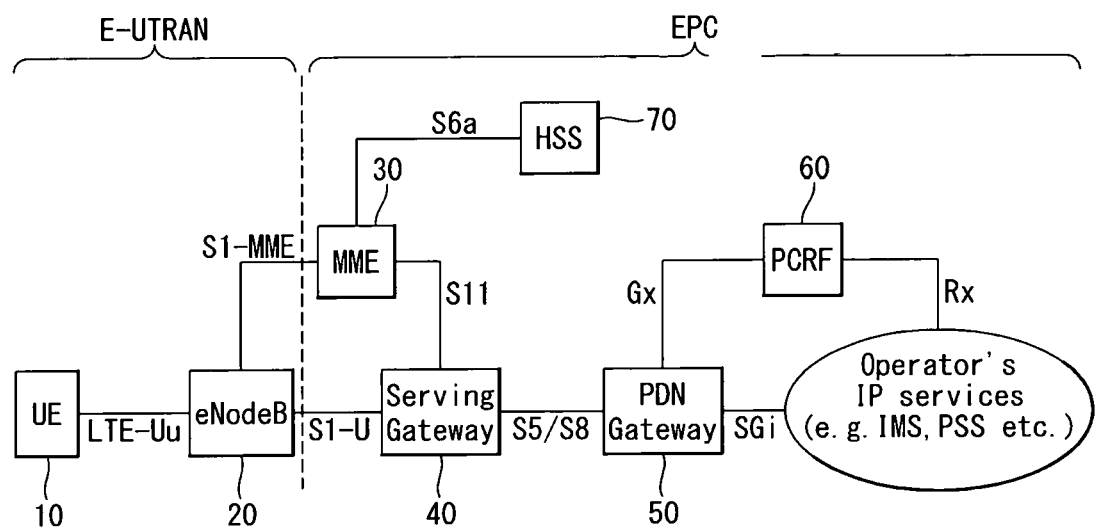
FIG. 1 is a diagram illustrating one example of an evolved packet system (EPS) related to an LTE system to which the present invention may be applied.

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the present disclosure, a base station has a meaning of a user equipment node of a network, which directly communicates with a user equipment. In some cases, a specific operation described as being performed by the base station may also be performed by an upper node of the base station. Namely, it is apparent that, in a network including a plurality of network nodes including a base station, various operations performed for communication with a user equipment may be performed by the base station, or network nodes other than the base station. The term 'base station (BS)' may be replaced by the term 'fixed station', 'Node B', 'evolved-NodeB (eNB)', 'base transceiver system (BTS)', 'access point (AP)', network node and the like. The term 'user equipment" may be fixed or mobile, and may be replaced with the term 'user equipment (UE)', 'mobile station (MS)', 'user user equipment (UT)', 'mobile subscriber station (MSS)', 'subscriber station (SS)', 'advanced mobile station (AMS)', 'wireless user equipment (WT)', 'machine-type communication (MTC) device', 'machine-to-machine (M2M) device', 'device-to-device (D2D) device', and the like.

Hereinafter, the downlink (DL) means communication from a base station to a user equipment, and the uplink (UL) means communication from a user equipment to a base station. In the downlink, a transmitter may be part of a base station, and a receiver may be part of a user equipment.

In the uplink, a transmitter may be part of a user equipment, and the receiver may be part of a base station.

Specific terms described in the following description are provided to help understanding of the present invention, and the use of such specific terms may be changed in other forms without departing the technical spirit of the present invention.

The following technology may be used for various radio access systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented as a radio technology, such as universal terrestrial radio access (UTRA) or CDMA2000. TDMA may be implemented as a radio technology, such as global system for mobile communications (GSM)/general packet radio service (GPRS)/enhanced data rates for GSM evolution (EDGE). OFDMA may be implemented as a radio technology, such as IEEE 802.11 (Wi-Fi), IEEE 802.16 (WiMAX), IEEE 802-20, or evolved UTRA (E-UTRA). UTRA is part of a universal mobile telecommunications system (UMTS). 3rd generation partnership project (3GPP) long term evolution (LTE) is part of an evolved UMTS (E-UMTS) using E-UTRA, and adopts OFDMA in the downlink and adopts SC-FDMA in the uplink. LTE-advanced (A) is the evolution of 3GPP LTE.

Embodiments of the present invention may be supported by at least one standard document which is described in IEEE 802, 3GPP and 3GPP2, which are wireless access systems. That is, among the embodiments of the present invention, steps or parts that are not described for disclosing the technical concept of the present invention apparently may be supported by the documents. In addition, all terms disclosed in this document may be described by the standard document.

For clear description, the present invention is described mainly for 3GPP LTE/LTE-A, but the technical features of the present invention are not limited thereto, but may also be applied to 5G system.

Before describing with reference to drawings, for understanding the present invention, the terms used in the present disclosure are briefly defined.

EPS: This is an abbreviation of Evolved Packet System, and means a core network that supports Long Term Evolution (LTE) network. This is a network in the form evolved from UMTS.

PDN (Public Data Network): An independent network at which a server that provides a service is located.

APN (Access Point Name): This is a name of an access point managed in a network, and provided to a UE. That is, this indicates a name (a character string) of the PDN. Based on the name of an access point, the corresponding PDN for transmitting and receiving data is determined.

TEID (Tunnel Endpoint Identifier): This is an End point ID of a tunnel configured between nodes in a network, and configured in each section as a unit of bearer of each UE.

MME: This is an abbreviation of Mobility Management Entity, and plays the role of controlling each entity in the EPS in order to provide a session and mobility for a UE.

Session: A session is a passage for transmitting data, and the unit may be a unit of PDN, Bearer, IP flow, and so on.

A difference of each unit may be distinguished by a target network entire unit (a unit of APN or PDN), a unit distinguished by QoS therein (a unit of Bearer) and a unit of destination IP address as defined in 3GPP.

EPS Bearer: A logical path generated between a UE and a gateway through which various types of traffics are transmitted and received.

Default EPS Bear: This is a logical path for transmitting and receiving data which is generated basically when a UE accesses to a network, and may be maintained until the UE is detached from the network.

Dedicated EPS Bearer: A logical path generated for being provided with a service additionally after the Default EPS Bear is generated, if it is required.

IP flow: Various types of traffics transmitted and received through a logical path between a UE and a gateway.

Service Data Flow (SDF): IP flow of a user traffic or combination of a plurality of IP flows which is classified according to a service type.

PDN connection: This represents an association (connection) between a UE represented by an IP address and the PDN represented by the APN. This means a connection (UE-PDN GW) between entities in a core network so as to form a session.

UE Context: State information of a UE used for managing the UE in a network, that is, state information including UE ID, mobility (current location, etc.), an attribute of a session (QoS, priority, etc.)

TIN: Temporary Identity used in Next update

P-TMSI: Packet Temporary Mobile Subscriber

TAU: Tracking Area Update

GBR: Guaranteed Bit Rate

GTP: GPRS Tunneling Protocol

TEID: Tunnel Endpoint ID

GUTI: Globally Unique Temporary Identity, UE identity known to an MME

FIG. 1 is a view illustrating an Evolved Packet System which is associated with the Long Term Evolution (LTE) system to which the present invention can be applied.

The LTE system aims to provide seamless Internet Protocol (IP) connectivity between a user equipment (UE) 10) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station 20, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

In the present invention, the MME 30 corresponds to an entity in which a function necessary to process authentication of the UE and context information is implemented, where the MME 30 is described as one embodiment of the entity. Therefore, other devices in addition to the MME 30 can also carry out the corresponding function.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

In the present invention, the S-GW 40 corresponds to an entity in which a function necessary for processing authentication of the UE and context information is implemented, where the S-GW 40 is described as one embodiment of the entity. Therefore, other devices in addition to the S-GW 40 can also carry out the corresponding function.

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

In the present invention, the P-GW 50 corresponds to an entity in which a function necessary for processing routing/forwarding of user data is implemented, where the P-GW 50 is described as one embodiment of the entity. Therefore, other devices in addition to the P-GW 50 can also carry out the corresponding function.

The PCRF 60 performs policy control decision-making and performs flow-based charging.

The HSS 70 is also called a home location register (HLR), and includes an EPS-subscribed QoS profile and SAE subscription data including access control information for roaming. Furthermore, the HSS also includes information about a PDN accessed by a user. Such information may be maintained in an access point name (APN) form. The APN is a domain name system (DNS)-based label, and is an identity scheme that describes an access point for a PDN or a PDN address indicative of a subscribed IP address.

As shown in FIG. 1, various interfaces, such as S1-U, S1-MME, S5/S8, S11, S6a, Gx, Rx and SG, may be defined between EPS network elements.

Hereinafter, the concept of mobility management (MM) and an MM back-off timer are described in detail. The mobility management (MM) is a procedure for reducing overhead on the E-UTRAN and processing in a UE.

If the mobility management (MM) is applied, all of pieces of information related to a UE in an access network may be released during the cycle in which data is deactivated. The MME may maintain UE context and information related to a configured bearer during an Idle interval.

A UE may notify a network of a new location whenever it deviates from a current tracking area (TA) so that the network may contact the UE in the ECM-IDLE state. Such a procedure may be called "Tracking Area Update." This procedure may be called "Routing Area Update" in a universal terrestrial radio access network (UTRAN) or GSM EDGE radio access network (GERAN) system. The MIME performs a function for tracking a user location while a UE is in the ECM-IDLE state.

If downlink data to be delivered to a UE in the ECM-IDLE state is present, the MME transmits a paging message to all of eNodeB on a tracking area (TA) with which the UE has been registered.

Next, the base station starts paging for the UE on a radio interface. When the paging message is received, the base station performs a procedure that enables the state of the UE to switch to the ECM-CONNECTED state. Such a procedure may be called a "Service Request Procedure." Accordingly, information related to the UE is generated in the E-UTRAN, and all of bearers are re-established. The MME performs there-establishment of the radio bearers and a function of updating UE context on the base station.

If the mobility management (MM) procedure is performed, a mobility management (MM) backoff timer may be additionally used. Specifically, the UE may transmit tracking area update (TAU) in order to update the TA. The MME may reject a TAU request due to core network congestion. In this case, the MME may provide a time value related to the MM backoff timer. When the corresponding time value is received, the UE may activate the MM backoff timer.

Figure 2:
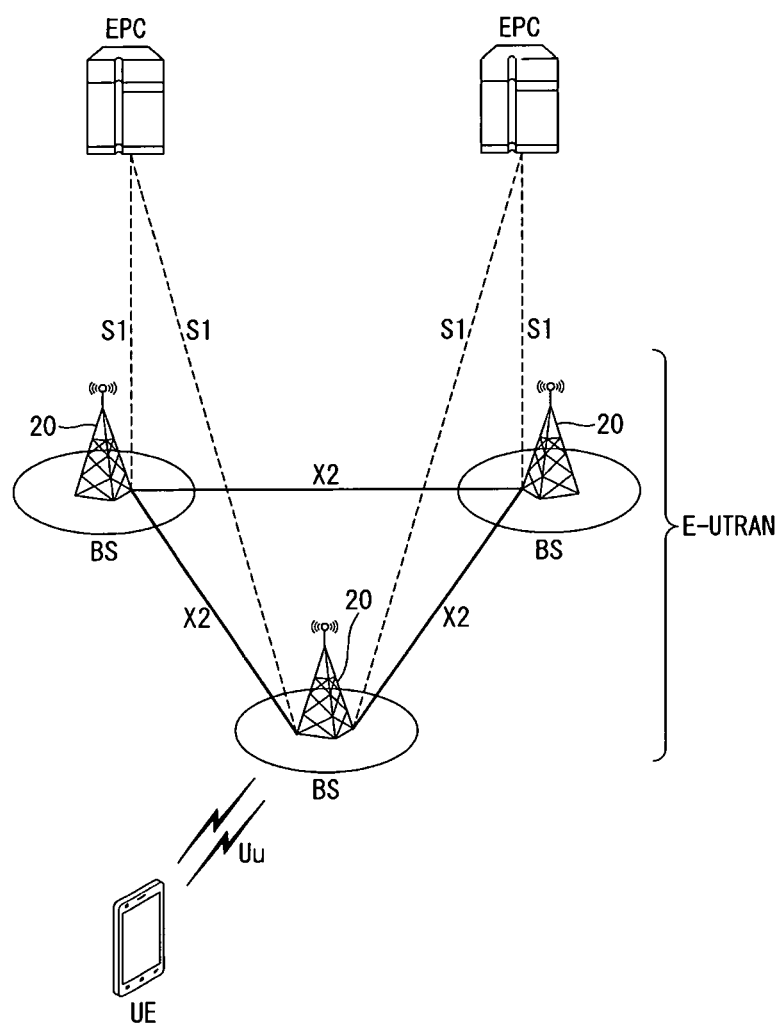
FIG. 2 is a diagram illustrating a wireless communication system to which the present invention is applied.

FIG. 2 illustrates a wireless communication system to which the present invention is applied.

The wireless communication system may also be called an Evolved-UMTS Terrestrial Radio Access Network (E-UTRAN) or a Long Term Evolution (LTE)/LTE-A system.

The E-UTRAN includes a base station (BS) 20 that provides a control plane and a user plane to user equipment (UE) 10.

The base stations 20 may be interconnected via an X2 interface. The base station 20 is connected to an evolved packet core (EPC) through an S1 interface, more particularly, to a mobility management entity (MME) through S1-MME and a serving gateway (S-GW) through S1-U.

The EPC is constituted by of the MME, the S-GW, and a packet data network-gateway (P-GW). The MME has access information of the terminal or information on a capability of the terminal and the information is mainly used for managing the mobility of the UE. The S-GW is a gateway having the E-UTRAN as an end point and the P-GW is a gateway having the PDN as the end point.

Layers of a radio interface protocol between the UE and the network may be classified into L1 (first layer), L2 (second layer), and L3 (third layer) based on three lower layers of an open system interconnection (OSI) reference model which is widely known in a communication system and among them, a physical layer which belongs to the first layer provides an information transfer service using a physical channel and a radio resource control (RRC) layer positioned in the third layer serves to control a radio resource between the UE and the network. To this end, the RRC layer exchanges an RRC message between the UE and the BS.

Figure 3:
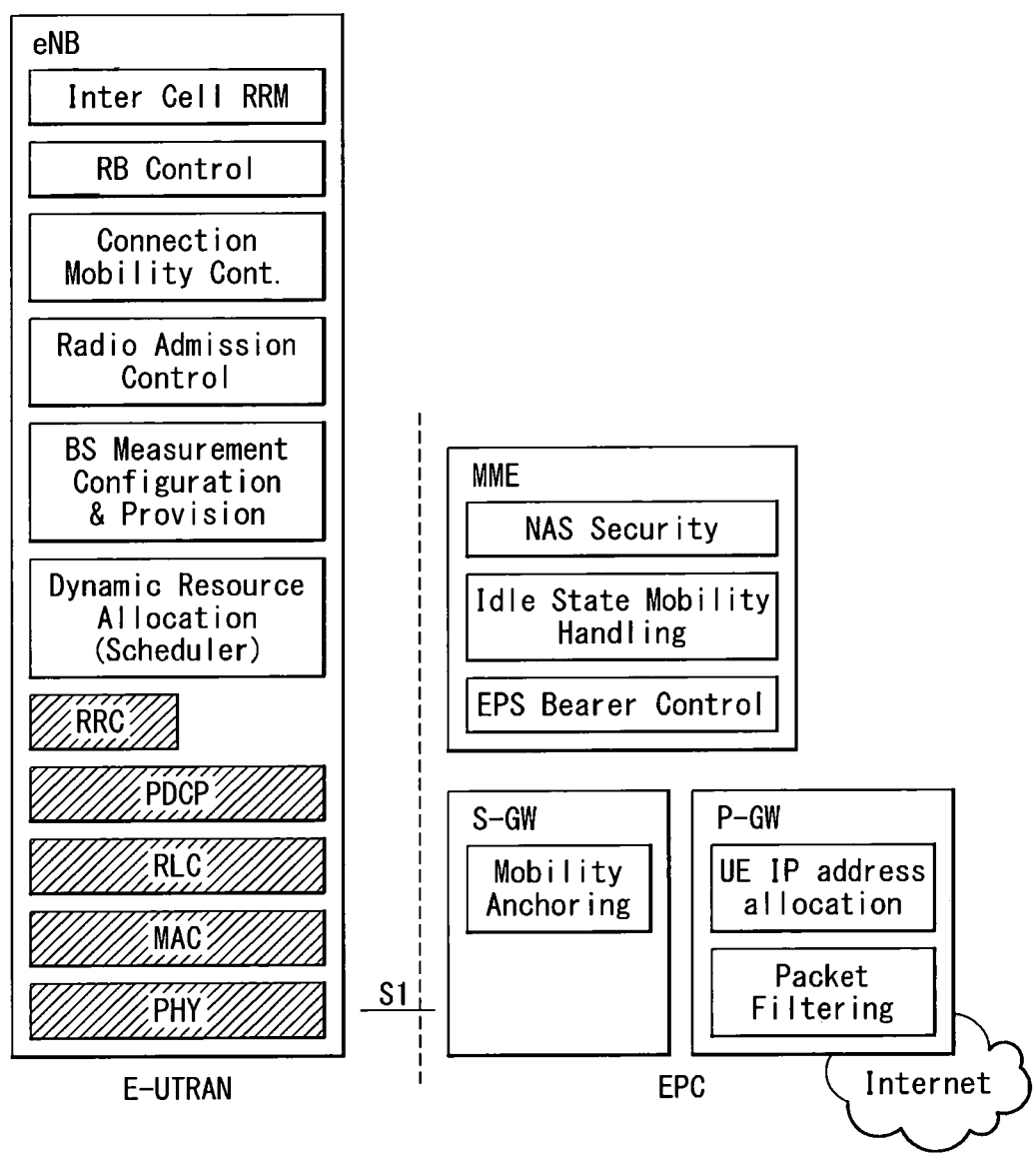
FIG. 3 is a block diagram illustrating an example of a functional split between an E-UTRAN and an EPC to which the present invention may be applied.

FIG. 3 is a block diagram illustrating an example of a functional split between an E-UTRAN and an EPC to which the present invention may be applied.

Referring to FIG. 3, a hatched block represents a radio protocol layer, and an empty block represents a functional entity of the control plane.

The BS performs the following functions: (1) Radio resource management (RRM) function such as radio bearer control, radio admission control, connection mobility control, and dynamic resource allocation to the UE, (2) Internet Protocol (IP) header compression and encryption of user data streams, (3) routing of user plane data to the S-GW, (4) scheduling and transmission of a paging message, (5) scheduling and transmission of broadcast information, and (6) measurement and measurement reporting setup for mobility and scheduling.

The MME performs the following functions: (1) Distribution of the paging message to the BSs, (2) security control, (3) idle state mobility control, (4) SAE bearer control, and (5) non-access stratum (NAS) signaling ciphering and integrity protection.

Figure 4:
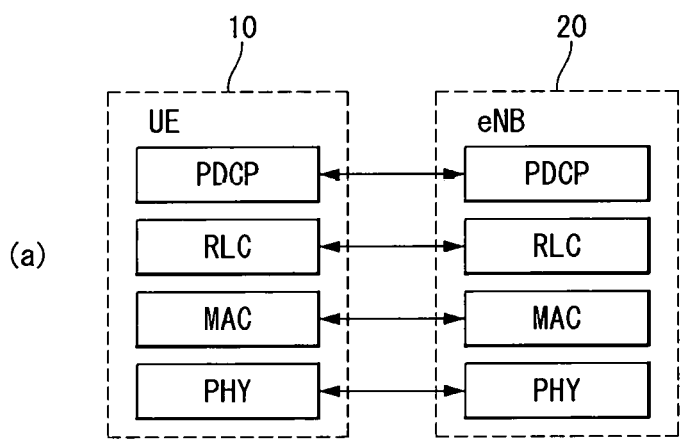
FIG. 4 is a diagram illustrating one example of a radio protocol architecture to which a technical feature of the present invention may be applied.
Figure 4:
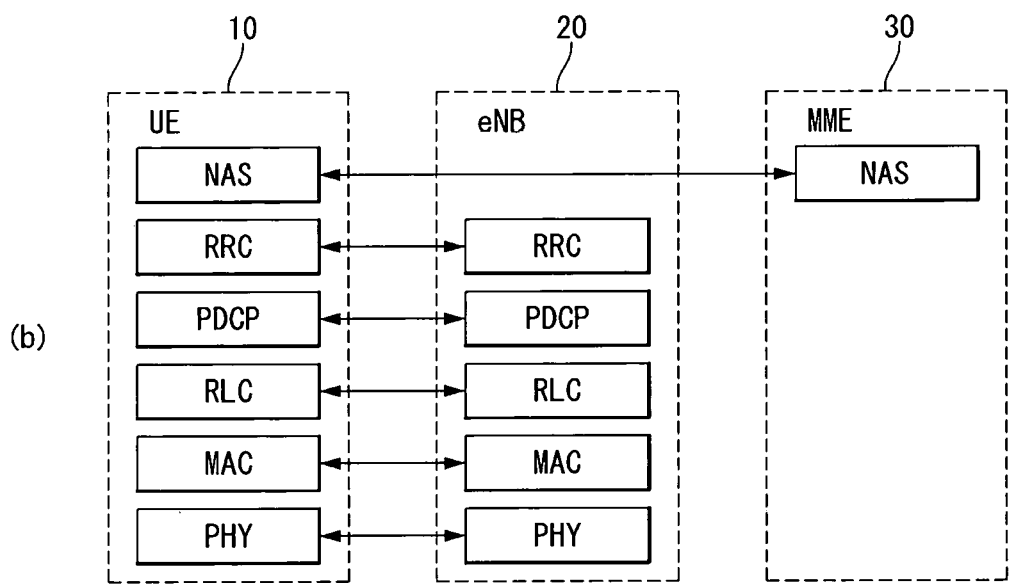

The S-GW performs the following functions: (1) Termination of a user plane packet for paging and (2) user plane switching for supporting UE mobility FIG. 4 is a diagram illustrating one example of a radio protocol architecture to which a technical feature of the present invention may be applied.

FIG. 4(a) illustrates an example of a radio protocol architecture for a user plane, and FIG. 4(b) is a block diagram illustrating an example of the radio protocol architecture for a control plane.

The user plane is a protocol stack for transmitting user data and the control plane is a protocol stack for transmitting a control signal.

Referring to FIGS. 4(a) and 4(b), the physical layer (PHY) provides the information transfer service to an upper layer using the physical channel. The physical layer is connected to a medium access control (MAC) layer which is the upper layer through a transport channel. Data moves between the MAC layer and the physical layer through the transport channel. The transport channel is classified according to how the data is transmitted through a radio interface and what feature the data is transmitted.

Data move between different physical layers, that is, between the physical layers of a transmitter and a receiver through the physical channel. The physical channel may be modulated by an orthogonal frequency division multiplexing (OFDM) scheme and uses a time and a frequency as the radio resources.

The function of the MAC layer includes mapping between a logical channel and a transmission channel and multiplexing/demultiplexing (a meaning of '/' includes both concepts of 'or' and 'and') to the transport block provided to the physical channel on the transport channel of an MAC service data unit (SDU) which belongs to the logical channel. The MAC layer provides a service to a radio link control (RLC) layer through the logical channel.

The function of the RLC layer includes concatenation, segmentation, and reassembly of the RLC SDUs. In order to guarantee various quality of service (QoS) required by a radio bearer (RB), the RLC layer provides three operating modes of a transparent mode (TM), an unacknowledged mode (UM), and an acknowledged mode (AM). The AM RLC provides error correction through an automatic repeat request (ARQ).

The radio resource control (RRC) layer is defined only in the control plane. The RRC layer serves to control the logical, transport, and physical channels in connection with configuration, re-configuration and release of the radio bearers. The RB means a logical path provided by the first layer (PHY layer) and the second layer (MAC layer, RLC layer, or PDCP layer) for data transmission between the UE and the network.

The function of the packet data convergence protocol (PDCP) layer in the user plane includes transmission of the user data, header compression, and ciphering. The function of the packet data convergence protocol (PDCP) layer in the control plane includes transmission of the control plane data and ciphering/integrity protection.

Configuring the RB means a process of defining the characteristics of the radio protocol layer and the channel to provide a specific service and configuring each specific parameter and operation method. The RB may be divided into a signaling RB (SRB)) and a data RB (DRB) again. The SRB is used as a path for transmitting the RRC message in the control plane and the DRB is used as a path for transmitting the user data in the user plane.

When an RRC connection is established between the RRC layer of the UE and the RRC layer of the E-UTRAN, the UE is in an RRC connected state and if not, the UE is in an RRC idle state.

A downlink transmission channel for transmitting data from the network to the UE includes a broadcast channel (BCH) for transmitting system information and a downlink shared channel (SCH) for transmitting user traffic and a control message. The traffic or control message of a downlink multicast or broadcast service may be transmitted through a downlink SCH or may be transmitted via a separate downlink multicast channel (MCH). Meanwhile, an uplink transmission channel for transmitting data from the network to the UE includes a random access channel (RACH) for transmitting an initial control message and an uplink shared channel (SCH) for transmitting other user traffic or control messages.

Examples of a logical channel existing at an upper layer of the transport channel and mapped to the transport channel include a broadcast control channel (BCCH), a paging control channel (PCCH), a common control channel (CCCH), a multicast control channel (MCCH), a multicast traffic Channel (MTCH), and the like.

The physical channel is constituted by several OFDM symbols in a time domain and several sub-carriers in a frequency domain. One sub-frame is composed of the plurality of OFDM symbols in the time domain. A resource block as a resource allocation unit is constituted by the plurality of OFDM symbols and a plurality of sub-carriers. In addition, each subframe may use specific subcarriers of specific OFDM symbols (e.g., first OFDM symbol) of the corresponding subframe for a physical downlink control channel (PDCCH), i.e., an L1/L2 control channel. A transmission time interval (TTI) is a time unit of subframe transmission.

Figure 5:
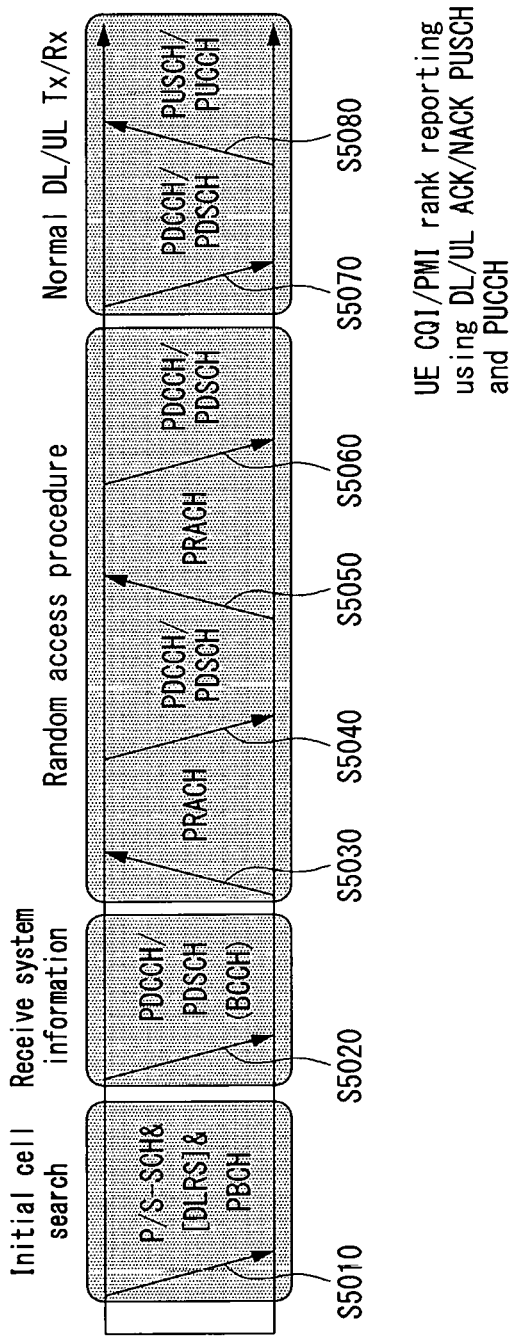
FIG. 5 is a diagram for describing physical channels used in a 3GPP LTE/LTE-A system and a general signal transmitting method using the same to which the present invention may be applied.

FIG. 5 is a diagram for describing physical channels used in a 3GPP LTE/LTE-A system and a general signal transmitting method using the same to which the present invention may be applied.

In step S5010, the UE that is powered on again while being powered off or enters a new cell performs an initial cell search operation such as synchronizing with the BS. To this end, the UE receives a primary synchronization channel (P-SCH) and a secondary synchronization channel (S-SCH) from the BS and synchronizes with the BS and acquires information such as a cell ID or the like.

Thereafter, the UE may receive a physical broadcast channel (PBCH) signal from the BS and obtain the in-cell broadcast information. Meanwhile, the UE receives a downlink reference signal (DL RS) in an initial cell search step to check a downlink channel status.

Upon completion of the initial cell search, the UE receives the PDCCH and the PDSCH according to PDCCH information in step S5020 to obtain more specific system information.

Then, the UE may perform a random access procedure such as steps S5030 to S5060 to complete the access to the BS. To this end, the UE may transmit the preamble through a physical random access channel (PRACH) (S5030) and receive a response message to the preamble through the PDCCH and the PDSCH corresponding thereto (S5040). In case of a contention-based random access, the UE may perform a contention resolution procedure such as transmission of an additional PRACH signal (S5050) and reception of a PDCCH signal and a PDSCH signal corresponding thereto (S506).

The UE that performs the above procedure may then receive the PDCCH signal and/or PDSCH signal (S5070) and/or a physical uplink shared channel (PUSCH) signals and/or a physical uplink control channel (PUCCH) signal (S5080) as a general uplink/downlink signal transmission procedure.

Control information transmitted from the UE to the BS is collectively referred to as uplink control information (UCI). The UCI includes HARQ-ACK/NACK, a scheduling request (SR), a channel quality indicator (CQI), a precoding matrix indicator (PMI), rank indication information, and the like.

In the LTE/LTE-A system, the UCI is generally transmitted periodically through the PUCCH, but may be transmitted through the PUSCH when the control information and traffic data are to be transmitted simultaneously. Further, the UCI may be transmitted aperiodically through the PUSCH according to a request/instruction of the network.

Figure 6:
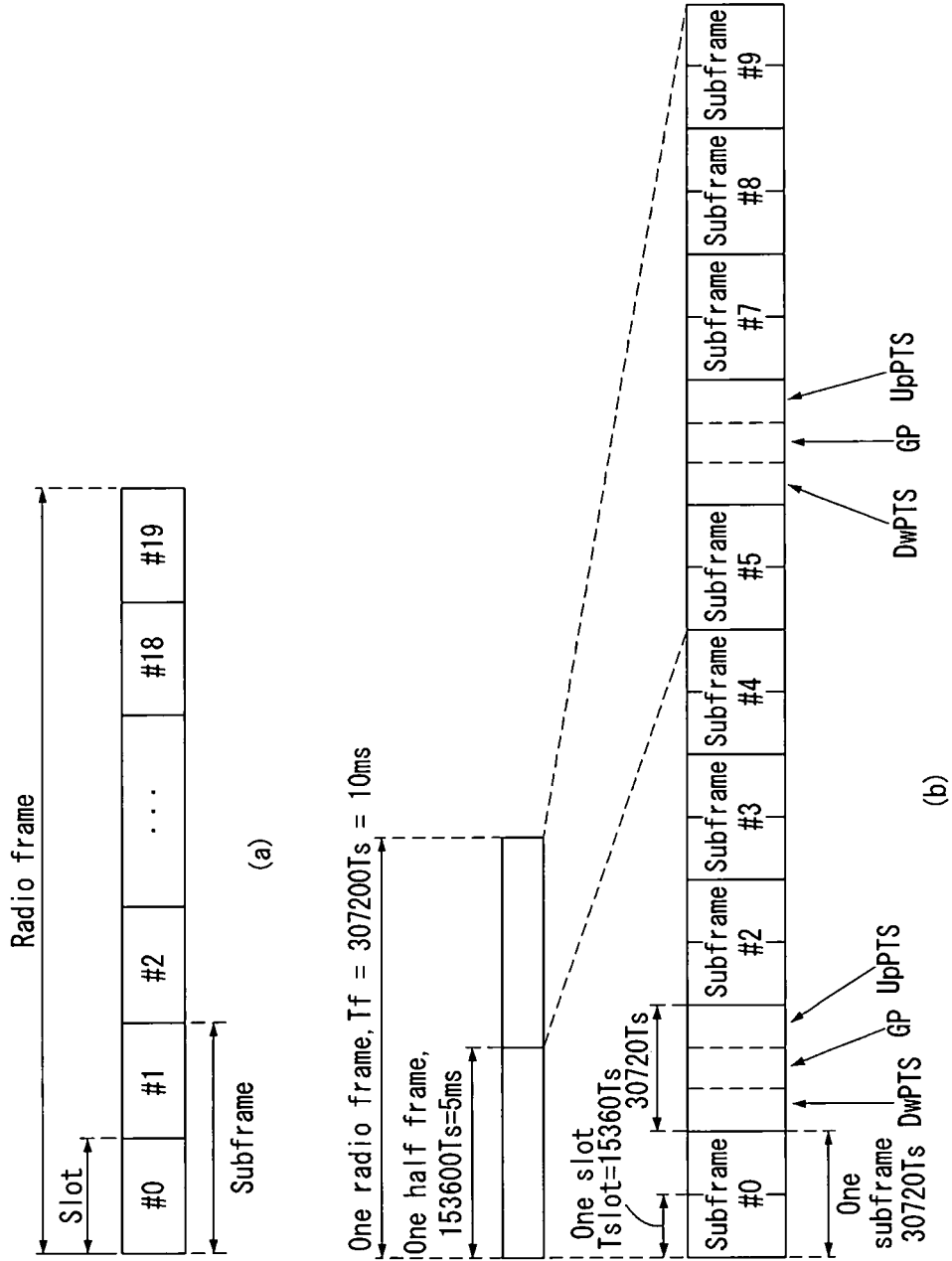
FIG. 6 illustrates one example of an architecture of a radio frame in 3GPP LTE/LTE-A to which the present invention may be applied.

FIG. 6 illustrates one example of an architecture of a radio frame in 3GPP LTE/LTE-A to which the present invention may be applied.

A radio frame means a unit of data exchanged and carried by various protocols or a unit of exchanging data, and may be referred to as a PDU.

In a cellular OFDM wireless packet communication system, uplink/downlink data packet transmission is performed by the unit of a subframe and one subframe is defined as a predetermined time interval including multiple OFDM symbols. A 3GPP LTE/LTE-A standard supports radio frame structure type 1 applicable to frequency division duplex (FDD) and radio frame structure type 2 applicable to time division duplex (TDD). According to the FDD scheme, uplink transmission and downlink transmission are performed while occupying different frequency bands. According to the TDD scheme, uplink transmission and downlink transmission are performed while occupying different frequency bands. A channel response of the TDD scheme is substantially reciprocal. This means that a downlink channel response and an uplink channel response are almost the same in a given frequency domain. Therefore, in a TDD-based wireless communication system, it is advantageous in that the downlink channel response may be obtained from the uplink channel response. In the TDD scheme, downlink transmission by the BS and uplink transmission by the UE may not be simultaneously performed since the uplink transmission and the downlink transmission are time-divisional in the entire frequency band. In the TDD system in which the uplink transmission and the downlink transmission are divided by the unit of the subframe, the uplink transmission and the downlink transmission are performed in different subframes.

FIG. 6(a) above illustrates an architecture of radio frame type 1. A downlink radio frame is constituted by 10 subframes and one subframe is constituted by two slots in the time domain. A time required for transmitting one subframe is referred to as a transmission time interval (TTI). For example, a length of one subframe may be 1 ms and the length of one slot may be 0.5 ms. One slot includes a plurality of orthogonal frequency division multiplexing (OFDM) symbols in the time domain and includes a plurality of resource blocks (RBs) in the frequency domain. Since the 3GPP LTE/LTE-A uses OFDMA in the downlink, the OFDM symbol is intended to represent one symbol period. The OFDM symbol may be referred to as one SC-FDMA symbol or symbol period. A resource block as a resource allocation unit includes a plurality of consecutive subcarriers in one slot.

The number of OFDM symbols included in one slot may vary according to a configuration of a cyclic prefix (CP). The CP includes an extended CP and a normal CP. For example, when the OFDM symbol is configured by the normal cyclic prefix, the number of OFDM symbols included in one slot may be seven. When the OFDM symbol is configured by the extended cyclic prefix, since the length of one OFDM symbol increases, the number of OFDM symbols included in one slot is smaller than that of the normal cyclic prefix. In the case of the extended cyclic prefix, for example, the number of OFDM symbols included in one slot may be six. If a channel condition is unstable like a case where the UE moves at a high speed, the extended cyclic prefix may be used to further reduce intersymbol interference.

When the normal cyclic prefix is used, one slot includes 7 OFDM symbols, so one subframe includes 14 OFDM symbols. In this case, first maximum three OFDM symbols of each subframe may be allocated to the physical downlink control channel (PDCCH) and the remaining OFDM symbols may be allocated to the physical downlink shared channel (PDSCH).

FIG. 6(b) above illustrates frame structure type 2. Radio frame type 2 is constituted by two half frames, each half frame is constituted by five subframes, and one subframe is constituted by two slots. In particular, a special subframe among five subframes is constituted by a downlink pilot time slot (DwPTS), a guard period (GP), and an uplink pilot time slot (UpPTS). The DwPTS is used for initial cell search, synchronization, or channel estimation in the UE. The UpPTS is used to match the channel estimation at the BS and uplink transmission synchronization of the UE. The guard period is a period for eliminating interference caused in the uplink due to a multi-path delay of a downlink signal between the uplink and the downlink.

The architecture of the radio frame is merely an example and the number of subframes included in the radio frame or the number of slots included in the subframe and the number of symbols included in the slot may be variously changed.

Figure 7:
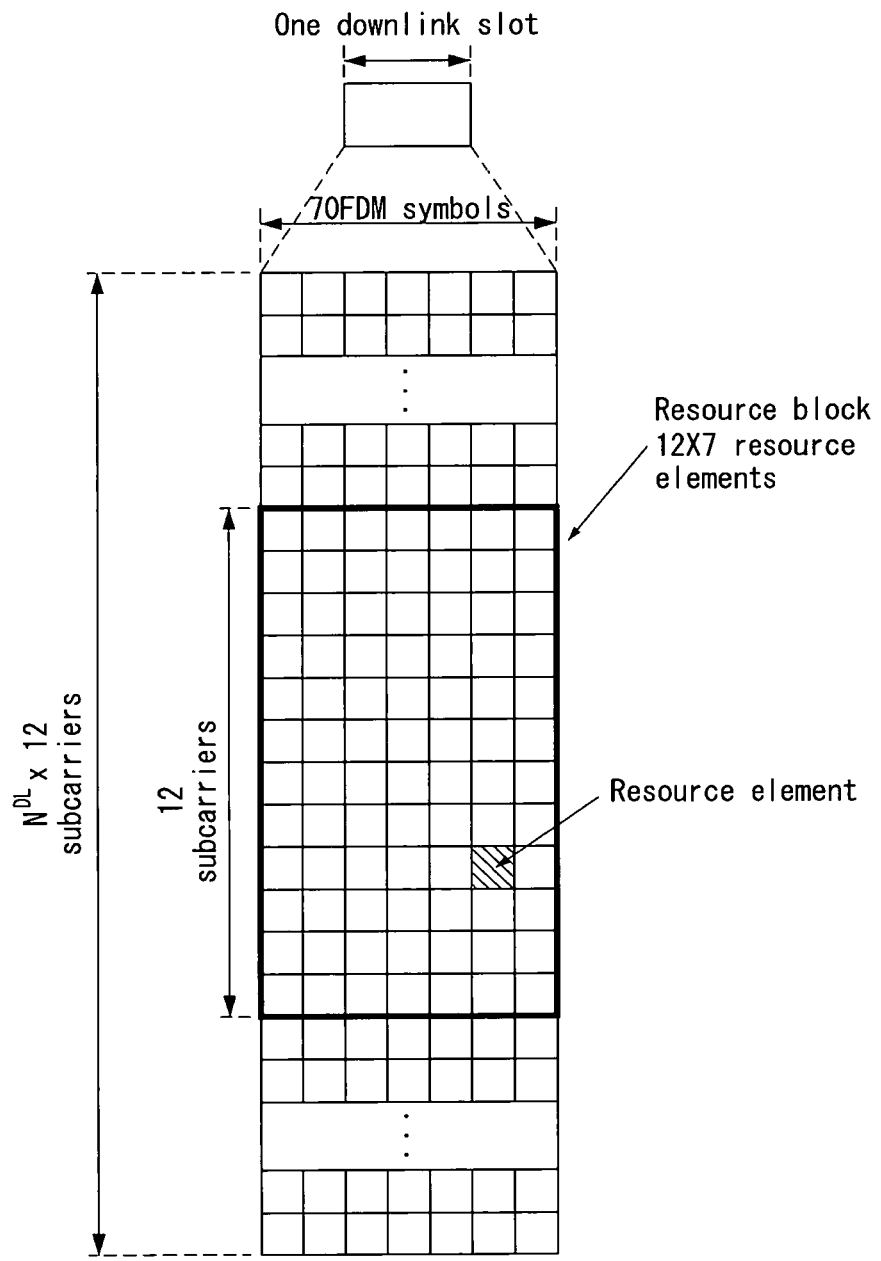
FIG. 7 is a diagram exemplifying a resource grid for one downlink slot in a wireless communication system to which the present invention may be applied.

FIG. 7 is a diagram exemplifying a resource grid for one downlink slot in a wireless communication system to which the present invention may be applied.

Referring to FIG. 7 above, one downlink slot includes the plurality of OFDM symbols in the time domain. Here, it is exemplarily described that one downlink slot includes 7 OFDM symbols, and one resource block includes 12 subcarriers in the frequency domain, but the present invention is not limited thereto.

Each element on the resource grid is referred to as a resource element (RE) and one resource block includes 12×7 resource elements. The resource element on the resource grid may be identified by an in-slot index pair (k, l). Here, k (k=0, . . . , NRB×12−1) represents a frequency-domain internal carrier index and l (l=0, . . . , 6) represents an in-time domain OFDM symbol index. The number NRB of resource blocks included in THE downlink slot depends on a downlink transmission bandwidth. The structure of the uplink slot may be the same as the structure of the downlink slot.

Figure 8:
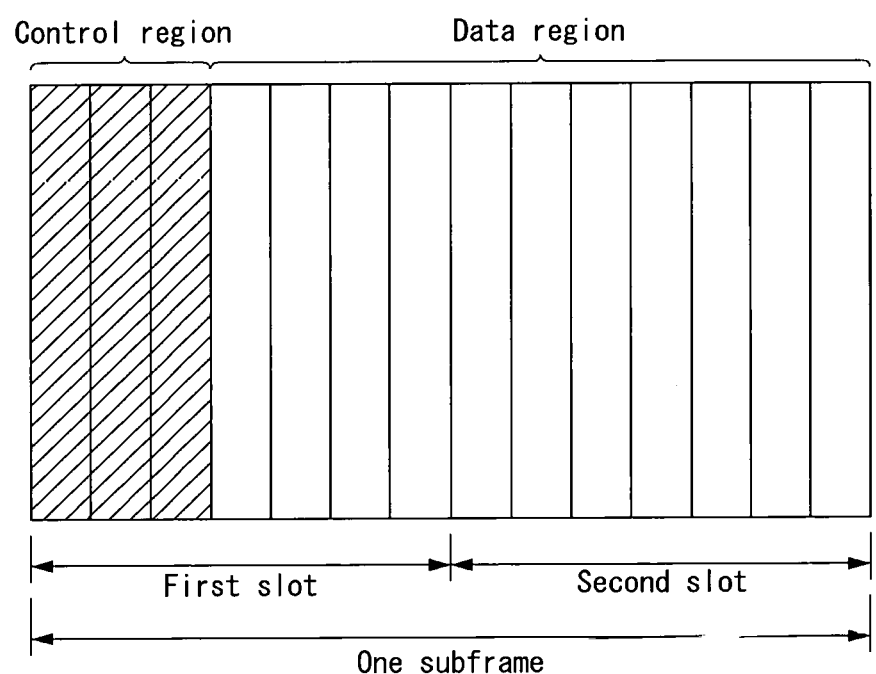
FIG. 8 illustrates an architecture of a downlink subframe in a wireless communication system to which the present invention may be applied.

FIG. 8 illustrates an architecture of a downlink subframe in a wireless communication system to which the present invention may be applied.

Referring to FIG. 8, a maximum of first three OFDM symbols in a first slot in the subframe are control regions in which control channels are allocated and the remaining OFDM symbols are data regions in which PDSCHs are allocated. Examples of downlink control channels used in 3GPP LTE/LTE-A include PCFICH, PDCCH, PHICH, and the like.

The PCFICH is transmitted in the first OFDM symbol of the subframe and carries information on the number (i.e., a size of the control region) of OFDM symbols used for transmission of the control channels in the subframe. The PHICH is a response channel to the uplink and carries an ACK/NACK signal for the HARQ. Control information transmitted through the PDCCH is referred to as downlink control information (DCI). The downlink control information includes uplink resource allocation information, downlink resource allocation information, or an uplink transmission (Tx) power control command for an arbitrary UE group.

The BS determines a PDCCH format according to the DCI to be sent to the UE and attaches cyclic redundancy check (CRC) to the control information. The CRC is masked with a radio network temporary identifier (RNTI) according to an owner or a purpose of the PDCCH. The CRC may be masked with a unique identifier (e.g., cell-RNTI (C-RNTI)) of the UE in the case of the PDCCH for specific UE. Alternatively, in the case of the PDCCH for the paging message, the CRC may be masked with a paging indication identifier (e.g., paging-RNTI (P-RNTI)). In the case of the PDCCH for a system information block (SIB), the CRC may be masked with a system information-RNTI (SI-RNTI). Further, the CRC may be masked with a random access-RNTI (RA-RNTI) in order to indicate a random access response which is a response to transmission of a random access preamble of the UE.

Figure 9:
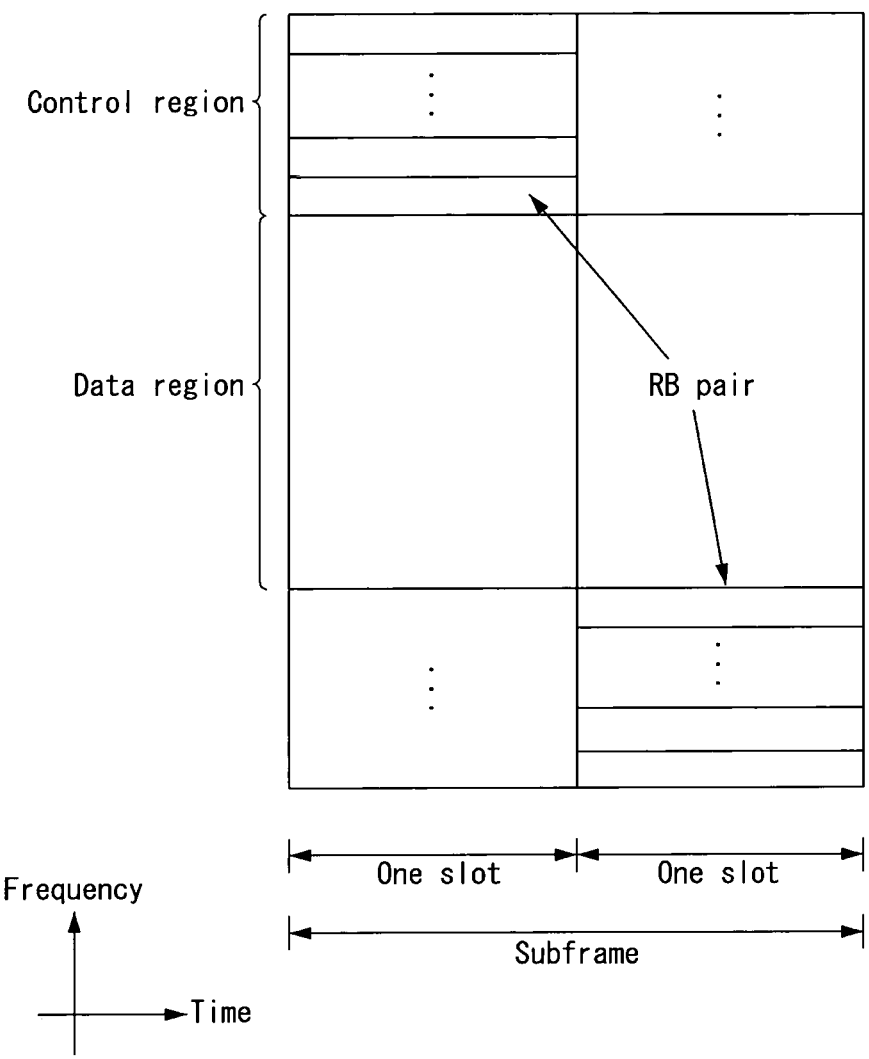
FIG. 9 illustrates an architecture of an uplink subframe in a wireless communication system to which the present invention may be applied.

FIG. 9 illustrates an architecture of an uplink subframe in a wireless communication system to which the present invention may be applied.

Referring to FIG. 9, the uplink subframe may be divided into the control region and the data region in the frequency domain. The PUCCH carrying the uplink control information is allocated to the control region. The PUSCH carrying the user data is allocated to the data region. When the data region is indicated by the upper layer, the UE may support simultaneous transmission of the PUSCH and the PUCCH. The resource block pair within the subframe is allocated to the PUCCH for one UE. The resource blocks which belong to the resource block pair allocated to the PUCCH occupy different subcarriers in two slots, respectively based on a slot boundary. In this case, the resource block pair allocated to the PUCCH frequency-hops in the slot boundary.

Physical Downlink Control Channel (PDCCH)

Control information transmitted through the PDCCH is referred to as a downlink control indicator (DCI). The size and the purpose of the control information vary according to the DCI format and the PDCCH may vary in size according to a coding rate.

Table 1 shows the DCI depending on the DCI format.

TABLE 1

| DCI format | Objectives |
|---|---|
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |
| 4 | the scheduling of PUSCH in one UL cell with multi-antenna port transmission mode |

Referring to Table 1, the DCI includes format, format 0 for PUSCH scheduling, format 1 for scheduling one PDSCH codeword, format 1A for compact scheduling of one PDSCH codeword, format 1C for simple scheduling, format 2 for PDSCH scheduling in a closed-loop spatial multiplexing mode, format 2A for PDSCH scheduling in an open loop spatial multiplexing mode, formats 3 and 3A for transmission of a transmission power control (TPC) command, and format 4 for PUSCH scheduling in one uplink cell in a multi-antenna port transmission mode.

DCI format 1A may be used for PDSCH scheduling regardless of which transmission mode is set in the UE.

Such DCI format may be independently applied for each UE and the PDCCHs of multiple UE in one subframe may be simultaneously multiplexed.

The PDCCH is configured by one control channel element or an aggregation of several consecutive control channel elements (CCEs). The CCE is a logical allocation unit used to provide the PDCCH with the coding rate according to a state of a radio channel. The CCE is a unit corresponding to nine sets of REGs consisting of four resource elements. The BS may use {1, 2, 4, 8} CCEs in order to configure one PDCCH signal and {1, 2, 4, 8} in this case is called a CCE aggregation level.

The number of CCEs used for transmission of a specific PDCCH is determined by the BS according to the channel state. The PDCCH configured according to each UE is interleaved and mapped into a control channel region of each subframe according to a CCE-to-RE mapping rule. The location of the PDCCH may vary depending on the number of OFDM symbols for the control channel of each subframe, the number of PHICH groups, a transmission antenna, and a frequency transition.

As described above, channel coding is independently performed on the PDCCH of each multiplexed UE and the cyclic redundancy check (CRC) is applied. The CRC is masked with a unique identifier (UE ID) of each UE to allow the UE to receive the PDCCH thereof. However, in the control region allocated in the subframe, the BS does not provide information on where the corresponding PDCCH is located to the UE.

Since the UE may not know at which position, at which CCE aggregation level or DCI format the PDCCH of the UE is transmitted in order to receive the control channel transmitted from the BS, the UE monitors an aggregation of PDCCH candidates in the subframe to find the PDCCH of the UE. This is called blind decoding (BD). The blind decoding may be referred to as blind detection or blind search. The blind decoding refers to a method in which the UE de-masks the CRC part with the UE ID and then checks a CRC error to verify whether the corresponding PDCCH is the control channel of the UE.

Hereinafter, an RRC state and an RRC connection method of the UE will be described.

The RRC state refers to whether the RRC layer of the UE is logically connected with the RRC layer of the E-UTRAN and a case where the RRC layer of the UE is connected with the RRC layer of the RRC layer of the E-UTRAN is called an RRC connected state and a case where the RRC layer of the UE is not connected with the RRC layer of the E-UTRAN is called an RRC idle state. Since the RRC connection exists in the UE in the RRC connected state, the E-UTRAN may determine the existence of the corresponding UE by the unit of the cell, thereby effectively controlling the UE.

On the contrary, the UE in the RRC idle state may not be determined by the E-UTRAN and is managed by the unit of a tracking area which is a larger region unit than the cell by a core network (CN). That is, it is determined only whether the UE in the RRC idle state exists by the unit of the larger region and the UE in the RRC idle state needs to move to the RRC connected state in order to receive a normal mobile communication service such as voice and data.

When a user first turns on a power of the UE, the UE first searches an appropriate cell and then stays in the RRC idle state in the corresponding cell. When the UE in the RRC idle state needs to establish an RRC connection, the UE in the RRC idle state establishes the RRC connection with the E-UTRAN through an RRC connection procedure and transitions to the RRC connection state. There are multiple cases where the UE in the RRC idle state needs to establish the RRC connection and for example, uplink data transmission is required due to a call attempt of the user or a paging message is received from the E-UTRAN, the case may correspond to response message transmission thereto.

A non-access stratum (NAS) layer positioned above the RRC layer performs such as session management and mobility management.

In the NAS layer, two states of EPS mobility management-registered (EMM-REGISTERED) and EMM-deregistered are defined in order to management the mobility of the UE and the two states are applied to the UE and the MME. Initial UE is in the EMM-deregistered state and the UE performs a process of registering the UE in the corresponding network through an initial attach procedure in order to access the network. When the attach procedure is successfully performed, the UE and the MME are in the EMM-registered state.

Two states of an EPS connection management (ECM)-IDLE state and an ECM-CONNECTED state are defined in order to manage signaling connection between the UE and the EPC and the two states are applied to the UE and the MME. When the UE in the ECM-IDLE state establishes the RRC connection with the E-UTRAN, the corresponding UE becomes in the ECM-connected state.

When the MME in the ECM-idle state establishes the S1 connection with the E-UTRAN, the MME becomes in the ECM-connected state. When the UE is in the ECM-IDLE state, the E-UTRAN has no context information of the UE. Accordingly, the UE in the ECM-idle state performs a UE-based mobility-related procedure such as cell selection or cell reselection without receiving the command of the network. On the contrary, when the UE is in the ECM-connected state, the mobility of the UE is managed by the command of the network. When the position of the UE in the ECM-idle state is different from a position known by the network, the UE notifies the corresponding position of the UE to the network through a tracking area update procedure.

Next, the system information will be described.

The system information includes essential information which the UE needs to know in order to access the BS. Therefore, the UE needs to all of the system information before accessing the BS and further, needs to continuously latest system information. In addition, since the system information is information which all UE in one cell needs to know, the BS periodically transmits the system information.

According to Section 5.2.2 of 3GPP TS 36.331 V8.7.0 (2009-09) "Radio Resource Control (RRC); Protocol specification (Release 8)", the system information is divided into a master information block (MIB), a scheduling block (SB), and a system information block (SIB). The MIB allows the UE to know a physical configuration of the cell, for example, a bandwidth. The SB informs transmission information of the SIBs, for example, a transmission period. The SIB is a collection of the system information related to each other. For example, some SIBs only contain only information of an adjacent cell and some SIBs contain only information of the uplink radio channel used by the UE.

Figure 10:
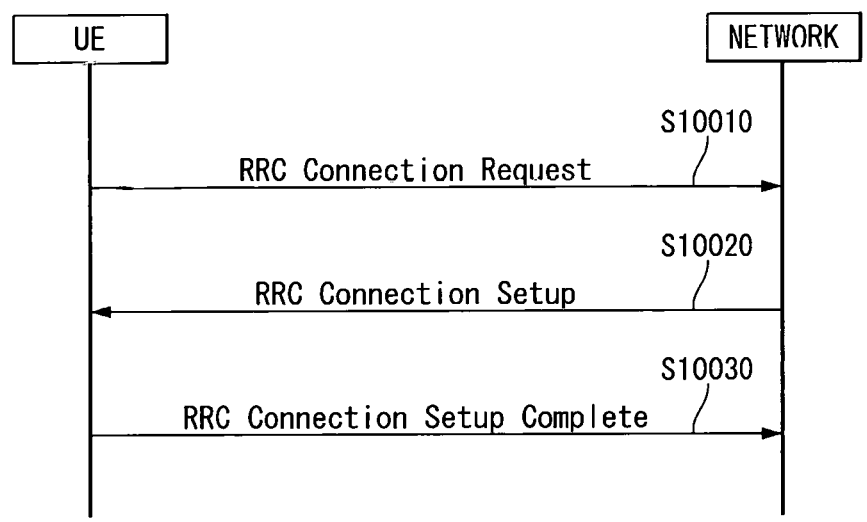
FIG. 10 is a flowchart illustrating a process of establishing RRC connection to which the present invention may be applied.

FIG. 10 is a flowchart illustrating a process of establishing RRC connection to which the present invention may be applied.

The UE transmits an RRC connection request message for requesting the RRC connection to the network (S10010). The network transmits an RRC connection setup message as a response to the RRC connection request (S10020). The UE enters an RRC connection mode after receiving the RRC connection setup message.

The UE transmits to the network an RRC connection setup complete message used for verifying successful completion of RRC connection establishment (S10030).

Figure 11:
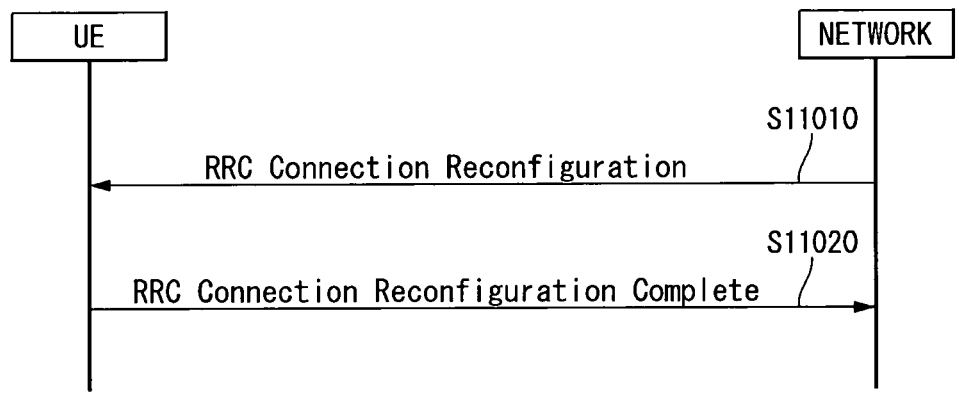
FIG. 11 is a flowchart illustrating an RRC connection reconfiguration process to which the present invention may be applied.

FIG. 11 is a flowchart illustrating an RRC connection reconfiguration process to which the present invention may be applied.

RRC connection reconfiguration is used to modify the RRC connection. This is used for establishment/modification/release, handover execution, measurement setup/modification/release of the radio bearer (RB).

The network transmits an RRC connection reconfiguration message for modifying the RRC connection to the UE (S11010). The UE transmits to the network an RRC connection reconfiguration complete message used for verifying successful completion of RRC connection reconfiguration as a response to the RRC connection reconfiguration (S11020).

Uplink Resource Allocation Procedure

In the 3GPP LTE/LTE-A system, a scheduling-based data transmission/reception method of the BS is used to maximize utilization of resources. This means that when there is data to be transmitted by the UE, the BS may firstly request the uplink resource allocation to the BS and transmit data using only the uplink resources allocated from the BS.

Figure 12:
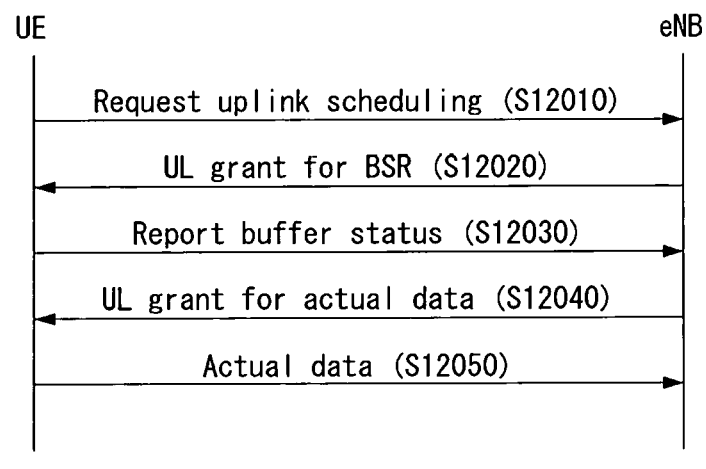
FIG. 12 is a diagram exemplifying an uplink resource allocation process of a UE in a wireless communication system to which the present invention may be applied.
Figure 12:
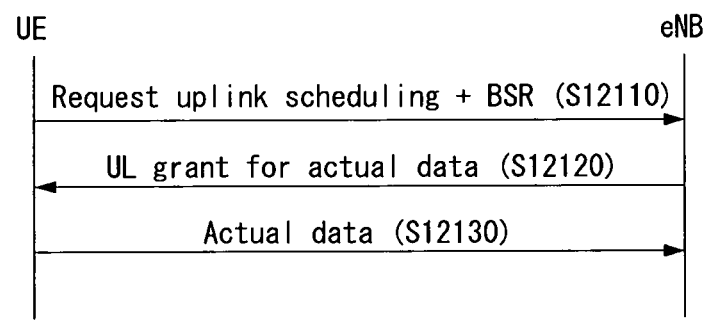

FIG. 12 is a diagram exemplifying an uplink resource allocation process of a UE in a wireless communication system to which the present invention may be applied.

In order to efficiently use the uplink radio resource, the BS needs to know what types of data and how much data is to be transmitted on the uplink for each UE. Accordingly, the UE may directly transmit information on uplink data to be transmitted to the BS and the BS may allocate the uplink resource to the UE based on the information. In this case, the information on the uplink data transmitted from the UE to the BS is referred to as a buffer status report (BSR) as the amount of the uplink data stored in a buffer. The BSR is transmitted using a MAC control element when the UE is allocated resources on the PUSCH in the current TTI and a reporting event is triggered.

FIG. 12(a) above illustrates an uplink resource allocation process for actual data when an uplink radio resource for buffer status reporting (BSR) is not allocated to the UE. That is, since a UE switching a state of an active mode in a DRX mode has no data resource which is allocated in advance, the UE needs to request the resource for the uplink data starting from SR transmission through the PUCCH and in this case, an uplink resource allocation procedure of 5 steps is used.

Referring to FIG. 12(a) above, when a PUSCH resource for transmitting the BSR is not allocated to the UE, the UE first transmits the scheduling request (SR) to the BS in order to allocate the PUSCH resource (S12010).

A reporting event occurs in the scheduling request, but when the UE does not schedule the radio resource onto the PUSCH at a current TTI, the scheduling request is used for the UE to request the PUSCH resource in order to be allocated the PUSCH resource for uplink transmission.

That is, the UE transmits the SR on the PUCCH when a regular BSR is triggered but does not have the uplink radio resource for transmitting the BSR to the BS. The UE transmits the SR through the PUCCH or initiates the random access procedure according to whether the PUCCH resource for the SR is configured. Specifically, the PUCCH resource in which the SR may be transmitted is configured by the upper layer (e.g., RRC layer) in a UE-specific manner. The SR configuration includes SR periodicity and SR offset information.

When receiving a UL grant for the PUSCH resource for the BSR transmission from the BS (S12020), the UE transmits the BSR triggered through the PUSCH resource allocated by the UL grant to the BS (S12030).

The BS checks the amount of data to be transmitted on the uplink by the actual BS through the BSR and transmits the UL grant for the PUSCH resource for the actual data transmission to the UE (S12040). The UE receiving the UL grant for the actual data transmission transmits actual uplink data to the BS through the allocated PUSCH resource (S12050).

FIG. 12(b) above exemplifies an uplink resource allocation process for actual data when the uplink radio resource for the BSR is allocated to the UE.

Referring to FIG. 12(b) above, when the PUSCH resource for transmitting the BSR is already allocated to the UE, the UE transmits the BSR through the allocated PUSCH resource and transmits the scheduling request to the BS together with the BSR (S12110). Next, the BS verifies the amount of data which the actual UE is to transmit on the uplink through the BSR and transmits the UL grant for the PUSCH resource for the actual data transmission to the UE (S12120). The UE receiving the UL grant for the actual data transmission transmits the actual uplink data to the BS through the allocated PUSCH resource (S12130).

Random Access Procedure (RACH Procedure)

Figure 13:
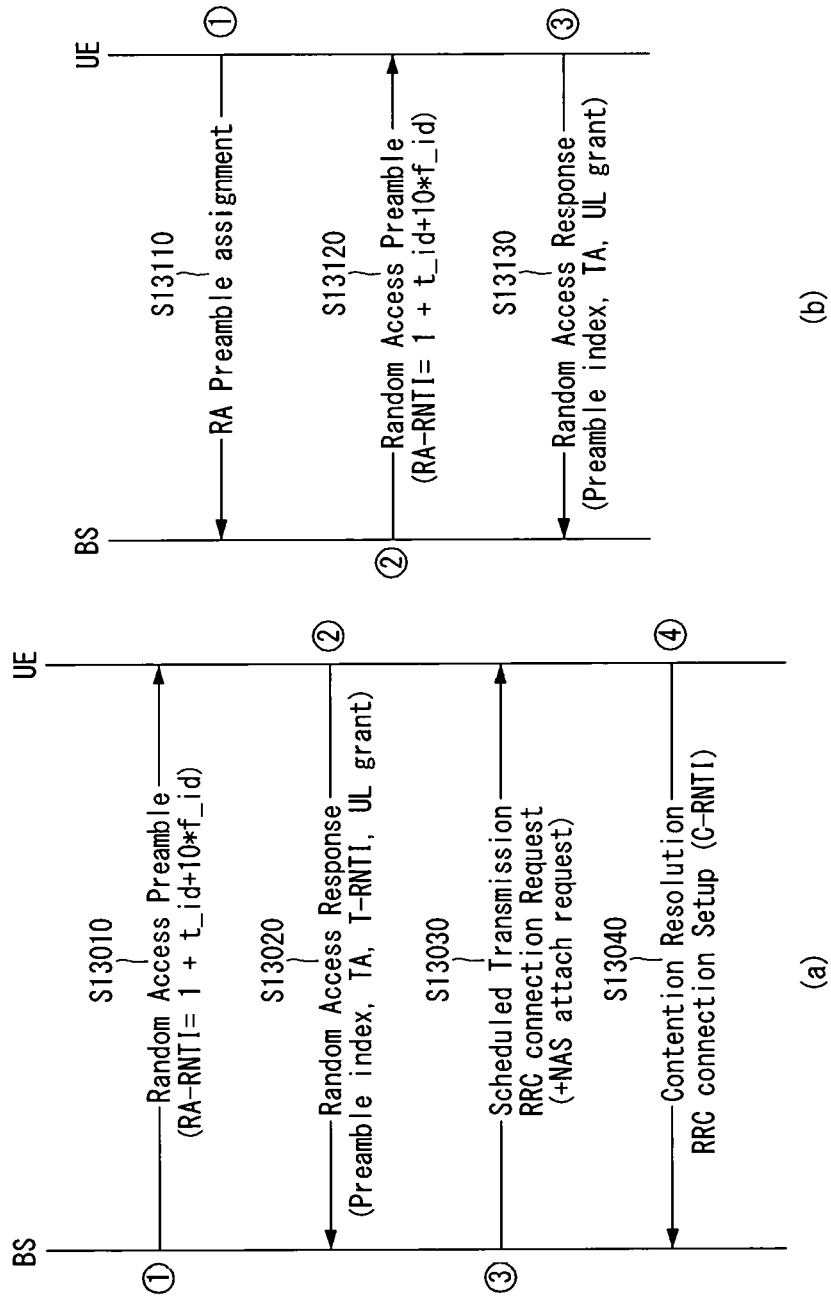
FIG. 13 illustrates one example of a random access procedure in an LTE system.

FIG. 13 illustrates one example of a random access procedure in an LTE system.

The random access procedure is performed at the initial access in the RRC_IDLE, the initial access after the radio link failure, handover requesting the random access procedure, and the uplink or downlink data generation requiring the random access procedure during the RRC_CONNECTED. Some RRC messages including an RRC connection request message, a cell update message, an UTRAN registration area (URA) update message, and the like are also transmitted by using the random access procedure. A logical channel common control channel (CCCH), a dedicated control channel (DCCH), and a dedicated traffic channel (DTCH) may be mapped to a transport channel RACH. The transport channel RACH is mapped to a physical random access channel (PRACH).

When the MAC layer of the UE instructs a UE physical layer to transmit the PRACH, the UE physical layer first selects one access slot and one signature and transmits A PRACH preamble to the uplink. The random access procedure is divided into a contention-based random access procedure and a non-contention based random access procedure.

FIG. 13(a) above illustrates an example of a contention based random access procedure and FIG. 13(b) above illustrates an example of a non-contention based random access procedure.

First, the contention-based random access procedure will be described with reference to FIG. 13(a) above.

The UE receives and stores information on the random access from the BS through the system information. Thereafter, when the random access is required, the UE transmits a random access preamble (also referred to as message 1) to the BS (S13010).

When the BS receives the random access preamble from the UE, the BS transmits a random access response message (also referred to as message 2) to the UE (S13020). Specifically, downlink scheduling information for the random access response message may be CRC-masked with a random access-radio network temporary identifier (RA-RNTI) and transmitted on an L1 or L2 control channel (PDCCH). The UE receiving the downlink scheduling signal masked with the RA-RNTI may receive and decode the random access response message from a physical downlink shared channel (PDSCH). Thereafter, the UE checks whether the random access response information indicated to the UE exists in the random access response message.

Whether there is the random access response information indicated to the UE may be confirmed by whether there is a random access preamble ID (RAID) for the preamble transmitted by the UE.

The random access response information includes timing alignment (TA) indicating timing offset information for synchronization, radio resource allocation information used in the uplink, temporary ID (e.g., temporary C-RNTI) for terminal identification, and the like.

When receiving the random access response information, the UE performs uplink transmission (also referred to as message 3) on the uplink shared channel (S-SCH) according to the radio resource allocation information included in the response information (S 13030). Here, the uplink transmission may be expressed as scheduled transmission.

After receiving the uplink transmission from the UE, the BS transmits a message (also referred to as message 4) for contention resolution to the UE through a downlink shared channel (DL-SCH).

First, the non-contention based random access procedure will be described with reference to FIG. 13(b) above.

Before the UE transmits the random access preamble, the BS allocates a non-contention random access preamble to the UE (S13110).

The non-contention random access preamble may be allocated through a handover command or dedicated signaling such as the PDCCH. When the UE is allocated the non-contention random access preamble, the UE transmits the non-contention random access preamble allocated to the BS (S13120).

Thereafter, the BS may transmit the random access response (also referred to as message 2) to the UE similar to step S2002 in the contention based random access procedure (S13130).

In the random access procedure described above, the HARQ is not applied to the random access response, but the HARQ may be applied to a message for uplink transmission or contention resolution for the random access response. Therefore, the UE does not need to transmit the ACK or NACK for the random access response.

Next, a UL data transmission method in LTE (-A) or 802.16 will be described in brief.

A cellular system such as an LTE(-A) system or an 802.16m system uses a BS scheduling-based resource allocation scheme.

A UE having data (i.e., UL data) to be transmitted in a system using the BS scheduling-based resource allocation scheme requests to the BS a resource for the corresponding data transmission before transmitting data.

Such a scheduling request by the UE may be performed through scheduling request (SR) transmission to the PUCCH or buffer status report (BSR) transmission to the PUSCH.

In addition, when resources to transmit the SR or BSR are not allocated to the UE, the UE may request the uplink resource to the BS through an RACH procedure.

The BS that receives the scheduling request from the UE allocates the uplink resource to be used by the corresponding UE to the UE through a downlink control channel (i.e., an UL grant message and a DCI for LTE(-A)).

In this case, the UL grant transmitted to the UE may be notified by explicitly signaling to which subframe resource the resource allocated to the UE corresponds, but the resource is allocated to a subframe after a specific time (e.g., 4 ms in the case of the LTE) to define an appointed time between the UE and the BS.

As described above, allocating, by the BS, the resources after Xms (e.g., 4 ms in the case of the LTE(-A)) to the UE means allocating, by the UE, the resources of the UE by considering both a time of receiving and decoding the UL grant and a time of preparing and encoding the data to be transmitted.

EMM and ECM States

EPS mobility management (EMM) and EPS connection management (ECM) states will be described.

Figure 14:
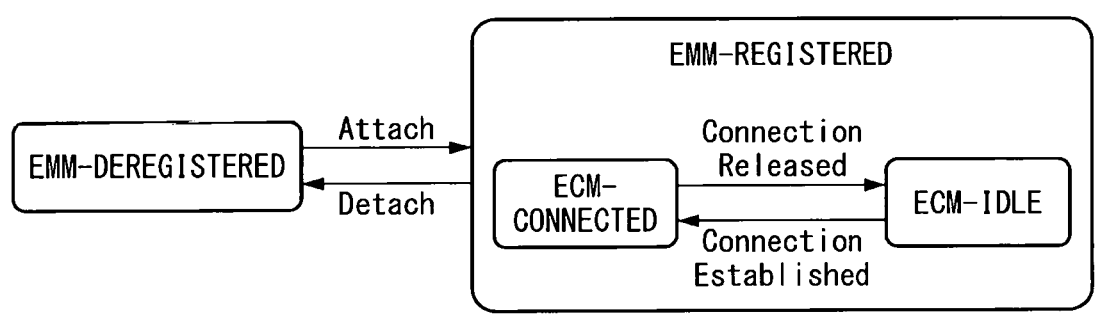
FIG. 14 is a diagram exemplifying EMM and ECM states in a wireless communication system to which the present invention may be applied.

FIG. 14 is a diagram exemplifying EMM and ECM states in a wireless communication system to which the present invention may be applied.

Referring to FIG. 14 above, in order to manage the mobility of the UE in the NAS layer located on the control planes of the MME and the UE, an EMM registered state and an EMM-deregistered state may be defined according to whether the UE is attached to or detached from the network. The EMM registered state and the EMM-deregistered state may be applied to the UE and the MME.

Like a case where the UE initially turns on the power, the initial UE is in the EMM-DEREGISTERED state and the UE performs a process of registering the UE in the corresponding network through the initial attach procedure in order to access the network. When the attach procedure is successfully performed, the UE and the MME are transitioned to the EMM-registered state. In addition, when the UE is powered off or the radio link is unsuccessful (when a packet error rate exceeds a reference value on the radio link), the UE is detached from the network and transitioned to the EMM-deregistered state.

Further, an ECM connected state and an ECM idle state may be defined in order to manage the signaling connection between the UE and the network. The ECM connected state and the ECM idle state may also be applied to the UE and the MME. The ECM connection is constituted by the RRC connection established between the UE and the BS and the S1 signaling connection established between the BS and the MME. That is, the ECM connection is configured/cancelled means that both the RRC connection and the S1 signaling connection are configured/cancelled.

The RRC state indicates whether the RRC layer of the UE and the RRC layer of the BS are logically connected. That is, when the RRC layer of the UE and the RRC layer of the BS are connected, the UE is in the RRC_CONNECTED state. When the RRC layer of the UE and the RRC layer of the BS are not connected, the UE is in the RRC_IDLE state.

The network may grasp the existence of the UE in the ECM connected state in a cell unit and effectively control the UE.

On the contrary, the network may not determine the existence of the UE in the ECM idle state and is managed by the unit of the tracking area which is the larger region unit than the cell by a core network (CN). When the UE is in the ECM idle state, the UE performs discontinuous reception (DRX) configured by the NAS using an ID uniquely allocated in the tracking area. That is, the UE may receive broadcasts of system information and paging information by monitoring the paging signal at a specific paging time for each UE-specific paging DRX cycle.

Further, when the UE is in the ECM idle state, the network has no context information of the UE. Accordingly, the UE in the ECM idle state performs a UE-based mobility-related procedure such as cell selection or cell reselection without receiving the command of the network. When the position of the UE in the ECM idle state is different from the position known by the network, the UE notifies the corresponding position of the UE to the network through a tracking area update (TAU) procedure.

On the contrary, when the UE is in the ECM connected state, the mobility of the UE is managed by the command of the network. The network knows the cell to which the UE belongs in the ECM connected state. Thus, the network may transmit and/or receive data to/from the UE, control mobility such as UE handover, and perform cell measurements for the adjacent cell.

As described above, in order for the UE to receive a normal mobile communication service such as voice or data, the UE needs to be transitioned to the ECM connected state. The initial UE is in the ECM idle state similar to the EMM state as in the case where the UE is first turned on and when the UE is successfully registered in the corresponding network through the initial attach procedure, the UE and the MME are transitioned to the ECM connected state. Further, when the UE is registered in the network but the traffic is inactivated and the radio resource is not thus allocated, the UE is in the ECM idle state and when new uplink or downlink traffic is generated in the UE, the UE and the MME is transitioned to the ECM connected state.

Next, an example of a wireless communication system architecture for supporting a next-generation RAN to which methods proposed by the present specification may be applied will be described with reference to FIGS. 15 to 17.

Figure 15:
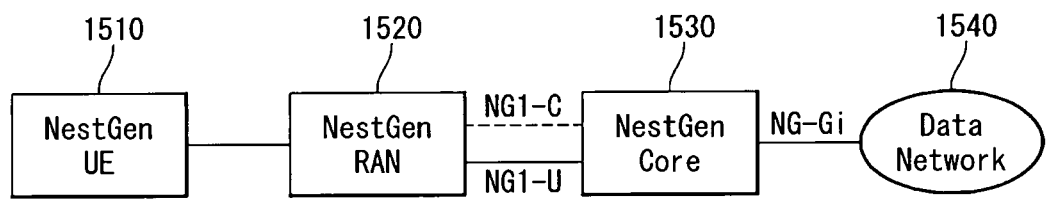
FIG. 15 is a diagram illustrating one example of a wireless communication system architecture for supporting a next-generation RAN to which methods proposed by the present specification may be applied.

FIG. 15 is a diagram illustrating one example of a wireless communication system architecture for supporting a next-generation RAN to which methods proposed by the present specification may be applied.

The wireless communication system structure for supporting the next-generation RAN may be expressed as a 'high level architecture'.

A next generation may be briefly expressed as "Next Gen" or the like and the next generation may collectively refer to terms referring to future communication generations including 5G and the like.

For easy description, the next generation will hereinafter be referred to as "Next Gen".

The structure of the "Next Gen" may support new RAT(s), evolved LTE, and non-3GPP access types.

Examples of the non-3GPP access types may include WLAN access, Fixed access, and the like.

In addition, the "Next Gen" structure supports a unified authentication framework for other access systems and supports simultaneous connection with multiple UE through multiple access technologies.

In addition, the "Next Gen" structure allows independent evolution of the core network and RAN and minimizes access dependency.

In addition, the "Next Gen" structure supports separation of control plane and user plane functions and supports transmission of IP packets, non-IP PDUs, and Ethernet frames.

Referring to FIG. 15, the "Next Gen" structure may include NextGen UE 1510, NextGen RAN 1520, NextGen Core 1530, and Data network 1540.

Here, in the wireless communication system of the "Next Gen", the UE may be expressed as 'NextGen UE', the RAN defining the radio protocol structure between the UE and the BS may be expressed as 'NextGen RAN', and the core network may be expressed as 'NextGen Core'.

As an example, 'NextGen RAN' may correspond to E-UTRAN in the LTE(-A) system, 'NextGen Core' may correspond to EPC in the LTE(-A) system, and network entities performing functions including MME, S-GW, P-GW, etc., in the LTE EPC may also be included in the NextGen Core.

An NG1-C interface and an NG1-U interface exist between the NextGen RAN and the NextGen Core and an NG-Gi interface exists between the NextGen Core and the Data Network.

Here, NG1-C represents a reference point for the control plane between the NextGen RAN and the NextGen Core and NG1-U represents a reference point for the user plane between the NextGen RAN and the NextGen Core.

Although not illustrated in FIG. 15 above, NG-NAS represents a reference point for the control plane between the NextGen UE and the NextGen Core.

Further, NG-Gi represents a reference point between the NextGen Core and the data network.

Here, the data network may be an operator external public network or a private data network or an intra-operator data network.

Figure 16:
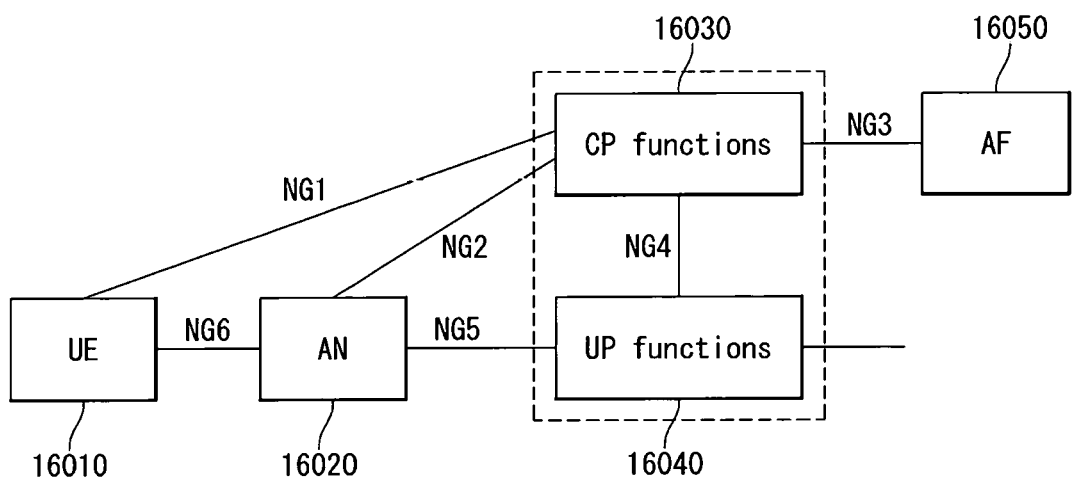
FIG. 16 is a diagram illustrating one example of a flow based QoS architecture to which the methods proposed by the present specification may be applied.

FIG. 16 is a diagram illustrating one example of a flow based QoS architecture to which the methods proposed by the present specification may be applied.

In particular, FIG. 16 specifically illustrates the interface between UE, AN, and AF in detail by dividing the NextGen Core of FIG. 15 above into a control plane (CP) function and a user plane (UP) function.

Referring to FIG. 16, a flow-based QoS handling method will be described in more detail.

Referring to FIG. 16, a policy of a quality of service (QoS) in a wireless communication system to which the present invention is applied may be stored and configured in a control plane (CP) function 16030 for the following reasons.

Application in a user plane (UP) function 29040 transmission in admission control (AN) 29020 and UE 16010

Hereinafter, parameters for defining the QoS framework will be described.

Flow Priority Indicator (FPI): represents a parameter for defining a priority of each flow process in UP functions 16040 and AN functions 16020. This corresponds to a scheduling priority and a priority in a congestion case.

Further, the FPI indicates whether the flow requires a guaranteed flow bit rate and/or a maximum flow bit rate.

Flow Descriptor: Packet filters related with a specific flow process. Identification in the uplink needs to be performed in the UE and the AN 1020, but is limited to layer 3 and layer 4.

Maximum Flow Bitrate (MFB): parameter indicating uplink and downlink bit rate values which may be applied for one flow or a combination of flows.

The parameter represents a maximum authorized bit rate authorized for a data flow.

Flow Priority Level (FPL): Parameter for defining a static significance of the flow for accessing the AN (16020) resource. Additionally, the FPL indicates whether to access an AN (16020) non-prioritized resource. The AN non-prioritized resource needs to be an allocated resource that is either pre-emptable or protected from pre-emption.

Session Bitrate: parameter indicating the bit rate value in the uplink and downlink for establishing a user session. The Session Bitrate parameter represents the maximum bit rate allowed for the user session.

The support of the GFP in the UE depends on a QoS design of the radio interface.

Figure 29:
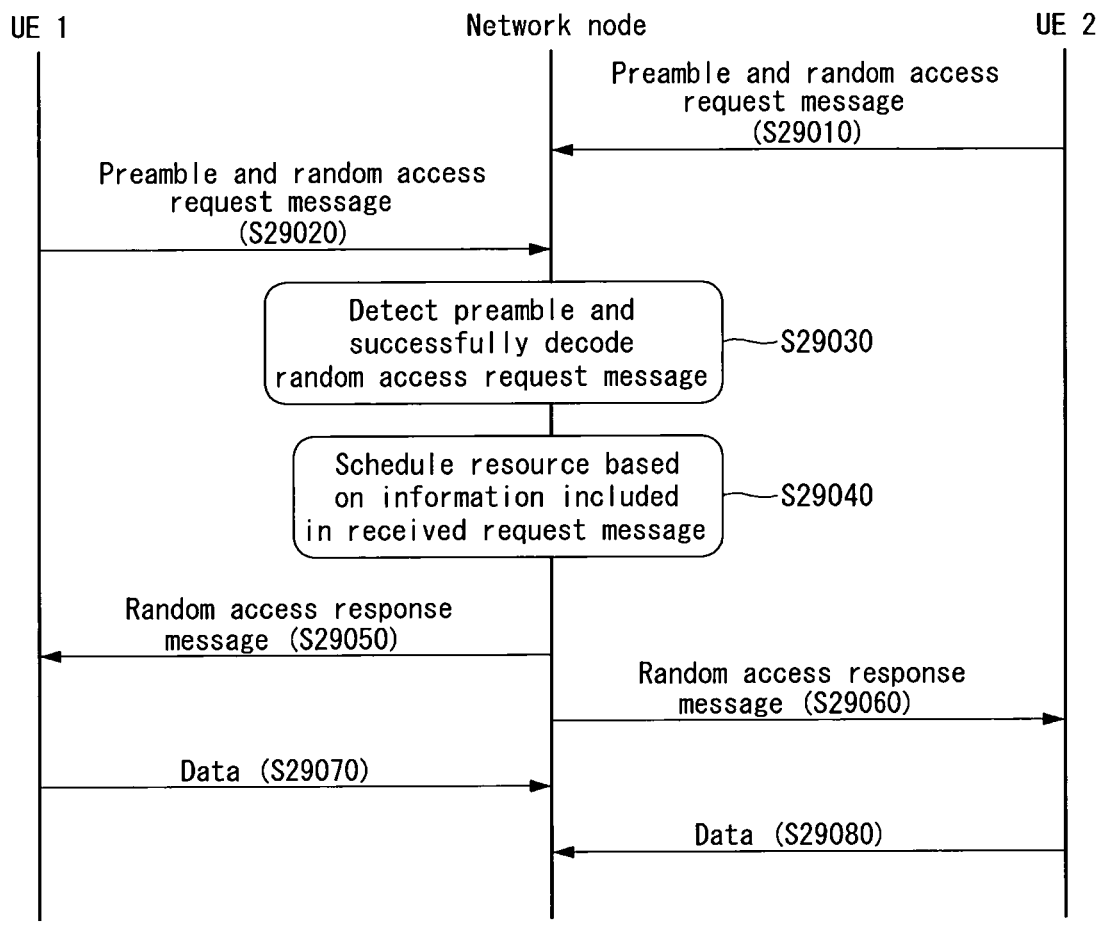
FIG. 29 is a flowchart illustrating one example of a method for differentially allocating resources according to information related with data transmitted from UEs by a network node to which the present invention may be applied.

As illustrated in FIG. 29 above, the CP functions and the UP functions are functions included in the NextGen CN (indicated by a dotted line) and may be implemented by one physical device or by different physical devices.

Figure 17:
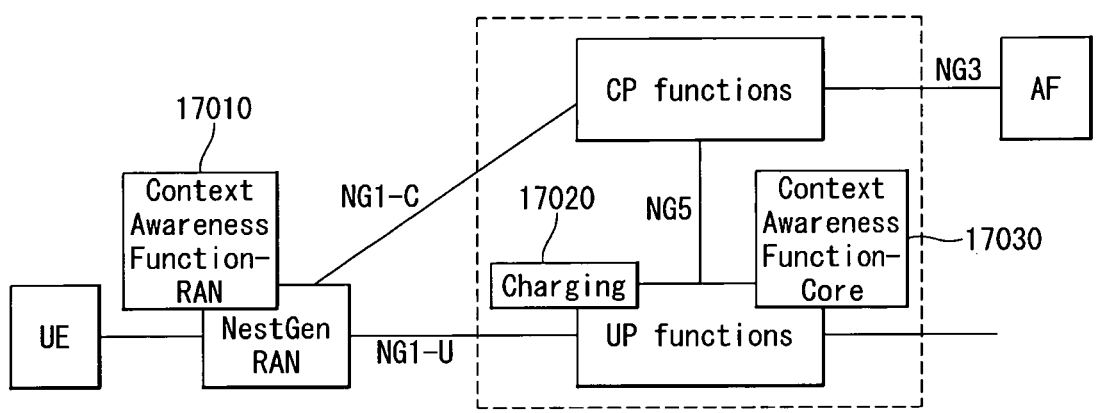
FIG. 17 is a diagram illustrating one example of an interaction between network functions and a function.

FIG. 17 is a diagram illustrating one example of a QoS architecture used in a QoS framework to which the methods proposed by the present specification may be applied.

Content Requirement Awareness Function in the Core (CAF-Core)

The CAF-Core 17030 supports a mechanism for identifying application sessions (e.g., downloading video, downloading web pages, listening to music, posting for a social media network, etc.) and enforcing QoS policies associated with the discovered applications.

The CAF-Core receives the QoS policies from a Core CP. Application discovery is accomplished by means of non-standardized algorithms (e.g., usage patterns, heuristics, SNF discovery for encrypted traffic, etc.).

The CAF performs QoS enforcement on the CN based on the QoS policies received from the Core Cp.

The CAF-Core may handle the QoS policies and obtain dynamic QoS targets and local enforcement actions in the CN.

In addition, the CAF-Core may update the dynamic QoS targets and the local enforcement actions in real time based on current content requirements of user plane traffic mix, simultaneous competing flows, and network status and resource availability within the limits of the QoS policies provided by the NG Core CP functions. As such, the CAF-Core enforces the QoS policies within the given policy limits and will not deviate out of any range.

Content Requirement Awareness Function in the RAN (CAF-RAN)

The CAF-RAN 17010 supports a mechanism for identifying the application sessions (e.g., downloading video, downloading web pages, listening to music, posting for a social media network, etc.) and enforcing the QoS policies.

The CAF-RAN receives the QoS policies from the Core CP. The CAF-RAN may use the application discovery information provided by the Core, the application discovery information may imply additional specific requirements for a certain application session, and at the same time, may form traffic for a given session. The CAF-RAN performs QoS enforcement based on the QoS policies received from the Core CP. This includes traffic forming for DL and UL. The DL traffic forming helps control the flow of UL traffic.

The CAF-RAN may handle the QoS policies and obtain the dynamic QoS targets and local enforcement actions in the RAN. In addition, the CAP-RAN may update the dynamic QoS targets and the local enforcement actions in real time based on the current content requirements of user plane traffic mix, simultaneous competing flows, and network status and resource availability within the limits of the QoS policies provided by the NG Core. As such, the CAF-RAN enforces the QoS policies within the given policy limits and will not deviate out of any range.

The RAN is limited by the charging performed in the core and thus has no effect on the charging performed in the UP function in the core. The amount of specific traffic charged by the core is provided to the RAN in conjunction with packet marking with application marking and the CAF-RAN enforces and conserves the charged capacity in relation to the bits.

Coordination Between CAF-Core and CAF-RAN

The CAF-Core may perform the application discovery and provide information in the form of the packet marking based on the policies received from the CN CP.

The traffic forming and the policy enforcement in the CAF-RAN are limited by the packet marking represented by the policies received from the CAF-Core and the CN CP. This helps the CAF-Core and the CAF-RAN to operate in a cooperative manner and the charging is also performed for the application represented by the CAF-Core.

Next, the CN CP function and the CN UP function will be described.

The CN CP function and the CN UP function may be implemented by one physical device or respective physical devices.

CN CP Function

The QoS policies are stored in the CN CP Functions. In session formation, Subscriber and application specific policies are transmitted to the RAN and the CAF which exists in the CN UP function.

CN UP Function

In the core, the UP function is responsible for traffic charging support (CDR, granted quota for on-line) based on policies that take into account an outcome of the CAF. Further, the CN UP function marks downlink traffic transmitted to the RAN.

Policy Provisioning and Enforcement

The operator supplies specific QoS policies to the subscribers and applications of the NG Core Cp function. The CP function of the Core provides the policies to the RAN and CN UP functions.

The enforcement actions are obtained from the policy points according to the current content requirements of the user plane traffic mix, simultaneous competing flows, and network status and resource availability.

Charging

Traffic charging (30020) support (CDR, granted quota for on-line) based on policies that take into account an outcome of the CAF is performed in the CN UP function.

Multiple Levels of Policies

The following shows different configurations of the QoS policies provided by the UP functions and the RAN.

Intent level QoS policies that show the configuration of floors may be identified by the packet marking, SDF descriptor, and the like in an abstract QoS target (e.g., Voice type Qos, Smoothed Bit rate Qos (limit the bandwidth variation for the traffic), bulk traffic (when a radio condition is bad or a load on the cell is excessive, the traffic may be discarded)).

Transmission QoS level policies that show the configuration of the floor may be identified by the packet marking, the SDF descriptors, etc. in explicit QoS targets (priority, delay, jitter, etc.).

The CP functions of the CAF-RAN and the CAF-Core are responsible for local CAF policies and Transport locally map Intent level QoS policies which belong to QoS level policies based on local (radio) conditions (current context of user plane traffic mix, simultaneous competing flows and network status and resource availability) and are limited by upper limits of Intent level QoS policies.

Parameters Required for QoS Framework

The following parameters are required for defining the QoS framework.

Policy description:

Scope of definition: Application name or application type

Definition of Intent: High Definition experience for RT Multimedia or explicit QoS target level (e.g., 150 ms maximum packet delay for IMS video)

Maximum Flow Bitrate: UL and DL bit rate values that may be applied for a single PDU session or a combination of PDU sessions for given UE.

Allocation and Retention Priority level (ARP): A priority level that indicates the per-emption capability and the pre-emption vulnerability for a given PDU session.

Figure 18:
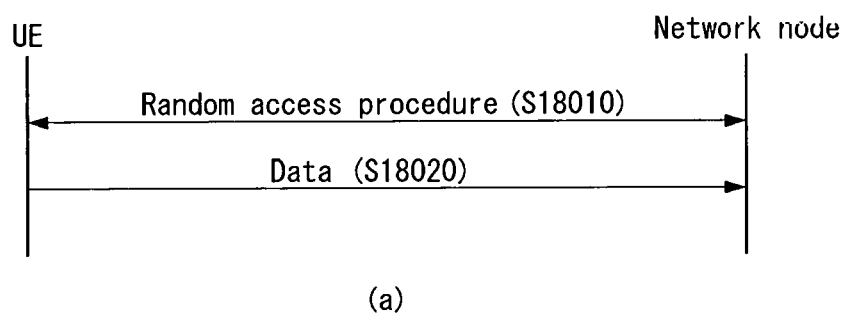
FIG. 18 is a flowchart illustrating one example of a method for transmitting uplink data in a state in which UE is not connected with a network node to which the present invention may be applied.
Figure 18:
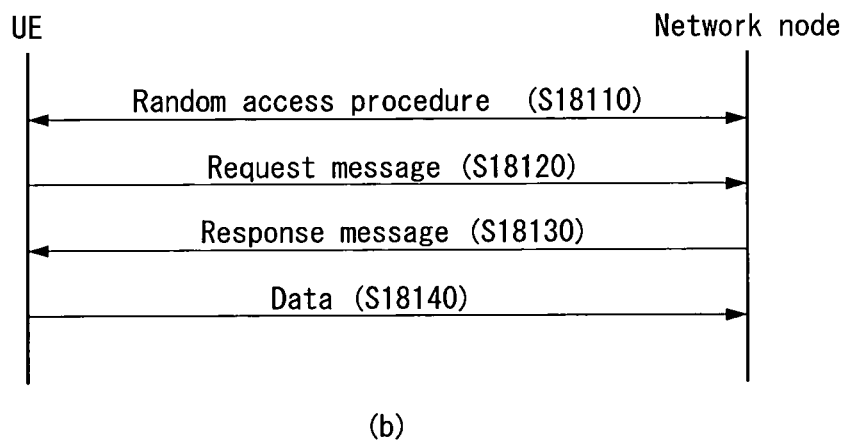

FIG. 18 is a flowchart illustrating one example of a method for transmitting uplink data in a state in which UE is not connected with a network node to which the present invention may be applied.

FIGS. 18(*a*) and 18(*b*) above illustrate a process in which the UE transmits uplink data by being allocated resources from the BS in a process of performing the random access procedure for establishing the connection with the BS.

In this case, the procedure for transmitting/receiving data in a state where the UE is not connected to the BS (for example, the RRC_Idle state and the ECM_Idle state) may be called a connectionless based data transmission procedure or an RRC connectionless transmission procedure.

Referring to FIG. 18(a) above, the UE performs the random access procedure to establish the connection with the BS (S18010). In this case, the random access procedure means performing only steps S13010 and S13020 described in FIG. 13(a) above.

That is, the random access procedure means only a step in which the UE transmits the random access preamble to the BS and receives the random access response message in response to the random access preamble.

In this case, the random access response message may include an index of a preamble discovered by the BS, timing alignment (TA) indicating timing offset information for synchronization, radio resource allocation information used in the uplink, temporary ID (e.g., temporary C-RNTI) for terminal identification, and the like.

When the resource allocated through the random access response message based on the radio resource allocation information is large enough to transmit the uplink data to be transmitted by the UE, the UE transmits the uplink data to the BS (or network node) through the allocated resource (S18020).

However, when the allocated resource is not large enough to transmit the uplink data, the UE requests a resource for transmission of the uplink data to transmit the uplink data as illustrated in FIG. 18(b).

That is, as illustrated in FIG. 18(a), when the resource allocated through the random access response message is not large enough to transmit the uplink data through the random access response message, the UE that performs the random access procedure transmits a resource request message in order to request the resource for transmitting the uplink data to the network node (S18110 and S18120).

The request message may include size information of the uplink data or size information of a resource to be allocated to request the resource for transmission of the uplink data.

The network node allocates the resource to the UE according to the request message and transmits the allocated resource information included in the response message to the UE (S18030).

The UE transmits the uplink data to the network node through the resource allocated by the network node (S18140).

In this manner, even when the UE is not connected with the network node, the UE may be allocated the resource from the network node and transmit the uplink data.

Figure 19:
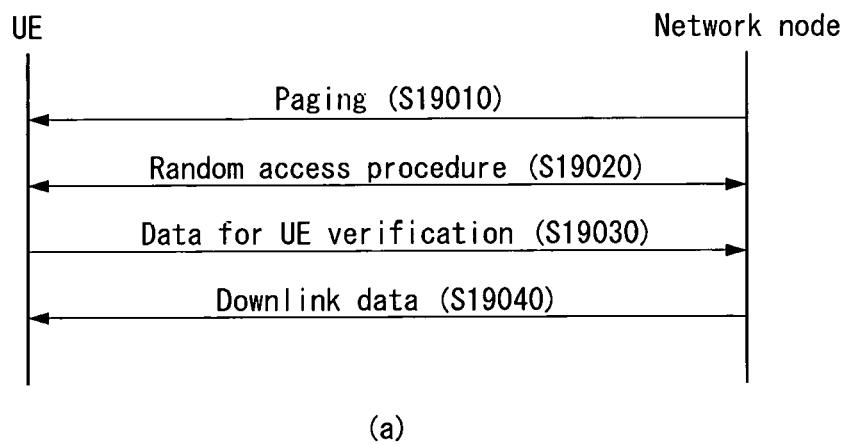
FIG. 19 is a flowchart illustrating one example of a method for receiving downlink data in a state in which UE is not connected with a network node to which the present invention may be applied.
Figure 19:
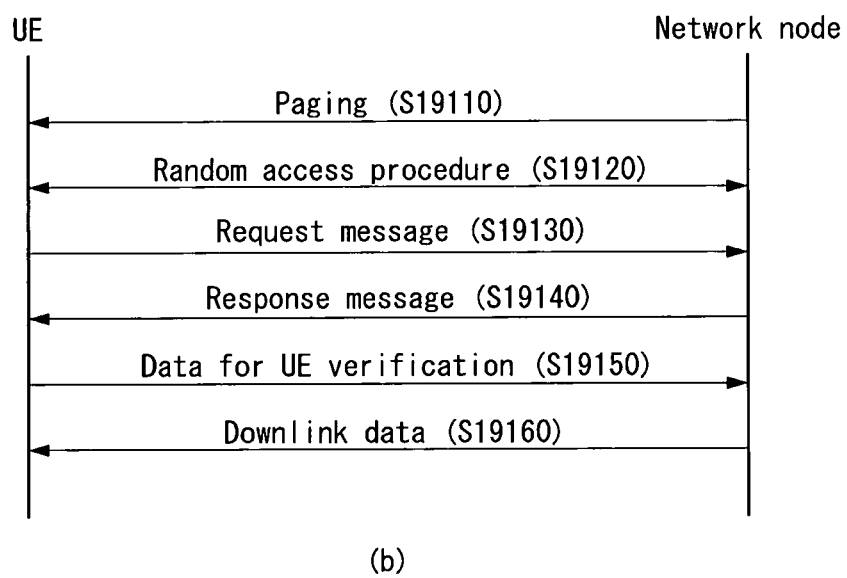

FIG. 19 is a flowchart illustrating one example of a method for receiving downlink data in a state in which UE is not connected with a network node to which the present invention may be applied.

FIGS. 19(a) and 19(b) above illustrate a process in which the UE transmits downlink data by being allocated resources from the BS in the process of performing the random access procedure for establishing the connection with the BS.

In this case, the procedure for transmitting/receiving data in a state where the UE is not connected to the BS (for example, the RRC_Idle state and the ECM_Idle state) may be called a connectionless based data transmission procedure or an RRC connectionless transmission procedure.

Referring to FIG. 19(a) above, when the downlink data transmitted to the UE is generated, the network node transmits a paging message to wake up the UE because the UE is not connected with the network node (S19010).

Thereafter, the UE and the network node perform the random access procedure in the same manner as in step 18010 of FIG. 18 above (S19020) and transmit data for verification of the UE to the network node through the resource allocated in the random access procedure (S19030).

The data for verifying the terminal may include a UE ID for identifying the UE, a security header type (e.g., not security protected, integrity protected, integrity protected and ciphered, etc.), a key set identifier for identifying a security context, a NAS count, and a message authentication code (MAC).

When verification of the UE is completed, the network node transmits the downlink data to the UE (S19040).

However, when the resource allocated through the random access procedure is not large enough to transmit the data for verifying the UE, the UE requests the resource to transmit the data for verifying the UE as illustrated in FIG. 19(b) above.

That is, as illustrated in FIG. 19(b) above, when the resource allocated through the random access response message is not large enough to transmit the data for verifying the UE, the UE that performs the random access procedure transmits the resource request message in order to request the resource for transmitting the data for verifying the UE to the network node (S19110, S19120, and S19130).

The request message may include size information of the data for verifying the UE or size information of a resource to be allocated to request the resource for transmission of the data for verifying the UE.

The network node allocates the resource to the UE according to the request message and transmits the allocated resource information included in the response message to the UE (S19140).

The UE transmits the data for verifying the UE to the network node through the resource allocated by the network node (S19150).

When the verification of the UE is completed, the network node transmits the downlink data to the UE (S19160).

In this manner, even when the UE is not connected with the network node, the UE may be allocated the resource from the network node and transmit the data for verifying the UE and receive the downlink data through the verification of the UE.

However, when the UE transmits data to the network node through a non-method as in the methods described with reference to FIGS. 18 and 19, since the required quality varies depending on the service, the resources need to be differentially allocated to the UE according to the requirement of the service.

For example, in the case of delay-sensitive services (e.g., delay sensitive service, low latency service, etc.) and services (e.g., delay tolerant service) with frequent traffic, the resources need to be differentially allocated to the UE according to the requirements of the respective services.

As an example of the delay-sensitive service, the following services may exist.

Ultra-high availability and reliability (e.g., 3D connectivity services such as life-friendly eHealth services and public safety service drone) having requirements shown in Table 2 below

TABLE 2

| No. 13 | Ultra-high availability and reliability | |
|---|---|---|
| Main Attributes | Requirement KPI | Notes |
| User Experienced Data Rate (also at the cell edge) | DL: 10Mbps UL: 10Mpbs | Data rate enabling real-time video and data transfers |
| E2E latency | 10 ms | (e.g. maps) |

TABLE 2-continued

| No. 13 | Ultra-high availability and reliability | |
|---|---|---|
| Main Attributes | Requirement KPI | Notes |
| Mobility | On demand, 0-500 km/h | |
| Device autonomy | >3 days (standard) Up to several years for some critical MTC services | |
| Connection Density | Not critical | |
| Traffic Density | Potentially high | |

Smart grid system with distributed sensors and management, which requires an immediate response Delay requirement <8 ms and message size of 200 to 1521 bytes Remote control (e.g., cloud robotics, industrial factory automatic)

Delay requirement ≤10 ms and message size of 100 bytes

As an example of the service with frequent traffic, the following services may exist.

Keep alive message service for maintaining application's own connection

Instant message service such as a user state change, etc.

Accordingly, the present invention proposes a method for transmitting data for providing the service by allocating the resources differentially to the UE according to the requirements of the service.

Figure 20:
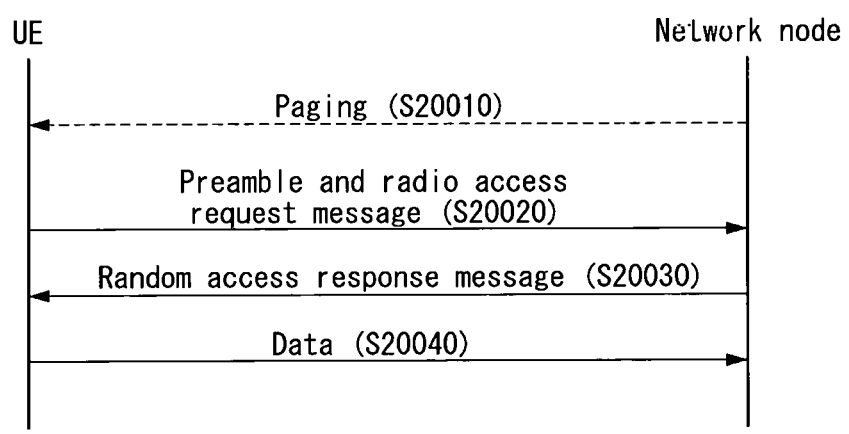
FIG. 20 is a flowchart illustrating one example of a method for allocating resources according to information of data to be transmitted by UE to which the present invention may be applied.

FIG. 20 is a flowchart illustrating one example of a method for allocating resources according to information of data to be transmitted by UE to which the present invention may be applied.

Referring to FIG. 20 above, the network node may allocate the resource to transmit data in a non-connected state to the UE based on information related to the preamble transmitted and data to be transmitted by the UE.

Specifically, there is a difference in random access between the connection-based transmission/reception system and the random access in the non-connection-based transmission/reception system as shown in Table 3 below.

TABLE 3

| | Connection based data transmission/reception | Non-connection based data transmission/reception |
|---|---|---|
| Random access purpose of UE | Acquisition of uplink resource Uplink data Information related to connection and mobility of UE | Acquisition of uplink resource Uplink data UE verification related information for receiving downlink data |
| Scheduling contention target in service aspect | Uplink data of each UE | Uplink data of each UE UE verification related information for receiving downlink data |
| Scheduling consideration element in service aspect | Uplink data quality characteristic of each UE | Uplink data quality characteristic of each UE Downlink data quality characteristic of each UE Data transmission direction (additionally considered because different transmission/reception delay occurs according to data transmission direction) |

As shown in Table 3 above, there is a need to allocate the resource in consideration of the transmission direction of the data because the delay which occurs varies depending on the characteristics of the uplink and downlink data as well as the data transmission direction in the non-connection based transmission/reception.

That is, the resource for transmitting the data is limited, and the priority of the resource allocation needs to be determined according to the requirement of the service provided by the UE.

Further, since the delay varies depending on whether the information related with the verification of the UE for receiving the uplink data or downlink data to be transmitted by the UE may be transmitted through the uplink resource acquired through the random access procedure, the size of the data needs to be also considered in the resource allocation.

One example of a matter which needs to be considered for the resource allocation may include a delay time when the data is to be transmitted, the transmission direction of the data, a state of a channel, a transmission rate per second, an error rate, through which scheduler the resource is scheduled, an algorithm for the resource allocation, and the like.

The matter to be considered for the resource allocation is referred to as scheduling information.

Accordingly, the BS needs to recognize the scheduling information and allocate the resources differentially according to the scheduling information.

To this end, the UE needs to transmit the scheduling information to the BS.

First, when the network node transmits the downlink data to the UE, the UE exists in an idle state, so that the network node transmits the paging message to the UE in order to wake up the UE (S20010).

The paging message includes a UE ID indicating UE receiving the downlink data and quality of service (QoS) information indicating a quality required for transmission of the downlink data.

Step S20010 above may not be performed when the UE transmits the uplink data to the network node.

The UE performs the random access procedure to transmit data for verification of the UE for transmission of the uplink data or downlink data in a state where the UE is not connected with the network node.

That is, the UE transmits a preamble (first preamble) and a random access request message for requesting random access and resource allocation to the network node (S20020).

The random access request message includes scheduling information for resource allocation.

The scheduling information may include the following information for allocating the resource to the UE by the network.

- Random access purpose: Random access execution purpose information (whether verification information for verifying the UE for transmitting the uplink data or receiving the downlink data is transmitted) of UE
- Random access retry: Random access retry (random access retry due to unsuccessful random access of the same purpose, count information, etc.) of the UE for the random access purpose
- Size of uplink data or verification information for verifying the UE
- Characteristics (e.g., QoS class, required packet delay, priority level, etc.) of the uplink data or downlink data
- Uplink data: Quality characteristic of data to be transmitted by the UE
- Downlink data: QoS information of the downlink data transmitted from the network node through the paging message
    - Identifier (e.g., a random value and UE radio network/core network identifier (S-TMSI, GUTI, C-RNTI)) for contention resolution
    - In a case where the preamble and the random access request message are transmitted from multiple UE, an identifier (referred to as Q-value or a first identifier in the present invention) for solving the case
    - The Q-value has a value other than a specific value (a value indicating unsuccessful decoding) of an identifier (Q-CR ID or second identifier in the present invention) regarding whether decoding the random access request message transmitted from the UE is successful and for the contention resolution.

The preamble and the random access request message may be transmitted through different frequency bands at the same transmission time interval (TTI) or at different TTIs.

The network node that receives the access request message including the preamble and the scheduling information may allocate the resource to the UE based on the scheduling information.

Thereafter, the network node transmits resource allocation information indicating the allocated resource, which is included in the random access response message to the UE (S20030).

The random access response message may include an index (an index of a second preamble) of a preamble successfully discovered by the network node, a timing advance command (TAC), a radio network identifier (e.g., Temporary C-RNTI, etc.) which the network allocates to the UE, and identifiers (hereinafter, called Q-CR ID or a second identifier in the present invention) indicating the contention resolution and whether decoding the random access request message is successful, in addition to the resource allocation information.

When the UE receives the random access response message from the network node, the UE transmits verification information of the UE for receiving the uplink data or downlink data based on the resource allocation information included in the random access response message (S20040).

Through such a method, the UE may transmit clear scheduling information and data for resource allocation to the network node in the non-connected state and the network may allocate resources for differentially transmitting data to the UEs based on the scheduling information differentially.

Figure 21:
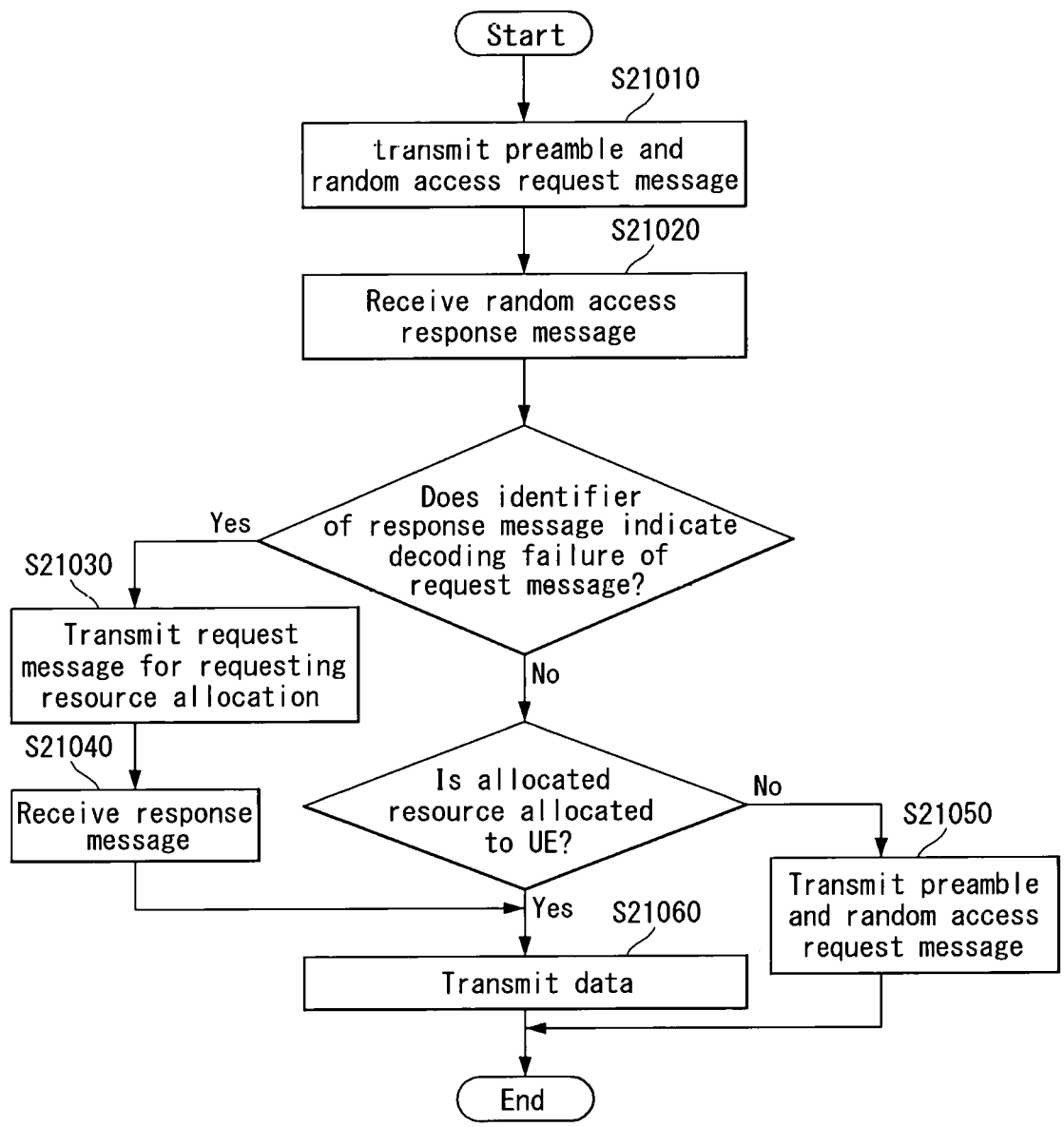
FIG. 21 is a flowchart illustrating one example of a method for transmitting data by being allocated resources by transmitting information of data to be transmitted to a network node by UE to which the present invention may be applied.

FIG. 21 is a flowchart illustrating one example of a method for transmitting data by being allocated resources by transmitting information of data to be transmitted to a network node by UE to which the present invention may be applied.

Referring to FIG. 21 above, the UE transmits information related to data to be transmitted to the network by the UE to be allocated the resource for transmitting the data from the network node.

First, steps S21010 and S21020 are the same as steps S20020 and S20030 of FIG. 20, and thus description thereof will be omitted.

Upon receiving the random request response message from the network node, the UE determines whether the network node decodes the random access request message transmitted by the network node.

Specifically, the UE determines whether the value of the Q-CR ID, which is an identifier indicating whether the contention resolution included in the random access response message and the random access request message are successfully decoded is a value indicating that the decoding is successful.

For example, when the value of the Q-CR ID indicating that decoding the random access request message transmitted by the UE is unsuccessful is '0', the UE checks whether the value of the Q-CR ID of the random access response message is '0'.

When the Q-CR ID value is not '0', the UE determines that the network node successfully decodes the random access request message and when the resource indicated by the resource allocation information included in the random access response message is a resource allocated to the UE.

Specifically, the UE compares the index of the preamble (second preamble) included in the random access response message with the index of the preamble (first preamble) transmitted by the UE.

When the index of the first preamble is not equal to the index of the second preamble, the UE performs the random access procedure again.

That is, the UE determines that the network node may not successfully discover the first preamble and retransmits the first preamble and the random access request message to the network node (S21050).

However, when the index of the first preamble is the same as the index of the second preamble, the UE compares the Q-value included in the random access request message, which is transmitted by the UE and the Q-CR ID included in the random access response message.

When the Q-value and the Q-CR ID are not the same, the UE determines that the resource indicated by the resource allocation information included in the response message is not a resource allocated to the UE and retransmits the first preamble and the random access request message to the network node (S21050).

However, when the Q-value and the Q-CR ID are the same, the UE determines that the resource indicated by the resource allocation information included in the response message is the resource allocated to the UE and transmits the verification information of the UE for receiving the uplink data or downlink data to the network node based on the resource allocation information (S21060).

After the step S21020, when the Q-CR ID value is '0', since the network node does not decode the random access request message transmitted by the UE, the UE transmits a request message (a second request message) to the network node in order to request the resource allocation to the network node (S21030).

Thereafter, the UE receives the response message including resource allocation information indicating the allocated resource from the network node (S21040) and transmits the verification information of the UE for receiving the uplink data or the downlink data to the network node based on the resource allocation information included in the received response message (S21060).

The UE may determine whether the network node successfully receives and decodes the preamble and the scheduling information for transmitting data in the non-connected state through such a method and transmit the data to the network node in the non-connected state through the resource allocated from the network node.

Figure 22:
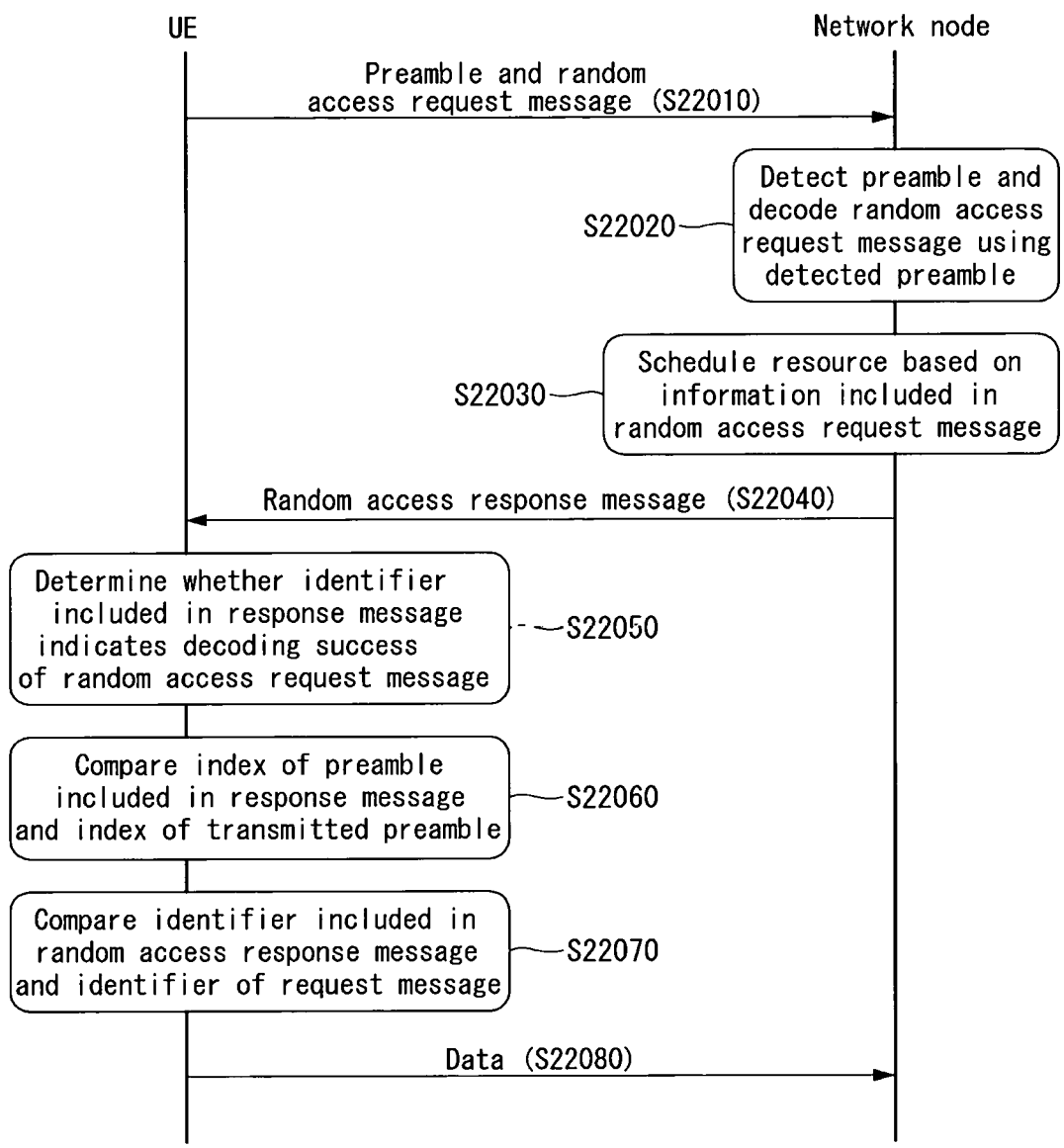
FIG. 22 is a flowchart illustrating one example of a method for transmitting data by being allocated resources by transmitting a preamble and a request message information of data to be transmitted from a network node by UE to which the present invention may be applied.

FIG. 22 is a flowchart illustrating one example of a method for transmitting data by being allocated resources by transmitting a preamble and a request message information of data to be transmitted from a network node by UE to which the present invention may be applied.

Referring to FIG. 22 above, the UE transmits information related to the uplink data in order to transmit the uplink data in the non-connected state with the network node and when the network node successfully detects the transmitted preamble and decodes the message, the UE may transmit the uplink data by being allocated the resource based on the information transmitted from the network node.

Specifically, the UE may perform the random access procedure with the network node when there is data to be transmitted to the network node or there is data to be transmitted from the network node.

The UE selects the preamble in one preamble set among at least one preamble set comprised of multiple preambles for the random access procedure.

Thereafter, the UE transmits the selected preamble (first preamble) and the random access request message for requesting random access and resource allocation (S22010).

The random access request message includes scheduling information for resource allocation.

The scheduling information may include the following information for allocating the resource to the UE by the network.

Random access purpose: Random access execution purpose information (whether verification information for verifying the UE for transmitting the uplink data or receiving the downlink data is transmitted)

Random access retry: Random access retry (random access retry due to unsuccessful random access of the same purpose, count information, etc.) of the UE for the random access purpose Size of uplink data Characteristics (e.g., QoS class, required packet delay, priority level, etc.) of the uplink data Uplink data: Quality characteristic of data to be transmitted by the UE Identifier (e.g., a random value and UE radio network/core network identifier (S-TMSI, GUTI, C-RNTI)) for contention resolution In a case where the preamble and the random access request message are transmitted from multiple UE, an identifier (referred to as Q-value in the present invention) for solving the case The Q-value has a value other than a specific value (a value indicating unsuccessful decoding) of an identifier (Q-CR ID or second identifier in the present invention) regarding whether decoding the random access request message transmitted from the UE is successful and for the contention resolution.

The preamble and the random access request message may be transmitted through different frequency bands at the same transmission time interval (TTI) or at different TTIs.

The network node that receives the access request message including the preamble and the scheduling information may allocate the resource to the UE based on the scheduling information.

That is, the network node may determine whether to allocate the resource to the UE and the priority for the order of the resource allocation based on the scheduling information.

Specifically, the network discovers the first preamble transmitted by the UE and decodes the random access request message based on the discovered first preamble (S22020).

Thereafter, when the network node successfully decodes the random access request message, the network node may acquire the scheduling information included in the random access request message and schedule the resources differentially from other UE based on the scheduling information (S22030).

That is, the network node may determine whether to allocate the resource to the UE and the priority for the order of the resource allocation with other UE based on the scheduling information.

The network node transmits the resource allocation information indicating the allocated resource, which is included in the random access response message to the UE (S22040).

The random access response message may include an index of a preamble successfully discovered by the network node, a timing advance command (TAC), a radio network identifier (e.g., Temporary C-RNTI, etc.) which the network allocates to the UE, and identifiers (hereinafter, called Q-CR ID in the present invention) indicating the contention resolution and whether decoding the random access request message is successful in addition to the resource allocation information.

Upon receiving the random request response message from the network node, the UE determines whether the network node decodes the random access request message transmitted by the network node (22050).

Specifically, the UE determines whether the value of the Q-CR ID, which is an identifier indicating whether the contention resolution included in the random access response message and the random access request message are successfully decoded is a value indicating that the decoding is successful.

For example, when the value of the Q-CR ID indicating that decoding the random access request message transmitted by the UE is unsuccessful is '0', the UE checks whether the value of the Q-CR ID of the random access response message is '0'.

When the Q-CR ID value is not '0', the UE determines that the network node successfully decodes the random access request message and when the resource indicated by the resource allocation information included in the random access response message is a resource allocated to the UE (S22060 and S22070).

Specifically, the UE compares the index of the preamble (second preamble) included in the random access response message with the index of the preamble (first preamble) transmitted by the UE (S22060).

When the index of the first preamble is the same as the index of the second preamble, the UE compares the Q-value included in the random access request message, which is transmitted by the UE and the Q-CR ID included in the random access response message (S22070).

When the Q-value and the Q-CR ID are the same, the UE determines that the resource indicated by the resource allocation information included in the response message is the resource allocated to the UE and transmits the verification information of the UE for receiving the uplink data or downlink data to the network node based on the resource allocation information in the non-connected state (S22080).

When the UE may determine whether the network node successfully receives and decodes the preamble and the scheduling information for transmitting data in the non-connected state through such a method, the UE may transmit the data to the network node in the non-connected state through the resource allocated from the network node.

Figure 23:
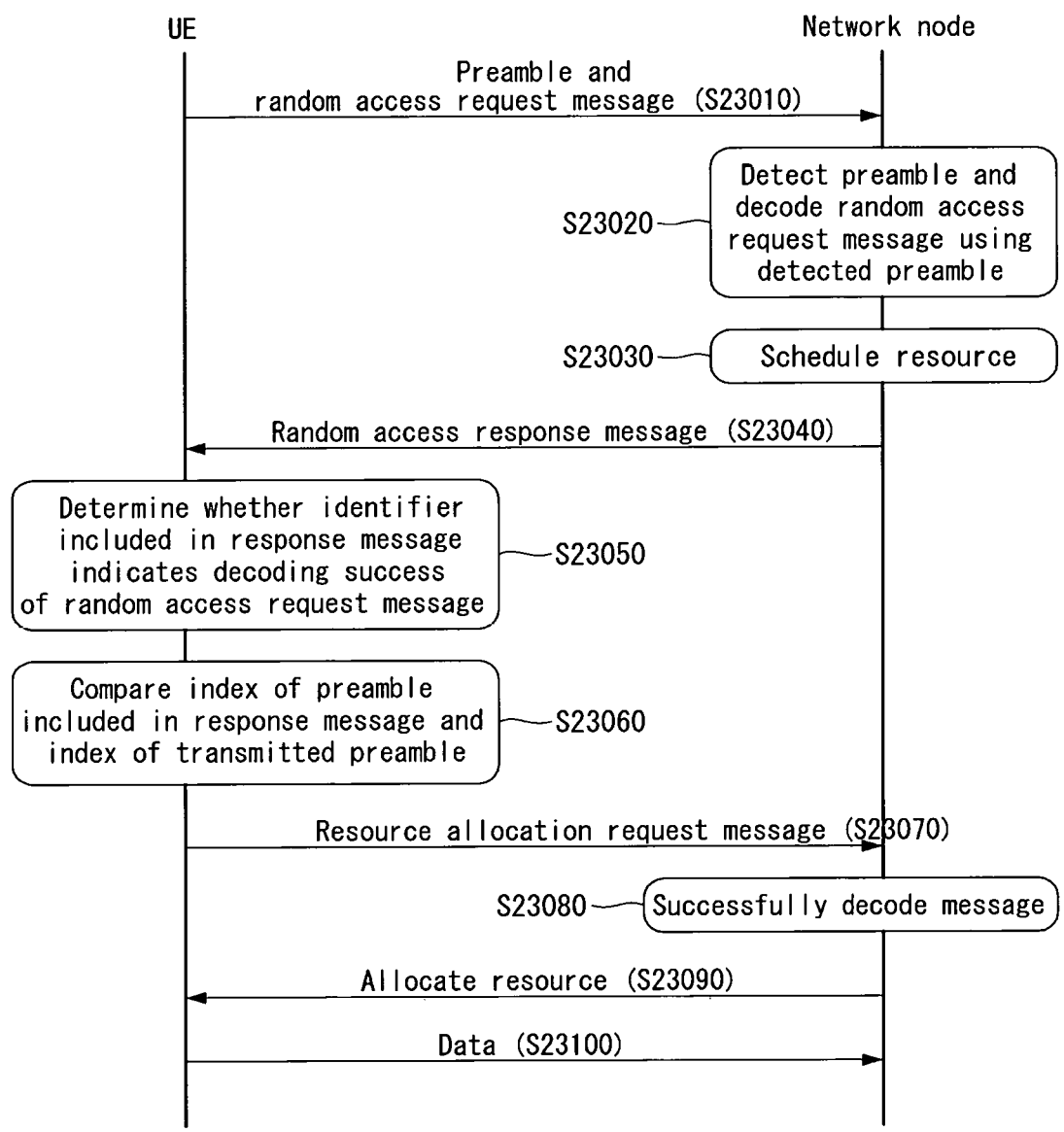
FIG. 23 is a flowchart illustrating one example of a method for transmitting uplink data by UE according to whether a network node senses the preamble transmitted by the UE and successfully decodes the request message to which the present invention may be applied.

FIG. 23 is a flowchart illustrating one example of a method for transmitting uplink data by UE according to whether a network node senses the preamble transmitted by the UE and successfully decodes the request message to which the present invention may be applied.

Referring to FIG. 23 above, when the network node discovers only the preamble transmitted by the UE and unsuccessfully decodes the message, the UE may retransmit the request message for the resource allocation to the network node, may be allocated the resource, and then transmit the data.

Specifically, the UE may perform the random access procedure with the network node when there is data to be transmitted to the network node or there is data to be transmitted from the network node.

The UE selects the preamble in one preamble set among at least one preamble set constituted by multiple preambles for the random access procedure.

Thereafter, steps S23010 and S23020 are the same as steps S22010 and S22020 of FIG. 22, and thus description thereof will be omitted.

Thereafter, when the network node unsuccessfully decodes the random access request message, the network node may not acquire the scheduling information included in the random access request message, and as a result, the network node schedules the resources according to the transmission order of the random access request message transmitted by the UE (S23030).

That is, since the network node may not acquire the scheduling information in decoding the random access request message, the network node allocates the resource to the UE as described in FIG. 12.

The network node transmits the resource allocation information indicating the allocated resource, which is included in the random access response message to the UE (S23040).

The random access response message may include an index of a preamble successfully discovered by the network node, a timing advance command (TAC), a radio network identifier (e.g., Temporary C-RNTI, etc.) which the network allocates to the UE, and identifiers (hereinafter, called Q-CR ID in the present invention) indicating the contention resolution and whether decoding the random access request message is successful in addition to the resource allocation information.

Upon receiving the random request response message from the network node, the UE determines whether the network node decodes the random access request message transmitted by the network node (23050).

Specifically, the UE determines whether the value of the Q-CR ID, which is an identifier indicating whether the contention resolution included in the random access response message and the random access request message are successfully decoded is a value indicating that the decoding is successful.

For example, when the value of the Q-CR ID indicating that decoding the random access request message transmitted by the UE is unsuccessful is '0', the UE checks whether the value of the Q-CR ID of the random access response message is '0'.

When the Q-CR ID value is '0', the UE may recognize that the network node unsuccessfully decodes the random access request message.

Therefore, it is determined that the resource indicated by the resource allocation information included in the random access message is an allocated resource without consideration of the scheduling information of the uplink data to be transmitted by the UE.

Further, in order to determine whether the network node discovers the first preamble transmitted by the UE, the UE compares the index of the preamble (second preamble) included in the random access response message and the index of the first preamble (S23060).

When the index of the first preamble is equal to the index of the second preamble, the UE recognizes that the network node discovers the first preamble.

Accordingly, the UE transmits the resource allocation request message (second request message) for requesting the resource allocation to the network node based on the scheduling information in order to be allocated the resource according to the scheduling information without retransmission of the first preamble (S23070).

The second request message includes the same information as the first request message in step S23010.

The network node that receives the second request message including the scheduling information may allocate the resource to the UE based on the scheduling information when successfully decoding the second request message.

That is, the network node may determine whether to allocate the resource to the UE and the priority for the order of the resource allocation based on the scheduling information.

Specifically, the network decodes the second request message based on the first preamble discovered through step S23010.

Thereafter, when the network node successfully decodes the random access request message, the network node may acquire the scheduling information included in the random access request message and schedule the resources differentially from other UE based on the scheduling information (S23080).

That is, the network node may determine whether to allocate the resource to the UE and the priority for the order of the resource allocation with other UE based on the scheduling information.

The network node transmits the resource allocation information indicating the allocated resource to the UE and the UE transmits the uplink data to the network node through the allocated resources (S23090 and S23100).

When the message transmitted by the UE is unsuccessfully decoded through such a method, the message including the scheduling information is retransmitted and the resource is allocated differently from other UE from the network node to transmit the uplink data in the non-connected state.

Figure 24:
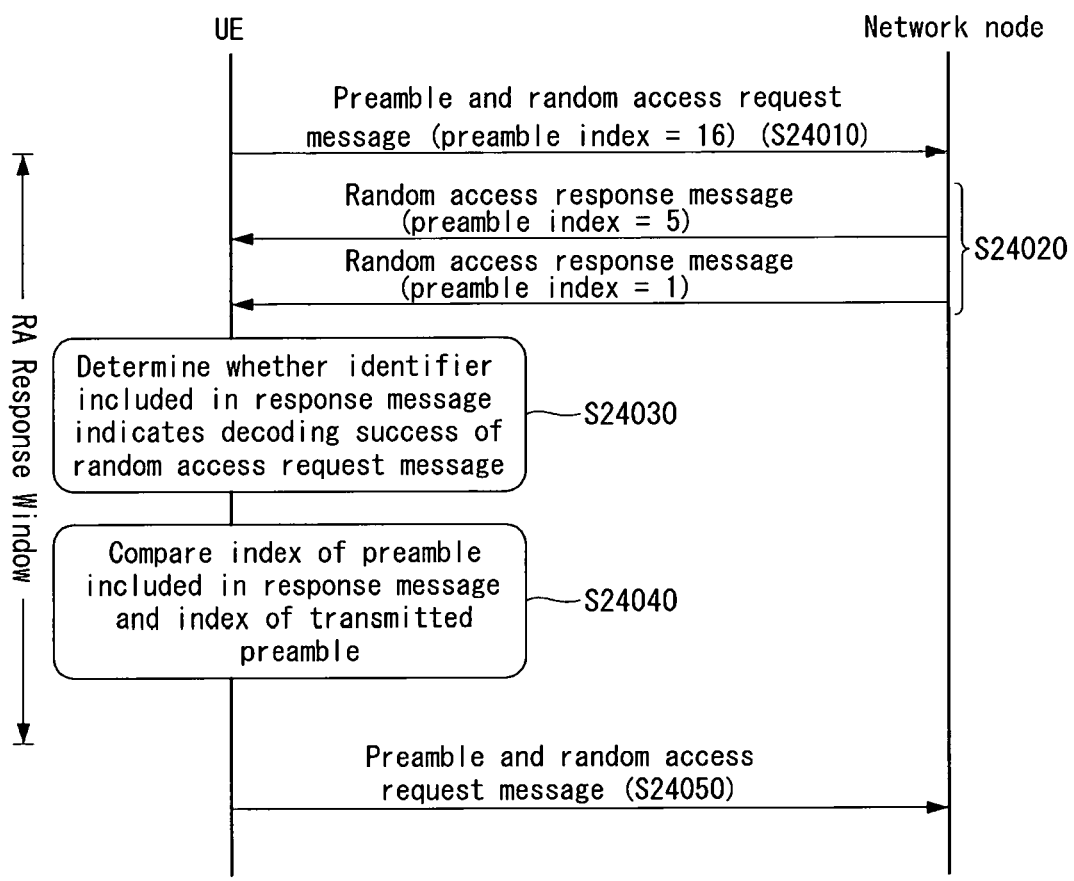
FIG. 24 is a flowchart illustrating one example of a method for transmitting uplink data by UE according to whether a network node senses the preamble transmitted by the UE and successfully decodes the request message to which the present invention may be applied.

FIG. 24 is a flowchart illustrating still yet another example of a method for transmitting uplink data by UE according to whether a network node senses the preamble transmitted by the UE and successfully decodes the request message to which the present invention may be applied.

Referring to FIG. 24, the UE may determine whether the preamble transmitted by the UE is discovered by the network node through the preamble index transmitted from the network node and when the preamble transmitted by the UE is not discovered by the network node, the UE may retransmit the preamble to the network node.

Specifically, the UE may perform the random access procedure with the network node when there is data to be transmitted to the network node.

The UE selects the preamble in one preamble set among at least one preamble set constituted by multiple preambles for the random access procedure.

Thereafter, the UE transmits the selected preamble (first preamble) and the random access request message for requesting random access and resource allocation (S24010).

Hereinafter, a case where the index of the first preamble is 16 will be described as an example.

The random access request message includes scheduling information for resource allocation.

The scheduling information may include the following information for allocating the resource to the UE by the network.

Random access purpose: Random access execution purpose information (access for transmitting uplink data) of UE Random access retry: Random access retry (random access retry due to unsuccessful random access of the same purpose, count information, etc.) of the UE for the random access purpose Size of uplink data Characteristics (e.g., QoS class, required packet delay, priority level, etc.) of the uplink data Uplink data: Quality characteristic of data to be transmitted by the UE Identifier (e.g., a random value and UE radio network/ core network identifier (S-TMSI, GUTI, C-RNTI)) for contention resolution In a case where the preamble and the random access request message are transmitted from multiple UE, an identifier (referred to as Q-value in the present invention) for solving the case The Q-value has a value other than a specific value (a value indicating unsuccessful decoding) of an identifier (Q-CR ID or second identifier in the present invention) regarding whether decoding the random access request message transmitted from the UE is successful and for the contention resolution.

The preamble and the random access request message may be transmitted through different frequency bands at the same transmission time interval (TTI) or at different TTIs.

The network node that receives the access request message including the preamble and the scheduling information may allocate the resource to the UE based on the scheduling information.

That is, the network node may determine whether to allocate the resource to the UE and the priority for the order of the resource allocation based on the scheduling information.

The network node may receive the preamble and the random access request messages from other UE as well as the UE.

The network node may allocate the resources to the UE based on the preamble discovered in the preamble and the random access request message transmitted from the multiple UE and the scheduling information of the random access request message that is successfully decoded.

That is, the sizes and the orders of resources to be allocated to the UE may be determined differentially according to the scheduling information.

Thereafter, the network node transmits the random access response message including the resource allocation information indicating the allocated resource to the UE which transmits the preamble and the random access request message (S24020).

The random access response message may include an index of a preamble successfully discovered by the network node, a timing advance command (TAC), a radio network identifier (e.g., Temporary C-RNTI, etc.) which the network allocates to the UE, and identifiers (hereinafter, called Q-CR ID in the present invention) indicating the contention resolution and whether decoding the random access request message is successful in addition to the resource allocation information.

A case where the indices of the second preamble included in the random access response message received by the UE are "5" and "1", respectively will be described as an example.

The UE receiving the random access response message determines whether the network node successfully decodes the random access request message through the Q-CR ID included in the random access response message as described above.

Specifically, the UE determines whether the value of the Q-CR ID, which is an identifier indicating whether the contention resolution included in the random access response message and the random access request message are successfully decoded is a value indicating that the decoding is successful.

For example, when the value of the Q-CR ID indicating that decoding the random access request message transmitted by the UE is unsuccessful is '0', the UE checks whether the value of the Q-CR ID of the random access response message is '0'.

When the Q-CR ID value is not '0', the UE determines that the network node successfully decodes the random access request message and when the resource indicated by the resource allocation information included in the random access response message is a resource allocated to the UE (S24030 and S24040).

Specifically, the UE compares the index of the preamble (second preamble) included in the random access response message with the index of the preamble (first preamble) transmitted by the UE (S24040).

However, since the index of the first preamble and the index of the second preamble transmitted to the network node by the UE are "16", and "5" and "1", respectively, both indexes are different from each other.

Accordingly, the UE determines that the network node does not discover the first preamble.

Further, the UE compares the Q-value included in the random access request, which is transmitted by the UE and the Q-CR ID included in the random access response message and when the Q-value is different from the Q-CR ID, the UE determines that the resource allocation information included in the response messages is not the resource allocated to the UE.

Therefore, since the network node may not discover the preamble transmitted by the network node and may not be allocated the resource from the network, the UE selects the preamble in one preamble set among the at least one preamble set again.

In addition, since a random access (RA) response window for receiving the random access response is terminated, the selected preamble (the third preamble) and the random access request message are transmitted to the network node again (S24050).

The random access request message in step S24050 and the random access request message in step S24010 include the same kind of information.

However, when in step S24030, the Q-CR ID value is '0', the UE determines that the random access request message transmitted by the UE is not decoded by the network node.

Therefore, the UE determines that the resource indicated by the resource allocation information included in the random access response message is allocated not based on the scheduling information included in the random access request message, but according to the transmission order of the random access request message.

Thereafter, the UE determines whether the resource indicated by the resource allocation information included in the random access response message is the resource allocated to the UE (S24030 and S24040).

In this case, since the UE determines that the network node unsuccessfully decodes the random access request message, the UE does not compare the Q-value with the Q-CR ID, but compares the index of the preamble (second preamble) included in the random access response message and the index of the preamble (first preamble) transmitted by the UE (S24040).

However, since the index of the first preamble and the index of the second preamble transmitted to the network node by the UE are "16", and "5" and "1", respectively, both indexes are different from each other.

Accordingly, the UE determines that the network node does not discover the first preamble and determines that the resource allocated through the random access response message is not the resource allocated to the UE through the random access response message.

Therefore, since the UE is not allocated the resource from the network node, the UE selects the preamble in one preamble set among the at least one preamble set again.

In addition, since the RA response window for receiving the random access response is terminated, the selected preamble (third preamble) and the random access request message are transmitted to the network node again (S24050).

The random access request message in step S24050 and the random access request message in step S24010 include the same kind of information.

The UE determines whether the network node discovers the preamble transmitted by the UE to determine whether the resource is allocated and when the resource is not allocated, the UE retransmits the preamble and the resource allocation request message to reallocated the resource for transmitting the uplink data.

Figure 25:
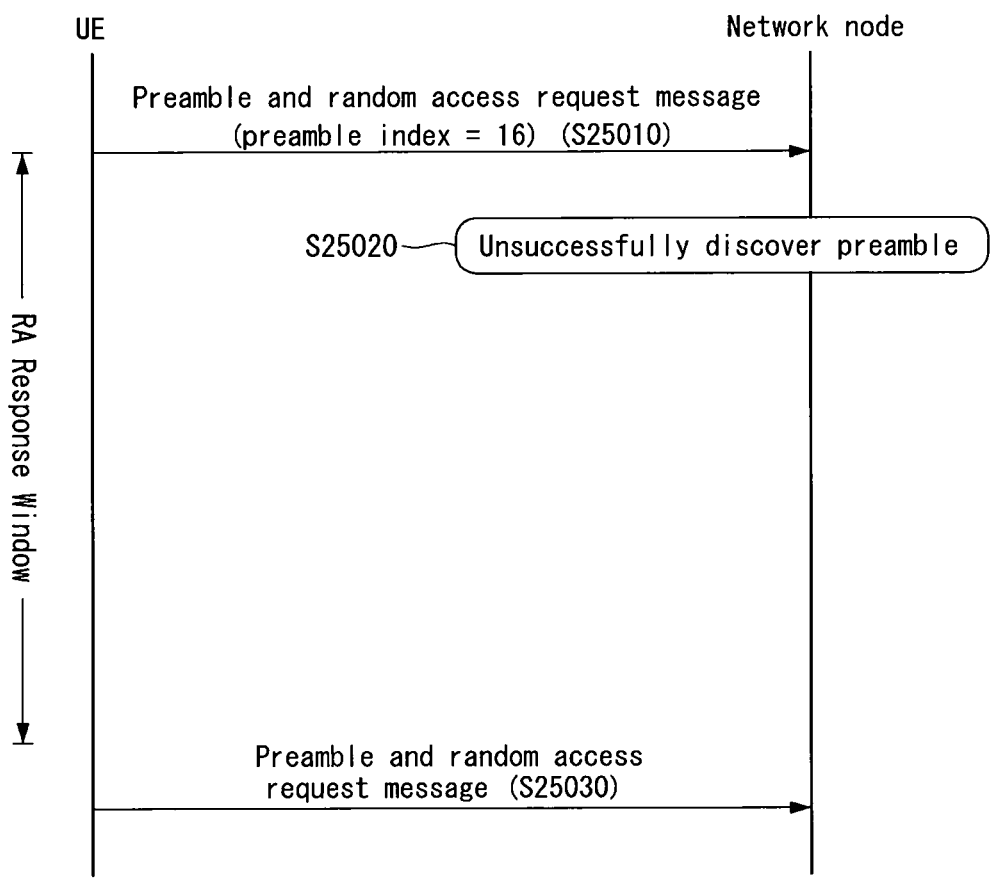
FIG. 25 is a flowchart illustrating still yet another example of a method for transmitting uplink data by UE according to whether a network node senses the preamble transmitted by the UE and successfully decodes the request message to which the present invention may be applied.

FIG. 25 is a flowchart illustrating still yet another example of a method for transmitting uplink data by UE according to whether a network node senses the preamble transmitted by the UE and successfully decodes the request message to which the present invention may be applied.

Referring to FIG. 25, when there is no response from the network node for a predetermined period of time after transmitting the random access request message for requesting the preamble and the resource allocation, the UE may transmit the preamble and the random access request message again.

First, step S25010 is the same as step S24010 of FIG. 24, so that a description thereof will be omitted.

The network node may receive the preamble and the random access request messages from other UE as well as the UE.

The network node may allocate the resources to the UE based on the preamble discovered in the preamble and the random access request message transmitted from the multiple UE and the scheduling information of the random access request message that is successfully decoded.

That is, the sizes and the orders of resources to be allocated to the UE may be determined differentially according to the scheduling information.

However, when the network node fails to discover the preambles transmitted from the multiple UE, the network node may not recognize whether the preamble and the random access request message are transmitted from the multiple UE, the network node does not allocate the resources to the multiple UE (S25020).

The UE waits for the random access response window from the network node and waits for transmitting a response to the preamble and the random access request message.

However, when the response to the preamble and the random access request message is not received during the random access response window, the UE determines that the transmission of the preamble and the random access request message is unsuccessful and selects the preamble in one preamble set among the at least one preamble set again.

The UE transmits the selected preamble (the third preamble) and the random access request message to the network node again (S25030).

Through such a method, when there is no response from the network node during a predetermined window, the UE determines that the transmission of the preamble and the random access request message is unsuccessful and retransmits the preamble and the resource allocation request message to be allocated the resource for transmitting the uplink data.

Figure 26:
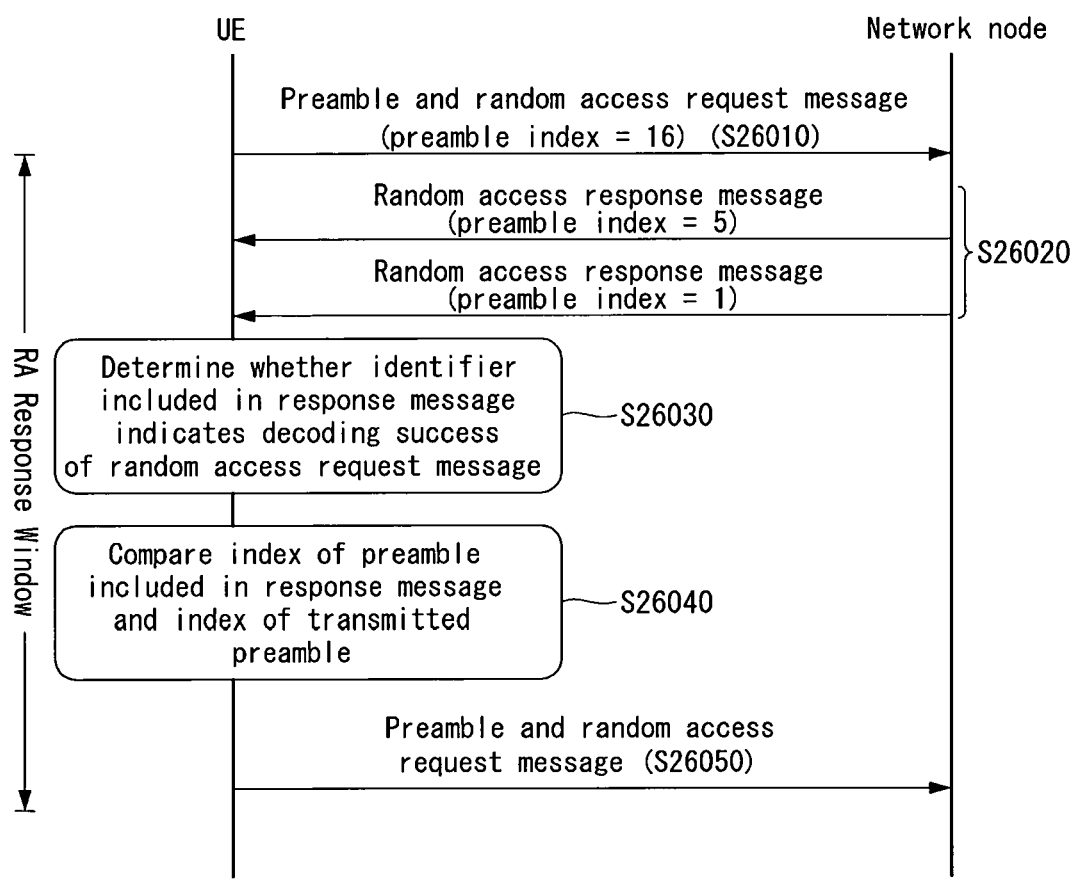
FIG. 26 is a flowchart illustrating one example of a method for transmitting uplink data by UE according to whether a network node senses the preamble transmitted by the UE and successfully decodes the request message to which the present invention may be applied.

FIG. 26 is a flowchart illustrating still yet another example of a method for transmitting uplink data by UE according to whether a network node senses the preamble transmitted by the UE and successfully decodes the request message to which the present invention may be applied.

Referring to FIG. 26, when the UE discovers that the network node discovers the preamble transmitted by the UE and unsuccessfully decodes the random access request message during the random access response window, the UE may transmit the preamble and the random access request message to the network node again.

First, steps S26010 to S26040 in FIG. 26 are the same as steps S24010 to S24040 in FIG. 24, and thus description thereof will be omitted.

Thereafter, the UE recognizes that the network node discovers the preamble transmitted by the UE and unsuccessfully decodes the random access request message during the random access response window and selects the preamble in one preamble set among the at least one preamble set again.

The UE transmits the selected preamble (the third preamble) and the random access request message to the network node again before the random access response window is terminated (S26050).

Figure 27:
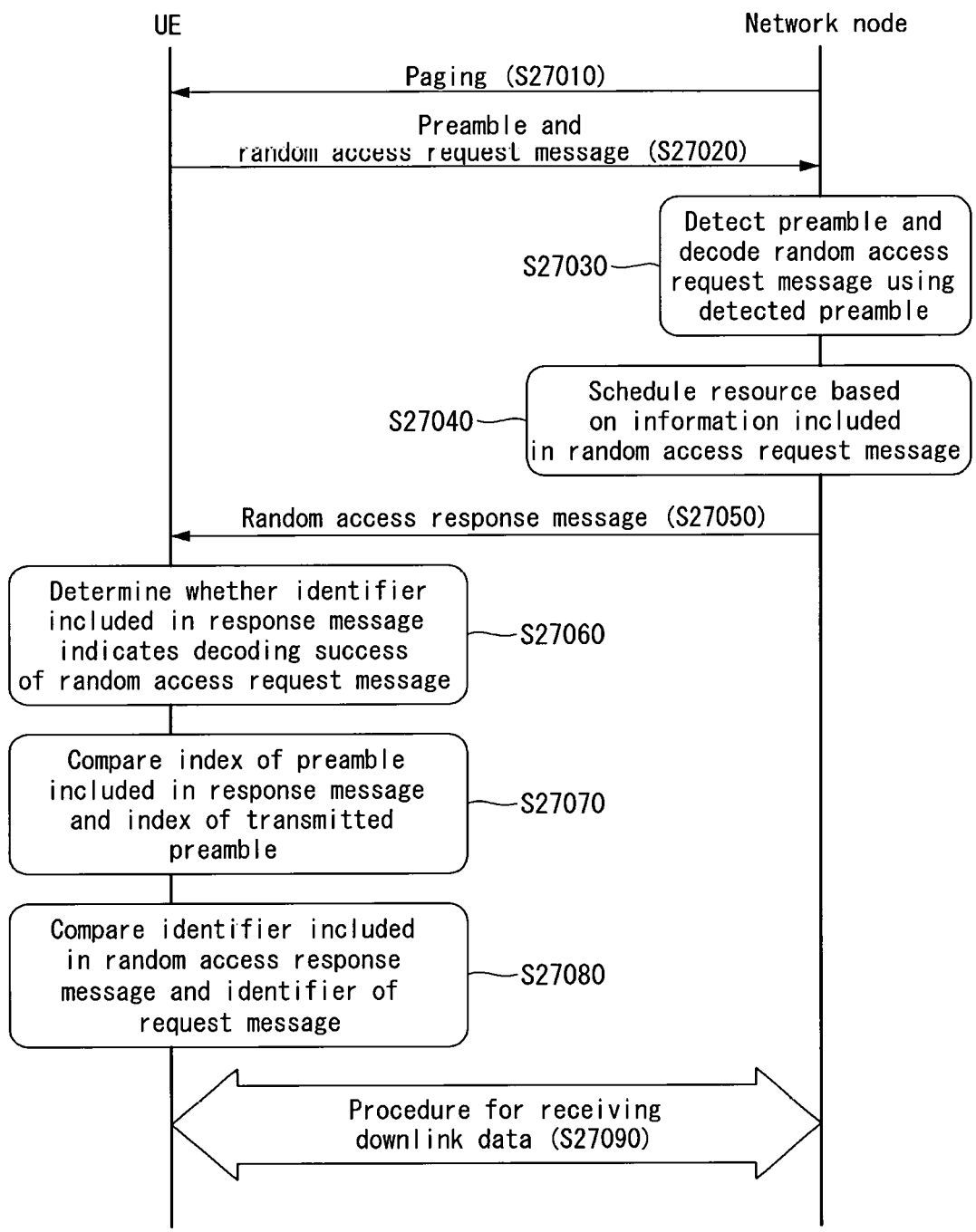
FIG. 27 is a flowchart illustrating another example of a method for transmitting data for receiving downlink data by UE according to whether a network node senses the preamble transmitted by the UE and successfully decodes the request message to which the present invention may be applied.

FIG. 27 is a flowchart illustrating one example of a method for transmitting data for receiving downlink data by UE according to whether a network node senses the preamble transmitted by the UE and successfully decodes the request message to which the present invention may be applied.

Referring to FIG. 27, the UE transmits information related to the verification information in order to transmit the verification information of the UE for receiving the downlink data from the network node in the non-connected state and when the network node successfully decodes detection of the transmitted preamble and decoding of the message, the UE is allocated the resource from the network based on the transmitted information to transmit the verification information.

Specifically, when the network node transmits the downlink data to the UE, the UE exists in an idle state, so that the network node transmits the paging message to the UE in order to activate the UE (S27010).

The paging message includes a UE ID indicating UE transmitting the downlink data and quality of service (QoS) information indicating a quality required for transmission of the downlink data.

The UE performs the random access procedure to transmit verification information of the UE for transmission of the downlink data to the network node in a state where the UE is not connected with the network node.

The UE selects the preamble in one preamble set among at least one preamble set constituted by multiple preambles for the random access procedure.

Thereafter, the UE transmits the selected preamble (first preamble) and the random access request message for requesting random access and resource allocation (S27020).

The random access request message includes scheduling information for resource allocation.

The scheduling information may include the following information for allocating the resource to the UE by the network.

Random access purpose: Random access execution purpose information (whether verification information for verifying the UE for receiving the downlink data is transmitted)

Random access retry: Random access retry (random access retry due to unsuccessful random access of the same purpose, count information, etc.) of the UE for the random access purpose Size of verification information for verification of UE Characteristics (e.g., QoS class, required packet delay, priority level, etc.) of the downlink data Downlink data: QoS information of the downlink data transmitted from the network node through the paging message Identifier (e.g., a random value and UE radio network/core network identifier (S-TMSI, GUTI, C-RNTI)) for contention resolution In a case where the preamble and the random access request message are transmitted from multiple UE, an identifier (referred to as Q-value in the present invention) for solving the case The Q-value has a value other than a specific value (a value indicating unsuccessful decoding) of an identifier (Q-CR ID or second identifier in the present invention) regarding whether decoding the random access request message transmitted from the UE is successful.

The preamble and the random access request message may be transmitted through different frequency bands at the same transmission time interval (TTI) or at different TTIs.

The network node that receives the access request message including the preamble and the scheduling information may allocate the resource to the UE based on the scheduling information.

That is, the network node may determine whether to allocate the resource to the UE and the priority for the order of the resource allocation based on the scheduling information.

Specifically, the network discovers the first preamble transmitted by the UE and decodes the random access request message based on the discovered first preamble (S27030).

Thereafter, when the network node successfully decodes the random access request message, the network node may acquire the scheduling information included in the random access request message and schedule the resources differentially from other UE based on the scheduling information (S27040).

That is, the network node may determine whether to allocate the resource to the UE and the priority for the order of the resource allocation with other UE based on the scheduling information.

The network node transmits the resource allocation information indicating the allocated resource, which is included in the random access response message to the UE (S27050).

The random access response message may include an index of a preamble successfully discovered by the network node, a timing advance command (TAC), a radio network identifier (e.g., Temporary C-RNTI, etc.) which the network allocates to the UE, and identifiers (hereinafter, called Q-CR ID in the present invention) indicating the contention resolution and whether decoding the random access request message is successful in addition to the resource allocation information.

Upon receiving the random request response message from the network node, the UE determines whether the network node decodes the random access request message transmitted by the network node (S27060).

Specifically, the UE determines whether the value of the Q-CR ID, which is an identifier indicating whether the contention resolution included in the random access response message and the random access request message are successfully decoded is a value indicating that the decoding is successful.

For example, when the value of the Q-CR ID indicating that decoding the random access request message transmitted by the UE is unsuccessful is '0', the UE checks whether the value of the Q-CR ID of the random access response message is '0'.

When the Q-CR ID value is not '0', the UE determines that the network node successfully decodes the random access request message and when the resource indicated by the resource allocation information included in the random access response message is a resource allocated to the UE (S27070 and S27080).

Specifically, the UE compares the index of the preamble (second preamble) included in the random access response message with the index of the preamble (first preamble) transmitted by the UE (S27070).

When the index of the first preamble is the same as the index of the second preamble, the UE compares the Q-value included in the random access request message, which is transmitted by the UE and the Q-CR ID included in the random access response message (S27080).

When the Q-value and the Q-CR ID are the same, the UE determines that the resource indicated by the resource allocation information included in the response message is the resource allocated to the UE and performs a procedure for receiving the downlink data based on the resource allocation information in the non-connected state (S27090).

That is, the UE transmits the verification information to the network node through the allocated resources.

In this case, the verification information may include the following information.

UE ID for identifying the UE

Security header type (e.g., not security protected, Integrity protected,

Integrity protected and ciphered, etc.)

Key set identifier for identifying the security context

NAS count

Message authentication code (MAC)

The network node that receives the verification information verifies the UE based on the information included in the verification information and transmits the downlink data to the UE when the verification of the UE is completed.

When the UE may determine whether the network node successfully receives and decodes the preamble and the scheduling information for transmitting data in the non-connected state through such a method, the UE may transmit the downlink data in the non-connected state through the resource allocated from the network node.

Figure 28:
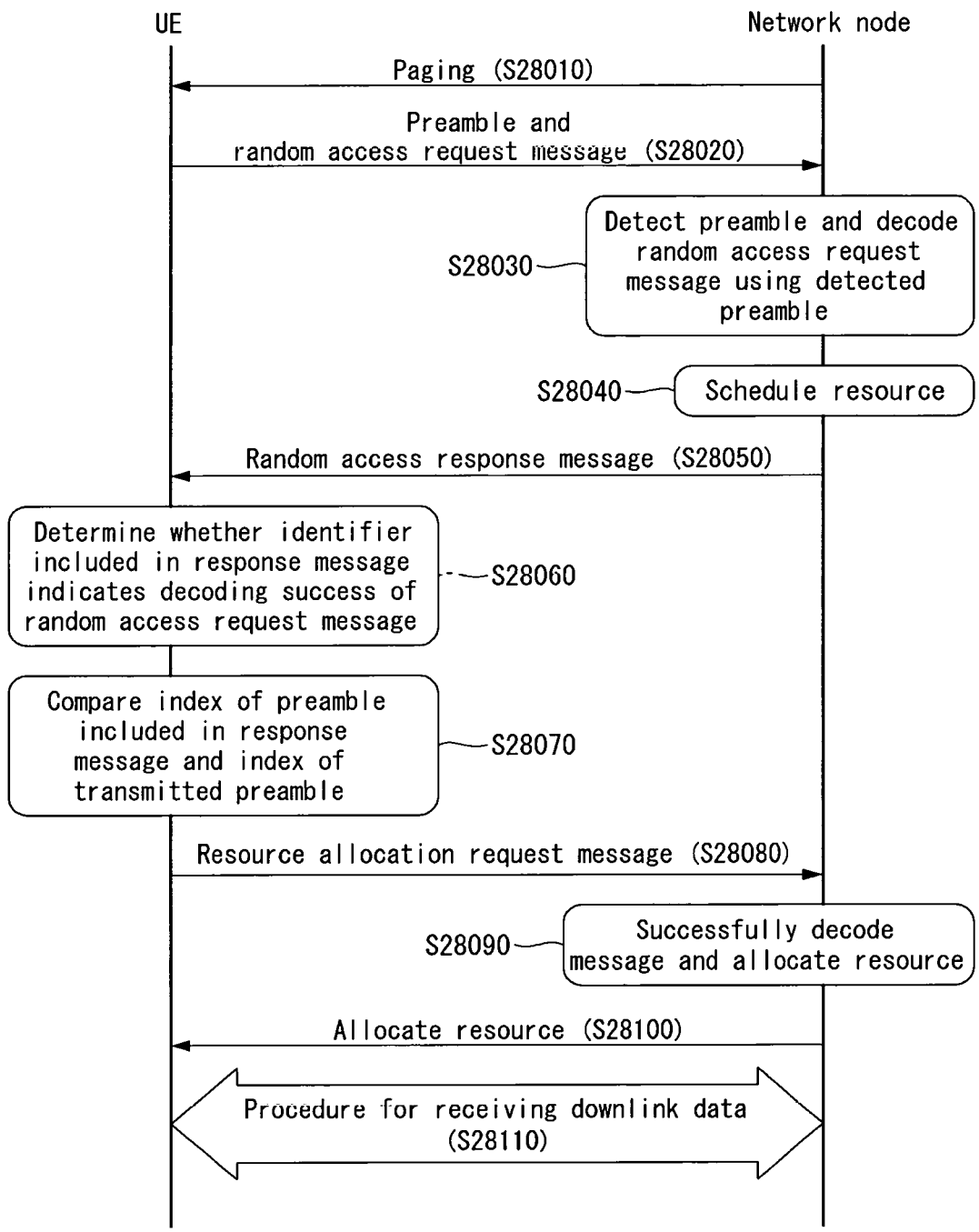
FIG. 28 is a flowchart illustrating another example of a method for transmitting data for receiving downlink data by UE according to whether a network node senses the preamble transmitted by the UE and successfully decodes the request message to which the present invention may be applied.

FIG. 28 is a flowchart illustrating another example of a method for transmitting data for receiving downlink data by UE according to whether a network node senses the preamble transmitted by the UE and successfully decodes the request message to which the present invention may be applied.

Referring to FIG. 28 above, when the network node discovers only the preamble transmitted by the UE and unsuccessfully decodes the message, the UE may retransmit the request message for the resource allocation to the network node, may be allocated the resource, and then transmit verification information of the UE for receiving downlink data.

First, steps S28010 to S28030 are the same as steps S27010 and S27030 of FIG. 27, and thus description thereof will be omitted.

When the network node unsuccessfully decodes the random access request message transmitted from the UE, the network node may not acquire the scheduling information included in the random access request message, and as a result, the network node schedules the resources according to the transmission order of the random access request message transmitted by the UE (S28040).

That is, since the network node may not acquire the scheduling information in decoding the random access request message, the network node allocates the resource to the UE as described in FIG. 12.

The network node transmits the resource allocation information indicating the allocated resource, which is included in the random access response message, to the UE (S28050).

The random access response message may include an index of a preamble successfully discovered by the network node, a timing advance command (TAC), a radio network identifier (e.g., Temporary C-RNTI, etc.) which the network allocates to the UE, and identifiers (hereinafter, called Q-CR ID in the present invention) indicating the contention resolution and whether decoding of the random access request message is successful, in addition to the resource allocation information.

Upon receiving the random request response message from the network node, the UE determines whether the network node decodes the random access request message transmitted by the network node (S28060).

Specifically, the UE determines whether the value of the Q-CR ID, which is an identifier indicating whether the contention resolution included in the random access response message and the random access request message are successfully decoded is a value indicating that the decoding is successful.

For example, when the value of the Q-CR ID indicating that decoding the random access request message transmitted by the UE is unsuccessful is '0', the UE checks whether the value of the Q-CR ID of the random access response message is '0'.

When the Q-CR ID value is '0', the UE may recognize that the network node unsuccessfully decodes the random access request message.

Therefore, it is determined that the resource indicated by the resource allocation information included in the random access message is an allocated resource without consideration of the scheduling information of the uplink data to be transmitted by the UE.

Further, in order to determine whether the network node discovers the first preamble transmitted by the UE, the UE compares the index of the preamble (second preamble) included in the random access response message and the index of the first preamble (S28070).

When the index of the first preamble is equal to the index of the second preamble, the UE recognizes that the network node discovers the first preamble.

Accordingly, the UE transmits the resource allocation request message (second request message) for requesting the resource allocation to the network node based on the scheduling information in order to be allocated the resource according to the scheduling information without retransmission of the first preamble (S28080).

The second request message includes the same type of information as the first request message in step S28020.

The network node that receives the second request message including the scheduling information may allocate the resource to the UE based on the scheduling information when successfully decoding the second request message.

That is, the network node may determine whether to allocate the resource to the UE and the priority for the order of the resource allocation based on the scheduling information.

Specifically, the network decodes the second request message based on the first preamble discovered through step S28020.

Thereafter, when the network node successfully decodes the random access request message, the network node may acquire the scheduling information included in the random access request message and schedule the resources differentially from other UE based on the scheduling information (S28090).

That is, the network node may determine whether to allocate the resource to the UE and the priority for the order of the resource allocation with other UE based on the scheduling information.

The network node transmits the resource allocation information indicating the allocated resource to the UE and the UE performs a procedure for receiving the downlink data based on the allocated resource (S28100).

That is, the UE transmits the verification information to the network node through the allocated resources.

Here, the verification information may include the following information.

UE ID for identifying UE

Security header type (e.g., not security protected, Integrity protected, Integrity protected and ciphered, etc.)

Key set identifier for identifying security context

NAS count

Message authentication code (MAC)

The network node receiving the verification information verifies the UE based on the information included in the verification information, and transmits the downlink data to the UE when the verification of the UE is completed (S28110).

When the message transmitted by the UE is unsuccessfully decoded through such a method, the message including the scheduling information is retransmitted and the resource is allocated differently from other UE from the network node to transmit the verification information of the UE for receiving the downlink data in the non-connected state.

FIG. 29 is a flowchart illustrating one example of a method for differentially allocating resources according to information related with data transmitted from UEs by a network node to which the present invention may be applied.

Referring to FIG. 29, when the network node receives a resource allocation request message for transmitting data in a state in which the network node is not connected from a plurality of UEs, the network node may allocate the resources differentially to the UEs, based on the scheduling information included in the resource allocation request message.

Specifically, UE 1 and UE 2 may perform a random access procedure with the network node when there is data to be transmitted to the network node.

The UE 1 and the UE 2 select the preamble in one preamble set among at least one preamble set constituted by multiple preambles for the random access procedure.

Thereafter, the UE2 transmits the selected preamble (second preamble) and the random access request message (second request message) to the network node (S29010).

Further, the UE1 transmits the selected preamble (first preamble) and the random access request message (first request message) for requesting random access and resource allocation to the network node (S29020).

The first request message and the second request message include scheduling information for resource allocation.

The scheduling information may include the following information for allocating the resource to the UE by the network.

Random access purpose: Random access execution purpose information (whether or not to transmit uplink data) of UE Random access retry: Random access retry (random access retry due to unsuccessful random access of the same purpose, count information, etc.) of the UE for the random access purpose Size of uplink data Characteristics (e.g., QoS class, required packet delay, priority level, etc.)
of the uplink data Uplink data: Quality characteristic of data to be transmitted by the UE Identifier (e.g., a random value and UE radio network/core network identifier (S-TMSI, GUTI, C-RNTI)) for contention resolution In a case where the preamble and the random access request message are transmitted from multiple UE, an identifier (referred to as Q-value in the present invention) for solving the case The Q-value has a value other than a specific value of an identifier (Q-CR ID in the present invention) regarding whether decoding the random access request message transmitted from the UE is successful.

The preamble and the random access request message may be transmitted through different frequency bands at the same transmission time interval (TTI) or at different TTIs.

In the present embodiment, a case where the index of the first preamble is "6", the Q-value included in the first request message is "500", the Qos Class is "1", and the index of the second preamble is "21", the Q-Value included in the second request message is "15", and the QoS Class is "3" will be described as an example.

The network node that receives the preambles and the access request message including the scheduling information from the UE1 and the UE2 may allocate the resource to the UE based on the scheduling information.

That is, the network node may determine whether to allocate the resource to the UE and the priority for the order of the resource allocation based on the scheduling information.

Specifically, the network discovers the first preamble and the second preamble transmitted by the UE 1 and the UE 2, and decodes the first request message and the second request message using the discovered preambles (S29030).

Thereafter, when the network node successfully decodes the first request message and the second request message, the network node may acquire the scheduling information included in the random access request message and schedule the resources differentially from other UE based on the scheduling information (S29040).

That is, the network node may determine whether to allocate the resource to the UE and the priority for the order of the resource allocation with other UE based on the scheduling information.

Table 4 below shows an example of information included in the scheduling information transmitted by the UE 1 and the UE 2.

TABLE 4

|  | UE 1 | UE 2 |
| --- | --- | --- |
| Successful decoding | Yes | Yes |
| Data transmission direction | UL | UL |
| Quality characteristics | QoS Class 1 | QoS Class 3 |
| Random access retry | No | No |

Referring to Table 4, the scheduling information of the UE 1 and the UE 2 are the same as each other except for the quality characteristics.

Accordingly, the UE 2 first transmits a random access request message requesting resource allocation, but the network node may allocate the resources to the UE 1 which intends to transmit uplink data requiring higher quality earlier than the UE 2.

That is, the network node allocates the resources to the UE 1 and transmits resource allocation information indicating the allocated resources included in the random access response message (first response message) to the UE 1 (S29050).

The first response message may include an index of the first preamble, a timing advance command (TAC), a radio network identifier (e.g., Temporary C-RNTI, etc.) which the network allocates to the UE, and identifiers (hereinafter, called Q-CR ID in the present invention) indicating the contention resolution and whether decoding of the random access request message is successful, in addition to the resource allocation information.

Here, the Q-CR ID value is "15" which is the same value as the Q-value because the network node successfully decodes the first request message and allocated the resources to the UE 1.

Thereafter, the network node allocates the resources to the UE 2 and transmits resource allocation information indicating the allocated resources included in the random access response message (second response message) to the UE 2 (S29060).

Like the first response message, the second response message may include an index of the second preamble, a timing advance command (TAC), a radio network identifier (e.g., Temporary C-RNTI, etc.) which the network allocates to the UE, and identifiers (hereinafter, called Q-CR ID in the present invention) indicating the contention resolution and whether decoding of the random access request message is successful, in addition to the resource allocation information.

Here, the Q-CR ID value is "500" which is the same value as the Q-value because the network node successfully decodes the second request message and allocated the resources to the UE 2.

The UE 1 receiving the random request response message from the network node may recognize whether the first request message is successfully decoded through the Q-CR ID value included in the first response message.

Also, since the preamble index included in the first response message is the first preamble index, and the Q-value of the first request message is equal to the value of the Q-CR ID included in the first response message, and thus, it possible to recognize that the allocated resource is a resource allocated to the UE 1 through the first response message.

The UE 1 may transmit uplink data to the network node through the allocated resources (S29070).

The UE 2 may also recognize whether the second request message is successfully decoded through the Q-CR ID value included in the first response message.

Also, since the preamble index included in the second response message is the second preamble index, and the Q-value of the second request message is equal to the value of the Q-CR ID included in the second response message, and thus, it possible to recognize that the allocated resource is a resource allocated to the UE 2 through the first response message.

The UE 2 may transmit uplink data to the network node through the allocated resources (S29080).

Through such a method, the network node may allocate resources differentially to the UEs based on information related to data to be transmitted in a state in which the network node is not connected, not in a resource allocation request order.

Figure 30:
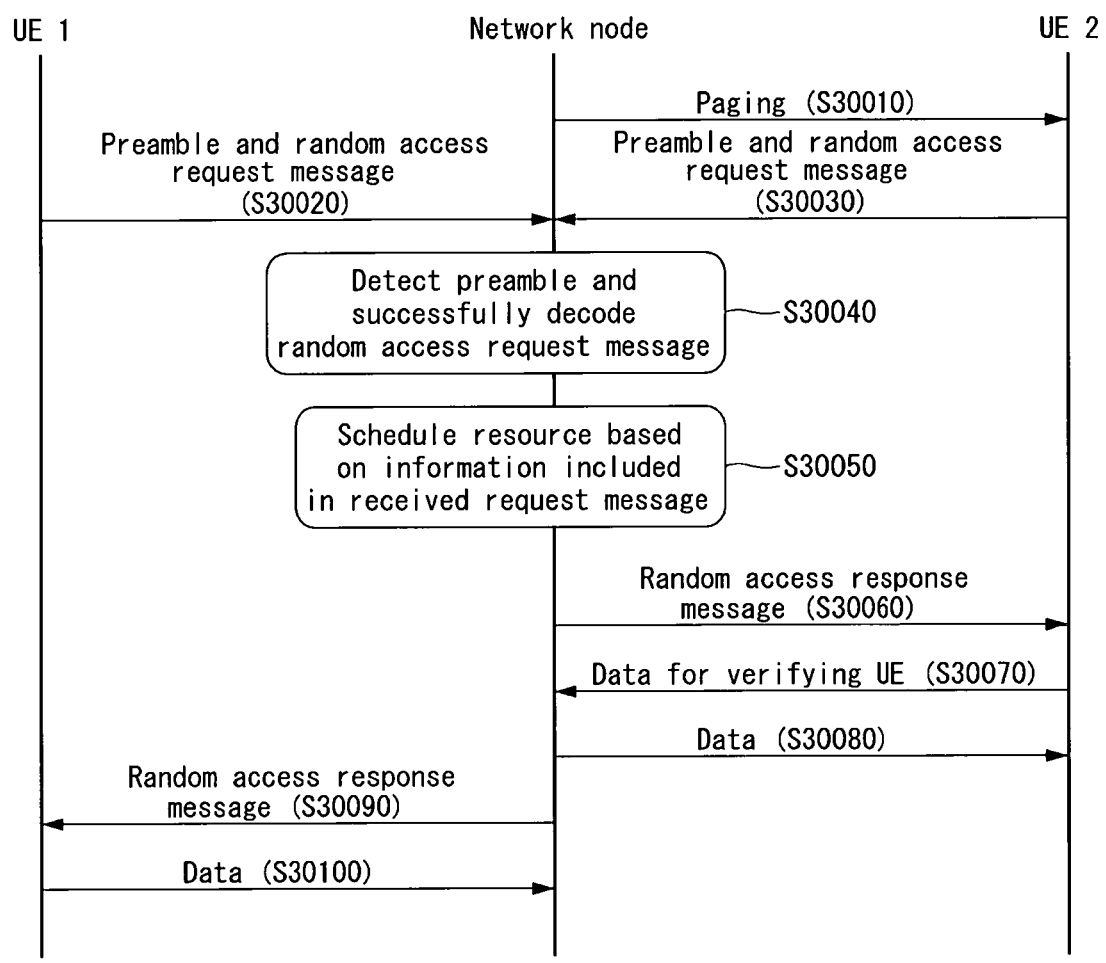
FIG. 30 is a flowchart illustrating another example of a method for differentially allocating resources according to information related with data transmitted from UEs by a network node to which the present invention may be applied.

FIG. 30 is a flowchart illustrating still yet another example of a method for differentially allocating resources according to information related with data transmitted from UEs by a network node to which the present invention may be applied.

Referring to FIG. 30, when the network node receives a resource allocation request message for transmitting data in a state in which the network node is not connected from a plurality of UEs, the network node may allocate the resources differentially to the UEs according to whether the data to be transmitted by the UE is the uplink data or verification information of the UE for receiving the downlink data.

Specifically, when the network node transmits the downlink data to the UE 2, the UE 2 is in an idle state, and thus the network node transmits a paging message to the UE 2 in order to activate the UE 2 (S30010).

The paging message includes an identifier indicating that the downlink data is transmitted in a state in which no connection is established, a UE ID indicating a UE to which the downlink data is transmitted, and quality of service (QoS) information indicating the quality required for the transmission of the downlink data.

The UE 2 performs a random access procedure to transmit the verification information of the UE for transmission of the downlink data to the network node in a state where the UE 2 is not connected with the network node.

Also, the UE 1 performs a random access procedure for transmitting the uplink data to the network node.

The UE 1 transmits a first preamble and a random access request message (first request message) requesting random access and resource allocation to the network, and the UE 2 also transmits a second preamble and a random access request message (second request message) requesting random access and resource allocation to the network (S30020 and S30030).

Here, the first request message includes scheduling information related to the transmission of the uplink data described above, and the second request message includes scheduling information related to the verification information of the UE for receiving the downlink data.

The network node discovers the preambles transmitted from the UE 1 and the UE 2 and decodes the first request message and the second request message transmitted from the UE 1 and the UE 2 using the discovered preambles (S30040).

In the present embodiment, a case where the index of the first preamble is "21", the Q-value included in the first request message is "15", the Qos Class is "3", and the index of the second preamble is "6", the Q-Value included in the second request message is "500", and the QoS Class is "3" will be described as an example.

In the scheduling information included in the second request message, the QoS information indicating the quality of the downlink data is QoS information received from the network node through step S30010.

The network node that receives the preambles and the access request message including the scheduling information from the UE1 and the UE2 may allocate the resource to the UE based on the scheduling information.

That is, the network node may determine whether to allocate the resource to the UE and the priority for the order of the resource allocation based on the scheduling information.

Specifically, when the network node successfully decodes the first request message and the second request message, the network node may acquire the scheduling information included in the random access request message and schedule the resources differentially from other UE based on the scheduling information (S30050).

Table 5 below shows an example of information included in the scheduling information transmitted by the UE 1 and the UE 2.

TABLE 5

| | UE 1 | UE 2 |
|---|---|---|
| Successful decoding | Yes | Yes |
| Data transmission direction | UL | DL |
| Quality characteristics | QoS Class 3 | QoS Class 3 |
| Random access retry | No | No |

Referring to Table 5 above, the scheduling information of the UE 1 and the UE 2 are the same as each other except for the data transmission direction.

Accordingly, since the required delays of the uplink data to be transmitted by the UE 1 and the downlink data to be received by the UE 2 are the same as each other, the network node may first allocate the resources to the UE 2, which receives the downlink data requiring much more time.

That is, the network node allocates the resources to the UE 2 and transmits resource allocation information indicating the allocated resources included in the random access response message (first response message) to the UE 2 (S30060).

The first response message may include an index of the second preamble, a timing advance command (TAC), a radio network identifier (e.g., Temporary C-RNTI, etc.) which the network allocates to the UE, and identifiers (hereinafter, called Q-CR ID in the present invention) indicating the contention resolution and whether decoding of the random access request message is successful, in addition to the resource allocation information.

Here, the Q-CR ID value is "500" which is the same value as the Q-value because the network node successfully decodes the second request message and allocated the resources to the UE 2.

Upon receiving the first response message from the network node, the UE 2 may recognize whether the second request message is successfully decoded through the Q-CR ID value included in the first response message.

Also, since the preamble index included in the first response message is the second preamble index, and the Q-value of the second request message is equal to the value of the Q-CR ID included in the first response message, and thus, it possible to recognize that the allocated resource is a resource allocated to the UE 2 through the first response message.

The UE 2 may transmit verification information of the UE for receiving the downlink data through the allocated resource to the network node (S30070).

The network node receiving the verification information verifies the UE 2 based on the information included in the verification information, and transmits the downlink data to the UE2 when the verification of the UE 2 is completed (S30080).

The network node allocates the resources to the UE 1 and transmits resource allocation information indicating the allocated resources included in the random access response message (second response message) to the UE 1 (S30090).

Like the first response message, the second response message may also include an index of the first preamble, a timing advance command (TAC), a radio network identifier (e.g., Temporary C-RNTI, etc.) which the network allocates to the UE, and identifiers (hereinafter, called Q-CR ID in the present invention) indicating the contention resolution and whether decoding of the random access request message is successful, in addition to the resource allocation information.

Here, the Q-CR ID value is "21" which is the same value as the Q-value because the network node successfully decodes the first request message and allocated the resources to the UE 1.

Upon receiving the second response message from the network node, the UE 1 may recognize whether the first request message is successfully decoded through the Q-CR ID value included in the second response message.

Also, since the preamble index included in the second response message is the first preamble index, and the Q-value of the first request message is equal to the value of the Q-CR ID included in the second response message, and thus, it possible to recognize that the allocated resource is a resource allocated to the UE 1 through the first response message.

The UE 1 may transmit uplink data to the network node through the allocated resource (S30100).

Through such a method, the network node may allocate resources differentially to the UEs according to the transmission/reception time of data for a service to be provided other than the resource allocation request order.

Figure 31:
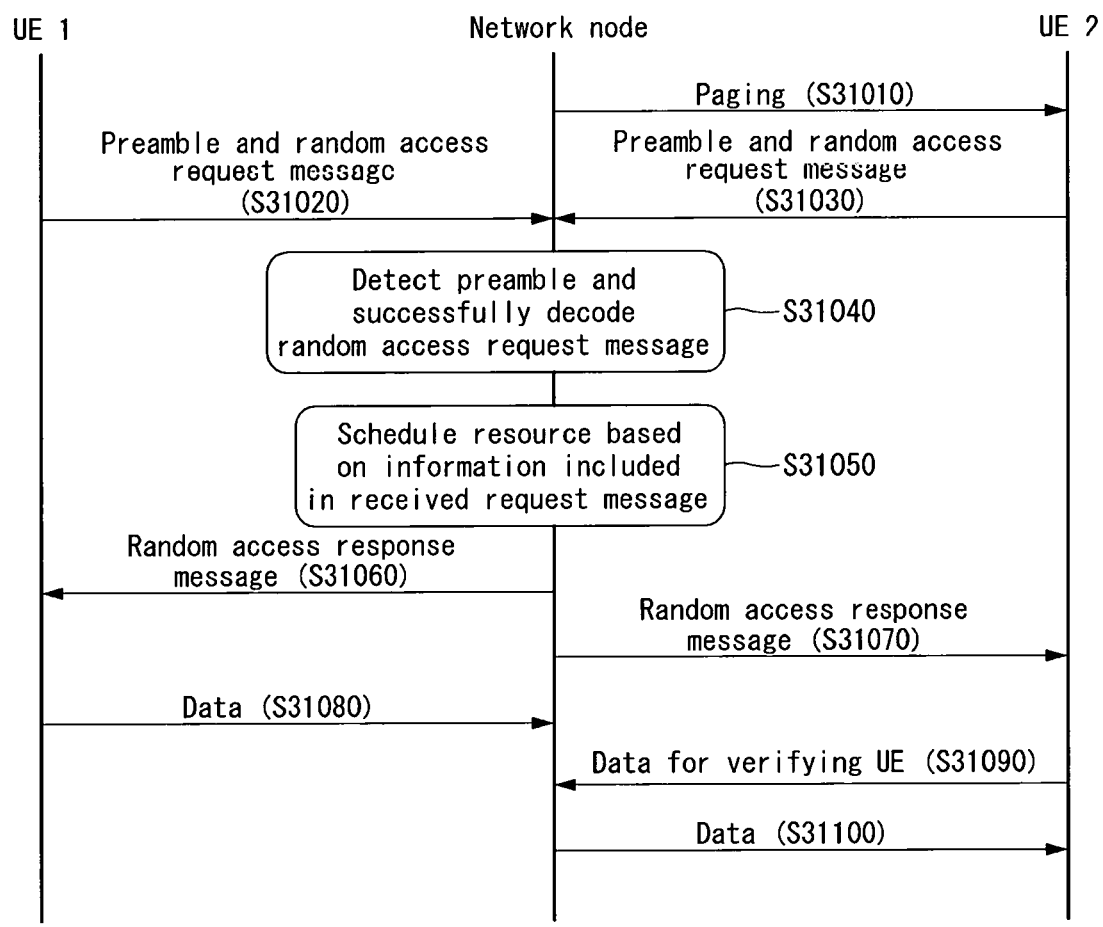
FIG. 31 is a flowchart illustrating yet another example of a method for differentially allocating resources according to information related with data transmitted from UEs by a network node to which the present invention may be applied.

FIG. 31 is a flowchart illustrating still yet another example of a method for differentially allocating resources according to information related with data transmitted from UEs by a network node to which the present invention may be applied.

Referring to FIG. 31, when the network node receives a resource allocation request message for transmitting data in a state in which the network node is not connected from a plurality of UEs, the network node may allocate the resources differentially to the UEs according to the data transmission direction and the required quality.

First, steps S31010 to S31040 are the same as steps S30010 to S30040 of FIG. 30, and thus description thereof will be omitted.

The network node that receives the preamble and the access request message including the scheduling information from the UE1 and the UE2 may allocate the resource to the UE based on the scheduling information.

That is, the network node may determine whether to allocate the resource to the UE and the priority for the order of the resource allocation based on the scheduling information.

Specifically, when the network node successfully decodes the first request message and the second request message, the network node may acquire the scheduling information included in the random access request message and schedule the resources differentially from other UE based on the scheduling information (S31050).

Table 6 below shows an example of information included in the scheduling information transmitted by the UE 1 and the UE 2.

TABLE 6

|  | UE 1 | UE 2 |
|---|---|---|
| Successful decoding | Yes | Yes |
| Data transmission direction | UL | DL |
| Quality characteristics | QoS Class 1 | QoS Class 3 |
| Random access retry | No | No |

Referring to Table 5 above, the scheduling information of the UE 1 and the UE 2 are the same as each other except for the data transmission direction and the quality characteristics.

Accordingly, the network node differentially allocates resources to the UE 1 and the UE 2 according to the data transmission direction and the quality characteristics.

For example, since the UE 2 receives downlink data, a delay time of the UE 2 is larger than that of the UE 1 that transmits the uplink data. However, since the uplink data transmitted by the UE 1 requires higher quality, the network node may first allocate the resources to the UE 1.

That is, since the uplink data requires a shorter delay than the downlink data, even if a longer delay to receive the downlink data occurs, the network node first allocates the resources to the UE 1 earlier than the UE 2.

That is, the network node allocates the resources to the UE 1 and transmits resource allocation information indicating the allocated resources included in the random access response message (first response message) to the UE 1 (S31060).

The first response message may include an index of the first preamble, a timing advance command (TAC), a radio network identifier (e.g., Temporary C-RNTI, etc.) which the network allocates to the UE, and identifiers (hereinafter, called Q-CR ID in the present invention) indicating the contention resolution and whether decoding of the random access request message is successful, in addition to the resource allocation information.

Here, the Q-CR ID value is "500" which is the same value as the Q-value because the network node successfully decodes the first request message and allocated the resources to the UE 2.

Thereafter, the network node allocates the resources to the UE 2 and transmits resource allocation information indicating the allocated resources included in the random access response message (second response message) to the UE 2 (S31070).

Like the first response message, the second response message may also include an index of the second preamble, a timing advance command (TAC), a radio network identifier (e.g., Temporary C-RNTI, etc.) which the network allocates to the UE, and identifiers (hereinafter, called Q-CR ID in the present invention) indicating the contention resolution and whether decoding of the random access request message is successful, in addition to the resource allocation information.

Here, the Q-CR ID value is "500" which is the same value as the Q-value because the network node successfully decodes the second request message and allocated the resources to the UE 2.

Upon receiving the first response message from the network node, the UE 1 may recognize whether the first request message is successfully decoded through the Q-CR ID value included in the first response message.

Also, since the preamble index included in the first response message is the first preamble index, and the Q-value of the first request message is equal to the value of the Q-CR ID included in the first response message, and thus, it possible to recognize that the allocated resource is a resource allocated to the UE 1 through the first response message.

The UE 1 may transmit uplink data to the network node through the allocated resource (S31080).

The UE 2 may also recognize whether the second request message is successfully decoded through the Q-CR ID value included in the second response message.

Also, since the preamble index included in the second response message is the second preamble index, and the Q-value of the second request message is equal to the value of the Q-CR ID included in the second response message, and thus, it possible to recognize that the allocated resource is a resource allocated to the UE 2 through the first response message.

The UE 2 may transmit the verification information of the UE for receiving the downlink data through the allocated resource to the network node (S31090).

The network node receiving the verification information verifies the UE 2 based on the information included in the verification information, and transmits the downlink data to the UE2 when the verification of the UE 2 is completed (S31100).

Through such a method, the network node may allocate the resources differentially to the UEs according to the transmission/reception time of data and the required quality for a service to be provided other than the resource allocation request order.

Figure 32:
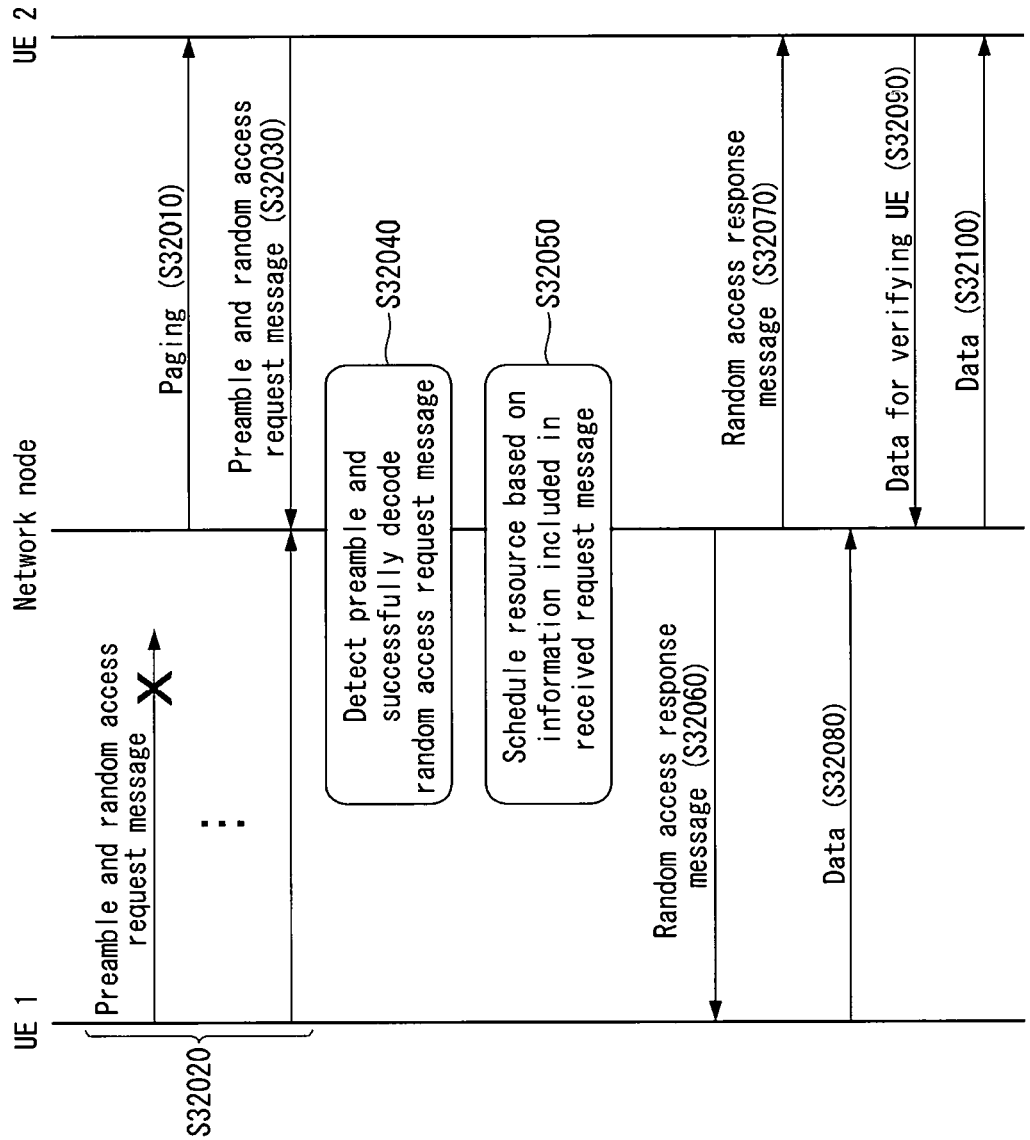
FIG. 32 is a flowchart illustrating still yet another example of a method for differentially allocating resources according to information related with data transmitted from UEs by a network node to which the present invention may be applied.

FIG. 32 is a flowchart illustrating still yet another example of a method for differentially allocating resources according to information related with data transmitted from UEs by a network node to which the present invention may be applied.

Referring to FIG. 32, when the network node receives a resource allocation request message for transmitting data in a state in which the network node is not connected from a plurality of UEs, the network node may allocate the resources differentially to the UEs according to the data transmission direction and the random access retry.

First, step S32010 is the same as step S30010 of FIG. 30, and thus description thereof will be omitted.

The UE 2 performs a random access procedure to transmit the verification information of the UE for transmission of the downlink data to the network node in a state where the UE 2 is not connected with the network node.

Also, the UE 1 performs a random access procedure for transmitting the uplink data to the network node.

The UE1 transmits a first preamble and a random access request message (first request message) for requesting random access and resource allocation to the network.

However, when the first preamble and the first request message transmitted by the UE 1 is not transmitted to the network node (for example, when the UE 1 does not receive the response from the network node, etc), the UE 1 selects a preamble again to transmit the selected preamble (third preamble) and the first request message (S32020).

The UE 2 also transmits a second preamble and a random access request message (second request message) for requesting random access and resource allocation to the network (S32030).

Here, the first request message includes scheduling information related to the transmission of the uplink data described above, and the second request message includes scheduling information related to the verification information of the UE for receiving the downlink data.

The network node discovers the preambles transmitted from the UE 1 and the UE 2 and decodes the first request message and the second request message transmitted from the UE 1 and the UE 2 using the discovered preambles (S32040).

In the present embodiment, a case where the index of the third preamble is "21", the Q-value included in the first request message is "15", the Qos Class is "3", and the index of the second preamble is "6", the Q-Value included in the second request message is "500", and the QoS Class is "3" will be described as an example.

In the scheduling information included in the second request message, the QoS information indicating the quality of the downlink data is QoS information received from the network node through step S32010.

The network node that receives the preamble and the access request message including the scheduling information from the UE1 and the UE2 may allocate the resource to the UE based on the scheduling information.

The network node that receives the preamble and the access request message including the scheduling information from the UE1 and the UE2 may allocate the resource to the UE based on the scheduling information.

That is, the network node may determine whether to allocate the resource to the UE and the priority for the order of the resource allocation based on the scheduling information.

Specifically, when the network node successfully decodes the first request message and the second request message, the network node may acquire the scheduling information included in the random access request message and schedule the resources differentially from other UE based on the scheduling information (S32050).

Table 7 below shows an example of information included in the scheduling information transmitted by the UE 1 and the UE 2.

TABLE 7

|  | UE 1 | UE 2 |
| --- | --- | --- |
| Successful decoding | Yes | Yes |
| Data transmission direction | UL | DL |
| Quality characteristics | QoS Class 3 | QoS Class 3 |
| Random access retry | Yes | No |

Referring to Table 7 above, the scheduling information of the UE 1 and the UE 2 are the same as each other except for the data transmission direction and the random access retry.

Accordingly, the network node differentially allocates the resources to the UE 1 and the UE 2 according to the data transmission direction and the random access retry.

For example, since the UE 2 receives downlink data, a delay time of the UE 2 is larger than that of the UE 1 that transmits the uplink data. However, since the UE 1 previously performs the random access procedure, but fails and retries the random access procedure, the network node may first allocate the resource to the UE 1.

However, if the delay occurring until the UE 2 receives the downlink data is larger than the delay due to the retry of the random access procedure, the network node may first allocate resources to the UE 2.

Hereinafter, steps S32060 to S32100 are the same as steps S31060 to S31100 of FIG. 31, and thus description thereof will be omitted.

Through such a method, the network node may allocate the resources differentially to the UEs according to the transmission/reception time of data and the random access retry for a service to be provided other than the resource allocation request order.

In yet another embodiment of the present invention, when not only the UE 1 but also the UE 2 fails and retries the random access, the network node may determine the resource allocation priority of the UE 1 and the UE 2 according to the number of times of random access retry, a transmission delay time, and the like.

Figure 33:
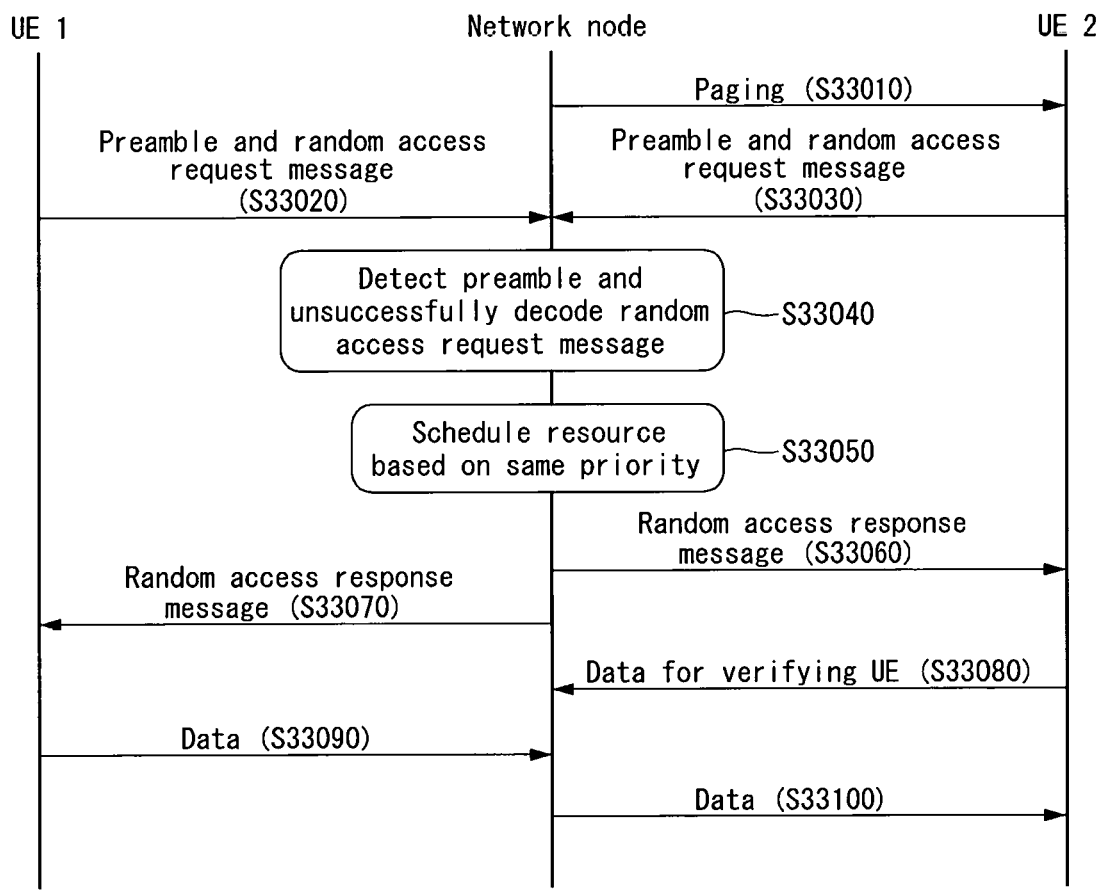
FIG. 33 is a flowchart illustrating still yet another example of a method for differentially allocating resources according to information related with data transmitted from UEs by a network node to which the present invention may be applied.

FIG. 33 is a flowchart illustrating still yet another example of a method for differentially allocating resources according to information related with data transmitted from UEs by a network node to which the present invention may be applied.

Referring to FIG. 33 above, when the network node fails to decode a random access request message including scheduling information transmitted from the UEs, the network node may allocate the resources to the UEs with the same priority.

First, steps S33010 to S33030 are the same as steps S30010 to S30030 of FIG. 30, and thus description thereof will be omitted.

The network node discovers the preambles transmitted from the UE 1 and the UE 2 and decodes the first request message and the second request message transmitted from the UE 1 and the UE 2 using the discovered preambles (S33040).

In the present embodiment, a case where the index of the first preamble is "21", the Q-value included in the first request message is "15", the Qos Class is "3", and the index of the second preamble is "6", the Q-Value included in the second request message is "500", and the QoS Class is "3" will be described as an example.

In the scheduling information included in the second request message, the QoS information indicating the quality of the downlink data is QoS information received from the network node through step S30010.

However, if the network fails to decode the first request message and the second request message using the first preamble and the second preamble, the network node may not obtain the scheduling information (S33040).

Accordingly, the network node allocates resources to the UE 1 and the UE 2 based on the same priority (S33050).

For example, the network node may allocate the resource to a terminal that first transmits the random access request message in the UE 1 and the UE 2.

Hereinafter, it is assumed that the UE 2 first transmits the random access request message.

The network node allocates the resources to the UE 2 and transmits resource allocation information indicating the allocated resources included in the random access response message (first response message) to the UE 2 (S33060).

The first response message may include an index of the second preamble, a timing advance command (TAC), a radio network identifier (e.g., Temporary C-RNTI, etc.) which the network allocates to the UE, and identifiers (hereinafter, called Q-CR ID in the present invention) indicating the contention resolution and whether decoding of the random access request message is successful, in addition to the resource allocation information.

At this time, the Q-CR ID value has a value of "0" because the network node has failed to decode the second request message.

Thereafter, the network node allocates the resources to the UE 1 and transmits resource allocation information indicating the allocated resources included in the random access response message (second response message) to the UE 1 (S33070).

The second response message may include an index of the first preamble, a timing advance command (TAC), a radio network identifier (e.g., Temporary C-RNTI, etc.) which the network allocates to the UE, and identifiers (hereinafter, called Q-CR ID in the present invention) indicating the contention resolution and whether decoding of the random access request message is successful, in addition to the resource allocation information.

At this time, the Q-CR ID value has a value of "0" because the network node has failed to decode the first request message.

Upon receiving the first response message and the second response message, the UE 2 and the UE 1 recognize that the network node has failed to decode the random access request message transmitted by the UE 2 and the UE 1, and the UE 2 and the UE 1 transmit the verification information and uplink data of the UE for receiving the downlink data to the network node through the allocated resource (S33080 and S33090).

The network node receiving the verification information verifies the UE 2 based on the information included in the verification information, and transmits the downlink data to the UE2 when the verification of the UE 2 is completed (S31100).

Figure 34:
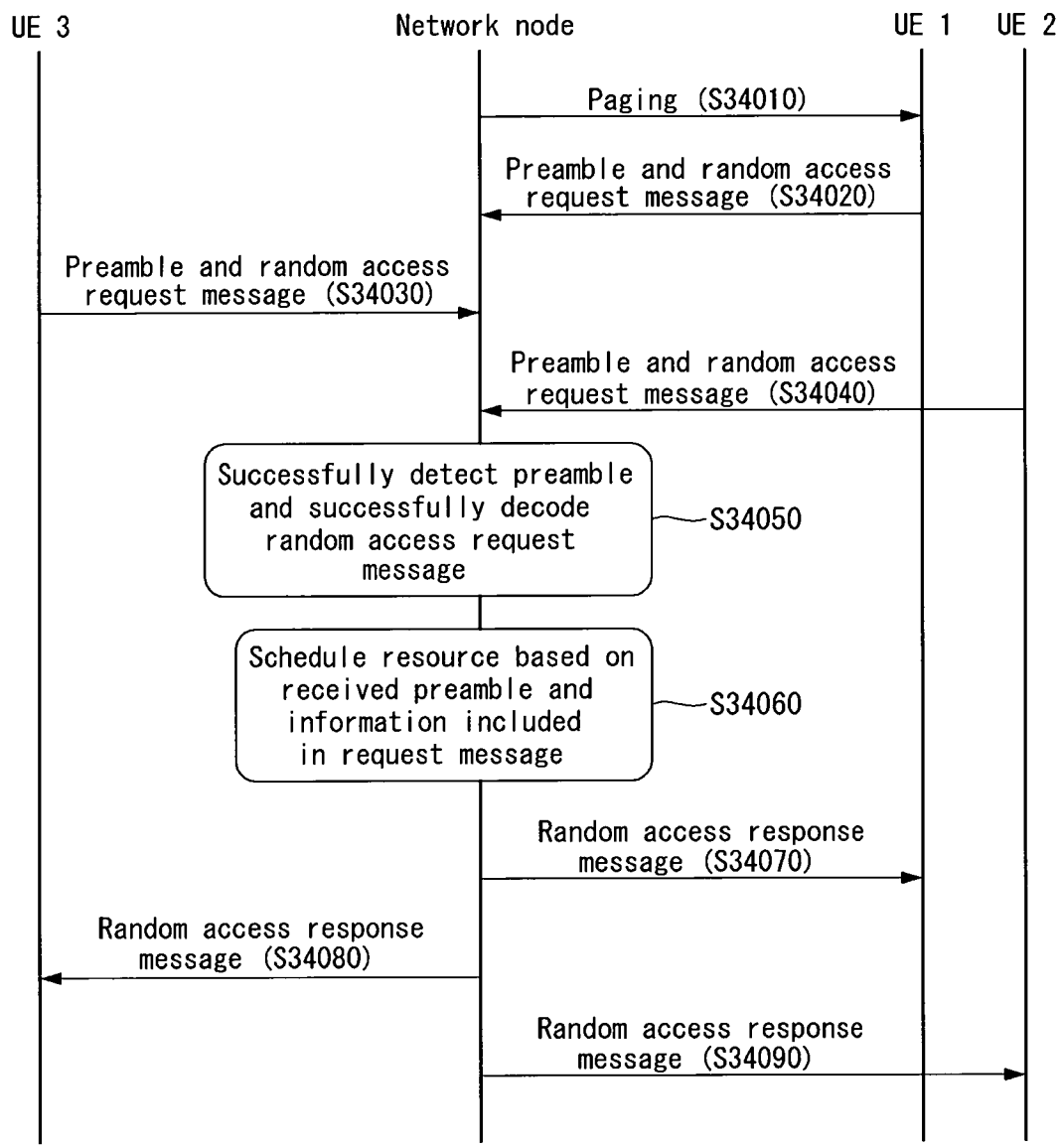
FIG. 34 is a flowchart illustrating one example of a method for differentially allocating resources according to information and a preamble related with data transmitted from UEs by a network node to which the present invention may be applied.

FIG. 34 is a flowchart illustrating one example of a method for differentially allocating resources according to information and a preamble related with data transmitted from UEs by a network node to which the present invention may be applied.

Referring to FIG. 34, the UE selects a preamble in a predetermined preamble set according to uplink data to be transmitted by the UE or downlink data to be received by the UE, and the network may allocate differentially the resources for each UE based on the preamble and the scheduling information transmitted from the UE.

Specifically, when the network node transmits the downlink data to the UE 1, the UE 1 is in an idle state, and thus the network node transmits a paging message to the UE 1 in order to activate the UE 1 (S34010).

The paging message includes an identifier indicating that the downlink data is transmitted in a state in which no connection is established, a UE ID indicating a UE to which the downlink data is transmitted, and quality of service (QoS) information indicating the quality required for the transmission of the downlink data.

The UE 1 activated through the paging message selects a preamble from a predetermined preamble set, and transmits the selected preamble (first preamble) and a random access request message (first request message) for requesting random access and resource allocation to the network (S34020).

The UE 2 and the UE 3 also select preambles from a predetermined preamble set like the UE 1, and transmit the selected preambles (the second preamble and the third preamble) and random access request messages (a second request message and a third request message) for requesting random access and resource allocation to the network (S34030 and S34040).

The first request message includes scheduling information related to verification information of the UE for receiving the downlink data, and the second request message and the third request message include scheduling information related to the transmission of the uplink data described above.

The preamble set is set according to a resource group classified according to the transmission direction and the size of the data.

For example, when the resource group is classified as shown in Table 8 below according to the transmission direction and the size of the data, the preamble set may be set as shown in Table 9 below.

TABLE 8

| Resource group | Random access purpose | Size of data |
|---|---|---|
| A | Transmit data or information to network node | Uplink data ≤ verification information of UE |
| B | Transmit data or information to network node | Uplink data > verification information of UE |
| C | Receive data from network node | |

TABLE 9

| Preamble sequence set | Preamble sequence index |
|---|---|
| Resource group A | 0-15 |
| Resource group B | 16-31 |
| Resource group C | 32-47 |

In the present embodiment, since the UE 1 receives the downlink data from the network node, the UE 1 belongs to the resource group C in Table 7 above and selects a preamble from the preamble sequence set of the resource group C in Table 9.

A case where the UE 2 selects the second preamble in the resource group A and the UE 3 selects the third preamble in the resource group B will be described as an example.

The network node discovers preambles transmitted from the UE 1, the UE 2 and the UE 3, and decodes request messages transmitted from the UE 1, the UE 2 and the UE 3 using the discovered preamble (S34050).

In the scheduling information included in the first request message, the QoS information indicating the quality of the downlink data is QoS information received from the network node through step S34010.

The network node that receives the preambles and the access request message including the scheduling information from the UE 1, the UE 2 and the UE 3 may allocate the resource to the UE based on the preambles and the scheduling information.

That is, the network node may determine whether to allocate the resource to the UEs and the priority for the order of the resource allocation based on the preamble and the scheduling information.

Specifically, when the network node successfully decodes the request messages, the network node may acquire the scheduling information included in the random access request message and schedule the resources differentially for each UE based on the preambles and the scheduling information (S34060).

If the decoding of the first request message and the second request message is successful and the decoding of the second request message is unsuccessful in the network node, the scheduling information included in the second request message is not considered in resource allocation.

Accordingly, the resource allocation priorities of the UE 1, the UE 2, and the UE 3 are determined by the scheduling information included in the first preamble, the second preamble, the third preamble, the first request message, and the third request message.

Table 10 below shows an example of information for determining the resource allocation priorities of the UE 1, the UE 2, and the UE 3.

TABLE 10

| | | UE 1 | UE 2 | UE 3 |
|---|---|---|---|---|
| Resource group (preamble set) | Data transmission direction | DL | UL | UL |
| | Size of data | — | Uplink data ≤ verification information of UE | Uplink data > verification information of UE |
| Random access request message | Successful decoding | Yes | No | Yes |
| | Quality characteristics | QoS Class 3 | Null | QoS Class 3 |
| | Size of data | — | Null | 800 |

Referring to Table 10 above, the required quality characteristics of the UE 1 and the UE 3 are the same, and the resource allocation priorities of the UE 1, the UE 2, and the UE 3 are determined according to the transmission direction.

That is, since the delay time is longest until the UE 1 receives the downlink data, the network node may first allocate resources to the UE 1.

Also, since the network node fails to decode the second request message, the UE 2 and the UE 3 are allocated resources with the same priority.

The network node allocates the resources to the UE 1 and transmits resource allocation information indicating the allocated resources included in the random access response message (first response message) to the UE 1 (S34070).

The first response message may include an index of the first preamble, a timing advance command (TAC), a radio network identifier (e.g., Temporary C-RNTI, etc.) which the network allocates to the UE, and identifiers (hereinafter, called Q-CR ID in the present invention) indicating the contention resolution and whether decoding the random access request message is successful, in addition to the resource allocation information.

Here, the Q-CR ID value is "500" which is the same value as the Q-value because the network node successfully decodes the second request message and allocated the resources to the UE 2.

Upon receiving the first response message from the network node, the UE 1 may recognize whether the first request message is successfully decoded through the Q-CR ID value included in the first response message.

Also, since the preamble index included in the first response message is the second preamble index, and the Q-value of the second request message is equal to the value of the Q-CR ID included in the first response message, and thus, it possible to recognize that the allocated resource is a resource allocated to the UE 1 through the first response message.

Thereafter, the UE 2 and the UE 3 may be allocated the resources from the network node.

That is, the UE 2 and the UE 3 may receive resource allocation information indicating an allocated resource, an index of a preamble, a time synchronization command (TAC), a wireless network identifier (e.g., temporary C-RNTI, etc) allocated to the UE by the network, and a random access response message (a second response message and a third response message) including an identifier (hereinafter referred to as a Q-CR ID in the present invention) indicating the contention resolution and whether decoding of the random access request message is successful (S34080 and S34090).

Through such a method, allocated resource groups may be classified according to the data transmission and the size, and a preamble set may be set according to the classified resource group.

In addition, the network node may allocate resources differentially to the UEs according to the preamble of the preamble set established according to the resource group rather than the resource allocation request order and the information related to the data to be transmitted and received.

Figure 35:
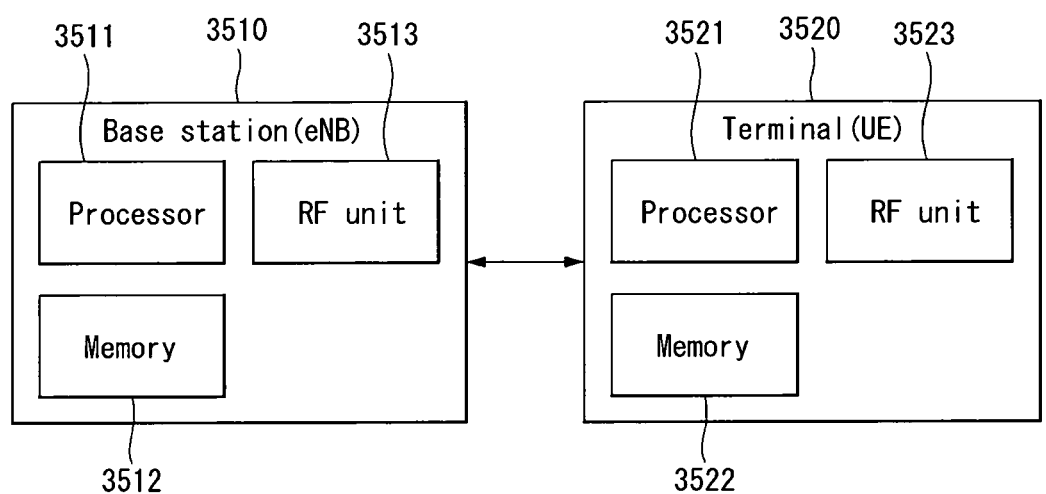
FIG. 35 is a diagram illustrating one example of an internal block diagram of a wireless apparatus to which the present invention may be applied.

FIG. 35 shows one example of an internal block diagram of a wireless device to which the present invention may be applied.

Here, the wireless device may be an eNB and a UE, and the base station includes both a macro eNB and a small eNB.

As shown in FIG. 35, the eNB 3510 and the UE 3520 include communication units (transmitting/receiving units, RF units, 3513 and 3523), processors 3511 and 3521, and memories 3512 and 3522.

The eNB and the UE may further input units and output units.

The communication units 3513 and 3523, the processors 3511 and 3521, the input units, the output units, and the memories 3512 and 3522 are operatively connected with each other in order to conduct the methods as proposed in the present disclosure.

The communication units (transmitting/receiving units or RF units, 3513 and 3523), when receiving information created from a PHY (Physical Layer) protocol, transfer the received information through RF (Radio-Frequency) spectrums and conduct filtering and amplification, then transmit it through antennas. Further, the communication units transfer RF (Radio Frequency) signals received through the antennas to bands available to be processed in the PHY protocol and perform filtering.

In addition, the communication units may also include the functions of switches to switch transmitting and receiving functions.

The processors 3511 and 3521 implement functions, procedures, and/or methods as proposed in the present disclosure. The layers of radio interface protocols may be implemented by the processors.

The processors may be represented as control parts, controllers, control units, or computers.

The memories 3512 and 3522 are connected with the processors and store protocols or parameters for performing the function, procedure and/or method proposed in the present disclosure.

The processors 3511 and 3521 may include an application-specific integrated circuit (ASIC), a separate chipset, a logic circuit, and/or a data processing unit. The memory may include a read-only memory (ROM), a random access memory (RAM), a flash memory, a memory card, storage medium, and/or other storage devices. The communication unit may include a base-band circuit for processing a radio signal. When the embodiment is implemented in software, the aforementioned methods may be implemented with a module (process, function, etc.) for performing the aforementioned functions.

The module may be stored in the memory and may be performed by the processor. The memory may be located inside or outside the processor, and may be coupled to the processor by using various well-known means.

The output unit (display unit) is controlled by the processor and outputs information from the process, together with various information signals from the processor and key input signals generated from the key input unit.

Further, although the drawings have been individually described for ease of description, the embodiments shown in the drawings may be merged with each other to implement new embodiments. As necessary by those ordinary skilled in the art, designing recording media readably by a computer recording programs to execute the above-described embodiments also belongs to the scope of the present invention.

The method for direction-based searching a device proposed in the present disclosure, rather than limited to the configurations and methods according to the above-described embodiments, may be configured so that all or some of the embodiments may be selectively combined with each other to allow for various variations or modifications.

Meanwhile, the method for direction-based searching a device of the present disclosure may be implemented as codes that are readable by a recording medium readable by a process provided in a network device. The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet. Further, the recording media readable by the processor may be distributed to computer systems connected with each other via a network, and processor readable codes may be stored and executed in a distributing manner.

In addition, the preferred embodiments have been depicted and described so far, but the present disclosure is not limited to the specific embodiment described above. It is understood that various modifications are available by those skilled in the dart without departing from the technical feature of the present invention claimed in claims, and such modifications should not be individually understood from the technical spirit and prospect of the present invention.

Further, both of the method invention and the device invention are described in the present disclosure, and both of the invention may be applied complementarily with each other as occasion demands.

INDUSTRIAL APPLICABILITY

The RRC connection method in the wireless communication system according to the present invention which may be applied to the 3GPP LTE/LTE-A system has been mainly described above. The present disclosure is not limited to this. The RRC connection method in the wireless communication system according to the present invention may be equally applied to various wireless communication systems in addition to the 3GPP LTE/LTE-A system.

What is claimed is:

1. A method for transmitting and receiving data by a user equipment (UE) in a wireless communication system, the method comprising:
    transmitting to a network node a first preamble and a first request message for requesting random access,
    the first request message including at least one of purpose information indicating a purpose of transmitting the first request message, count information indicating the number of times of trying the random access, size information of first data, or a first identifier for contention resolution;
    as a response to the first request message, receiving a first response message including a second identifier for indicating whether the first request message is decoded and contention resolution, and an index of a second preamble successfully received by the network node; and
    while the connection with the network node is not established, transmitting the first data to the network node in accordance with the index of the second preamble and the second identifier.

2. The method of claim 1, wherein when the first data is uplink data, the first request message further includes characteristic information of the first data.

3. The method of claim 1, wherein when the first data is verification information of UE for receiving downlink data, the first request message further includes characteristic information of the downlink data.

4. The method of claim 1, further comprising:
    selecting the first preamble in a preamble set,
    wherein the preamble set is one of multiple preamble sets determined according to a size and a transmission direction of data.

5. The method of claim 1, wherein the response message further includes a radio network identifier of the UE allocated by the network node.

6. The method of claim 1, wherein when the index of the first preamble and the index of the second preamble are the same as each other and a value of the second identifier indicates decoding success of the first request message, the first response message includes resource allocation information for transmitting the first data, and
    the first data is transmitted based on the resource allocation information.

7. The method of claim 1, further comprising:
    when the index of the first preamble and the index of the second preamble are the same as each other and the value of the second identifier indicates decoding failure of the first request message, transmitting a second request message for requesting resource allocation for transmitting the first data to the network node; and
    receiving a second response message including resource allocation information for transmitting the first data,
    wherein the first data is transmitted based on the resource allocation information.

8. The method of claim 1, further comprising:
    when the index of the first preamble and the index of the second preamble are not the same as each other, transmitting to the network node a third preamble and a second request message for requesting the random access.

9. The method of claim 1, further comprising:
    when the first data is UE verification data for transmitting downlink data, receiving a paging message from the network node; and
    receiving the downlink data from the network node,
    wherein the paging message further includes a UE identifier indicating a UE receiving the downlink data and quality information indicating a quality of the downlink data.

10. A method for scheduling resources for data transmission/reception by a network node in a wireless communication system, the method comprising:
    receiving from user equipments (UEs) one or more first preambles and first request messages for requesting random access,
    each of the one or more first request messages including at least one of purpose information indicating a purpose of transmitting the first request message, count information indicating the number of times of trying the random access, size information of data to be transmitted by the UE, characteristic information of uplink or downlink data, or a first identifier for contention resolution;
    allocating a resource to at least one UE among the UEs based on at least one of the purpose information, the count information, the size information, or the characteristic information;
    transmitting one or more first response messages as a response to the one or more first request messages; and
    receiving the data from the at least one UE while not being connected with the at least one UE.

11. The method of claim 10, wherein each of the one or more first preambles is selected in one preamble set among multiple preamble sets determined according to a size and a transmission direction of data to be transmitted.

12. The method of claim 10, wherein each of the one or more response messages includes a second identifier indicating contention resolution and indicating whether to decode each of the one or more first request messages and a preamble index indicating a preamble successfully received by the network node among the one or more first preambles.

13. The method of claim 10, further comprising:
    receiving a second request message for requesting resource allocation for transmitting the data from one or more UE which is not allocated the resource among the UEs; and
    transmitting a second response message including resource allocation information indicating a resource allocated for transmitting the data to the one or more UE as a response to the second request message.

14. The method of claim 10, further comprising:
    when the data is UE verification data for transmitting downlink data, transmitting a paging message from the UE, wherein the paging message further includes a UE identifier indicating UE to which the downlink data is transmitted and quality information indicating a quality of the downlink data.

15. A user equipment (UE) for transmitting and receiving data in a wireless communication system, the UE comprising:

a communication unit transmitting and receiving a radio signal to and from the outside; and a processor functionally coupled with the communication unit, wherein the processor transmits to a network node a first preamble and a first request message for requesting random access, the first request message including at least one of purpose information indicating a purpose of transmitting the first request message, count information indicating the number of times of trying the random access, size information of first data, or a first identifier for contention resolution, as a response to the first request message, receives a first response message including a second identifier for indicating whether the first request message is decoded and contention resolution and an index of a second preamble successfully received by the network node, and while the connection with the network node is not established, transmits the first data to the network node in accordance with the index of the second preamble and the second identifier.

* * * * *